(12) United States Patent
Canoy

(10) Patent No.: US 9,747,554 B2
(45) Date of Patent: Aug. 29, 2017

(54) LEARNING DEVICE WITH CONTINUOUS CONFIGURATION CAPABILITY

(71) Applicant: QUALCOMM Incorporated, San Diego, CA (US)

(72) Inventor: Michael-David Nakayoshi Canoy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 14/286,244

(22) Filed: May 23, 2014

(65) Prior Publication Data

US 2014/0351180 A1 Nov. 27, 2014

Related U.S. Application Data

(60) Provisional application No. 61/827,141, filed on May 24, 2013.

(51) Int. Cl.
G06N 99/00 (2010.01)

(52) U.S. Cl.
CPC .................................. *G06N 99/005* (2013.01)

(58) Field of Classification Search
CPC ............................. G06N 99/00; G06N 99/005
USPC .......................................................... 706/12
See application file for complete search history.

(56) References Cited

U.S. PATENT DOCUMENTS

| | | |
|---|---|---|
| 4,750,118 A | 6/1988 | Heitschel et al. |
| 5,398,302 A | 3/1995 | Thrift |
| 5,925,115 A | 7/1999 | Ponte |
| 6,192,230 B1 | 2/2001 | Van Bokhorst et al. |
| 6,400,996 B1 | 6/2002 | Hoffberg et al. |

(Continued)

FOREIGN PATENT DOCUMENTS

| | | |
|---|---|---|
| CN | 102665335 A | 9/2012 |
| CN | 102890465 A | 1/2013 |

(Continued)

OTHER PUBLICATIONS

Cook D. et al., "CASAS: A Smart Home in a Box", Published online Sep. 26, 2012.*

(Continued)

*Primary Examiner* — Dave Misir
(74) *Attorney, Agent, or Firm* — The Marbury Law Group, PLLC

(57) ABSTRACT

An embodiment method for continuous configuration of learning devices includes operations for storing, by a learning device within a decentralized system of a plurality of learning devices, events obtained while in a monitoring mode, activating a triggered mode for a reflex when at least one of the stored events corresponds to a trigger pattern, determining whether the reflex has a trigger weight exceeding a trigger weight threshold, conducting the predetermined action associated with the reflex when the trigger weight exceeds the trigger weight threshold, obtaining at least one additional event while in the triggered mode, adjusting the trigger weight of the reflex when the at least one additional event corresponds to a correction pattern or a reward pattern occurring in response to conducting the predetermined action, and creating a second reflex when the at least one additional event does not correspond to a known pattern.

88 Claims, 17 Drawing Sheets

(56) References Cited

U.S. PATENT DOCUMENTS

| | | | |
|---|---|---|---|
| 6,453,687 B2 | 9/2002 | Sharood et al. | |
| 6,834,208 B2 | 12/2004 | Gonzales et al. | |
| 6,957,544 B2 | 10/2005 | Dobbs et al. | |
| 7,113,773 B2 | 9/2006 | Quick et al. | |
| 7,133,729 B1 | 11/2006 | Wang et al. | |
| 7,301,474 B2 | 11/2007 | Zimmerman | |
| 7,496,545 B2 | 2/2009 | Chung et al. | |
| 7,644,145 B2 | 1/2010 | Rockwell | |
| 7,673,244 B2 | 3/2010 | Zukowski et al. | |
| 7,765,033 B2 | 7/2010 | Perry | |
| 8,136,738 B1 | 3/2012 | Kopp | |
| 8,156,500 B2 | 4/2012 | Helander | |
| 8,284,989 B2 | 10/2012 | Scholl | |
| 8,577,392 B1 | 11/2013 | Pai et al. | |
| 8,620,841 B1 | 12/2013 | Filson et al. | |
| 8,630,740 B2 | 1/2014 | Matsuoka et al. | |
| 9,084,263 B2 | 7/2015 | Yu et al. | |
| 9,106,348 B2 | 8/2015 | Thomson et al. | |
| 9,143,402 B2 | 9/2015 | Tinnakornsrisuphap et al. | |
| 9,247,549 B2 | 1/2016 | Bang et al. | |
| 9,313,320 B2 | 4/2016 | Zeilingold et al. | |
| 9,313,863 B2 | 4/2016 | Hershberg et al. | |
| 9,357,385 B2 | 5/2016 | Benoit et al. | |
| 9,377,525 B1 | 6/2016 | Pon et al. | |
| 9,438,440 B2 | 9/2016 | Burns et al. | |
| 9,473,321 B1 | 10/2016 | Bazar et al. | |
| 9,473,514 B1 | 10/2016 | Chou et al. | |
| 9,501,061 B2 | 11/2016 | Canoy et al. | |
| 2002/0047628 A1 | 4/2002 | Morgan et al. | |
| 2003/0216139 A1 | 11/2003 | Olson et al. | |
| 2004/0215816 A1 | 10/2004 | Hayes et al. | |
| 2005/0024228 A1 | 2/2005 | Vignon et al. | |
| 2005/0026602 A1 | 2/2005 | Chuey et al. | |
| 2006/0049935 A1 | 3/2006 | Giannopoulos et al. | |
| 2006/0198523 A1 | 9/2006 | Shearer | |
| 2006/0229739 A1* | 10/2006 | Morikawa | G05B 13/027 700/19 |
| 2010/0063774 A1* | 3/2010 | Cook | G05B 15/02 702/181 |
| 2010/0094786 A1 | 4/2010 | Gupta et al. | |
| 2010/0114807 A1 | 5/2010 | Ueda et al. | |
| 2011/0046805 A1 | 2/2011 | Bedros et al. | |
| 2011/0118857 A1 | 5/2011 | Bodnar | |
| 2011/0148685 A1 | 6/2011 | Welten | |
| 2011/0149919 A1 | 6/2011 | Kapoor et al. | |
| 2011/0190953 A1 | 8/2011 | Park et al. | |
| 2012/0209796 A1 | 8/2012 | Vashist et al. | |
| 2012/0239963 A1 | 9/2012 | Smith | |
| 2012/0265717 A1 | 10/2012 | Narayanan et al. | |
| 2013/0006906 A1* | 1/2013 | Cook | G06N 5/02 706/46 |
| 2013/0098596 A1 | 4/2013 | Fisher et al. | |
| 2014/0028714 A1 | 1/2014 | Keating et al. | |
| 2014/0349269 A1 | 11/2014 | Canoy et al. | |
| 2014/0351181 A1 | 11/2014 | Canoy et al. | |
| 2014/0351182 A1 | 11/2014 | Canoy et al. | |
| 2014/0351374 A1 | 11/2014 | Canoy | |
| 2016/0121487 A1 | 5/2016 | Mohan | |

FOREIGN PATENT DOCUMENTS

| | | |
|---|---|---|
| WO | 0150684 A1 | 7/2001 |
| WO | 03077610 A1 | 9/2003 |
| WO | 2014027275 A1 | 2/2014 |
| WO | 2014190338 A2 | 11/2014 |

OTHER PUBLICATIONS

Helal S. et al., "The Gator Tech Smart House: A Programmable Pervasive Space", IEEE Computer Society, 2005.*

Helal S. et al., "The Gator Tech Smart House: Enabling Technologies and Lessons Learned", ICREAT, Apr. 2009.*

Breuer H, et al., "Mobile Learning with Patterns", Advanced Learning Technologies, 2008. ICALT '08. Eighth IEEE International Conference on, IEEE, Piscataway, NJ, USA, Jul. 1, 2008 (Jul. 1, 2008), pp. 626-638, XP031284609, ISBN: 978-8-7695-3167-8 p. 626—p. 638, left-hand column, paragraph 4.

Cook D.J., et al., "Learning to Control a Smart Home Environment Continental Automated Buildings Association Information Series", Continental Automated Building Association Information Series IS 2004-52, Learning to Control a Smart Home Environment, Dec. 1, 2004 (Dec. 1, 2004), pp. 1-28, XP055170496, Retrieved from the Internet: URL:http://www.caba.org/resources/Documents/is-2004-52.pdf [retrieved on Feb. 18, 2015].

Galindo C, et al., "Towards the Automatic Learning of Reflex Modulation for Mobile Robot Navigation", Jun. 18, 2007 (Jun. 18, 2007), Nature Inspired Problem-Solving Methods in Knowledge Engineering; [Lecture Notes in Computer Science;;LNCS], Springer Berlin Heidelberg, Berlin, Heidelberg, p. 347-356, XP019095500, ISBN: 978-3-540-73054-5 p. 347—p. 355.

International Search Report and Written Opinion—PCT/US2014/039465—ISA/EPO—Mar. 2, 2015.

Joya G, et al., A neural paradigm for controlling autonomous systems with reflex behaviour and learning capability, Jun. 7, 1995 (Jun. 7, 1995), From Natural to Artificial Neural Computation, Springer Berlin Heidelberg, Berlin, Heidelberg, p. 283-290, XP019186930, ISBN: 978-3-540-59497-0 p. 283—p. 289.

Balko S: "Understanding Intermediate Events, Asynchronous Message Receipt and Correlation in NetWeaver BPM 7.20", SAP Community Network, Jan. 1, 2010 (Jan. 1, 2010), pp. 1-20, XP055166477, Retrieved from the Internet: URL:http://www.sdn.sap.com/irj/scn/go/portal/prtroot/docs/library/uuid/f0369539-e876-2d10-ef93-8f30e112ee6d?Quicklink=index&overridelayout=true&50680614450635 [retrieved on Feb. 2, 2015] p. 1—p. 18.

Obermaisser R., et al., "Detection of Out-of-Norm Behaviors in Event-Triggered Virtual Networks", Industrial Informatics, 2007 5th IEEE International Conference on, IEEE, PI, Jul. 1, 2007 (Jul. 1, 2007), pp. 971-976, XP031161917, ISBN: 978-1-4244-0850-4 p. 971—p. 976, left-hand column.

Rashidi P. et al., "Keeping the Resident in the Loop: Adapting the Smart Home to the User", IEEE Transactions on Systems, Man and Cybernetics. Part A: Systems and Humans, IEEE Service Center, Piscataway, NJ, US, vol. 39, No. 5, Sep. 1, 2009 (Sep. 1, 2009), pp. 949-959, XP011344768, ISSN: 1083-4427, DOI: 10.1189/TSMCA.2009.2025137 p. 949—p. 959, left-hand column, paragraph 2.

Sandhu J S, et al., "Wireless Sensor Networks for Commercial Lighting Control: Decision Making with Multi-agent Systems", Jan. 1, 2004 (Jan. 1, 2004), pp. 1-5, XP055166479, Retrieved from the Internet: URL: http://best.berkeley.edu/research/smartLighting/support/AAAI_04_SN_J_Sandhu.pdf [retrieved on Feb. 2, 2015] p. 1—p. 5, left-hand column, paragraph 1.

Wang: X. et al., "Wang X., et al., "Decentralized Event-Triggered Broadcasts over Networked Control Systems", Apr. 22, 2008 (Apr. 22, 2008), Hybrid Systems: Computation and Control; [Lecture Notes in Computer Science], Springer Berlin Heidelberg, Berlin, Heidelberg, pp. 674-677, XP019101749, ISBN: 978-3-540-78928-4 p. 674—p. 677, paragraph 4", 2008, 674-677.

Casambi Technologies Ltd., "Casambi for Hue," Casambi for Hue on the App Store on iTunes, 2014, Retrieved from the Internet < URL: https://itunes.apple.com/app/casambi-for-hue/id731859317 >, [Retrieved on Mar. 31, 2014], 4 pages.

CNET Ed., "Nest Learning Thermostat review: Second-gen Nest zeroes in on perfection," Retrieved on Jul. 1, 2014, Retrieved from the Internet < URL: http://reviews.cnet.com/smart-home/nest-learning-thermostat/4505-9788_7-35179222.html >, 10 Pages.

Cook D.J., et al., "Ambient Intelligence: Technologies, Applications, and Opportunities," 2007, pp. 1-38.

Cook D.J., "How Smart is Your Home?," Science, Mar. 30, 2012, vol. 335, pp. 1579-1581.

Khalili A., et al., "Autonomous Learning of User's Preference of Music and Light Services in Smart Home Applications," 2009, 12 pages.

Pathen A.S.K., et al., "Smartening the Environment using Wireless Sensor Networks in a Developing Country," International Conference on Advanced Communication Technology, 2006, pp. 705-709.

(56) References Cited

OTHER PUBLICATIONS

Sato K., et al., "CyPhy-UI: Cyber-Physical User Interaction Paradigm to Control Networked Appliances with Augmented Reality," ACHI 2013 : The Sixth International Conference on Advances in Computer-Human Interactions, 2013, pp. 215-221.
Mozer M.G., "The Adaptive House", University of Colorado at Boulder, Retrieved on May 21, 2014, pp. 3, URL: http://www.cs.colorado.edu/~mozer/index.php?dir=/Research/Projects/Adaptive%20house/.

* cited by examiner

Learning Rates

Different Gain Sets for Critical and Steady State Periods

| Critical Learning Period<br>801 | Steady State Learning Period<br>802 |
|---|---|
| Gain Set 1<br>Trigger, Action, Reward, Correction | Gain Set 2<br>Trigger, Action, Reward, Correction |

FIG. 8

LEARNING DEVICE WITH CONTINUOUS CONFIGURATION CAPABILITY

RELATED APPLICATIONS

The present application claims the benefit of priority to U.S. Provisional Application No. 61/827,141, entitled "A Method and Apparatus for Continuous Configuration of a Device" filed May 24, 2013, the entire contents of which are hereby incorporated by reference for all purposes.

BACKGROUND

Computer programmers must typically reprogram a programmable device (i.e., a smart device) each time the device needs to perform a new behavior. Programmable devices typically require programmers (or users) to use a specialized programmer interface that interfaces with the device to configure it for a new task. However, even with the programmer interface, the reconfiguring and reprogramming of programmable devices may require expertise in writing arduous computer code associated with the programmer interface to program the device new behaviors. Scheduling an expert to write code means reprogramming is rarely accomplished immediately, and may be costly because it may require keeping such an expert on staff or hiring a consultant to make the appropriate changes. Thus, programming a new behavior on a programmable device is not a simple and efficient endeavor. A simple and quick mechanism is needed to teach learning devices new behaviors without the need of an expert.

SUMMARY

The various embodiments provide systems, devices, non-transitory processor-readable storage media, and methods for continuous configuration of learning devices. An embodiment method that may be executed by a processor of a first learning device may include operations for storing events obtained while in a monitoring mode, activating a first triggered mode for a first reflex associated with a predetermined action when at least one of the stored events corresponds to a first trigger pattern associated with the first reflex, determining whether the first reflex has a trigger weight exceeding a trigger weight threshold, conducting the predetermined action associated with the first reflex in response to determining that the trigger weight associated with the first reflex exceeds the trigger weight threshold, obtaining at least one additional event while in the first triggered mode, adjusting the trigger weight of the first reflex when the at least one additional event corresponds to at least one of a first correction pattern and a first reward pattern associated with the first reflex and occurring in response to conducting the predetermined action, and creating a second reflex with a second trigger pattern, a second correction pattern, and a second reward pattern when the at least one additional event does not correspond to at least one of the first trigger pattern, the first correction pattern, and the first reward pattern associated with the first reflex. In some embodiments, storing events may involve temporarily storing (i.e., buffering) events in memory, such as a buffer memory. In some embodiments, the method may further include entering a critical learning period with the first reflex during which a high gain set may be applied to the trigger weight. In some embodiments, the method may further include entering a steady state learning period with the first reflex during which a low gain set may be applied to the trigger weight. In some embodiments, the method may further include concurrently activating a second triggered mode when the at least one additional event corresponds to a different trigger pattern associated with a third reflex.

In some embodiments, adjusting the trigger weight of the first reflex further may include increasing the trigger weight of the first reflex when the at least one additional event corresponds to the first reward pattern of the first reflex, and decreasing the trigger weight of the first reflex when the at least one additional event corresponds to the first correction pattern of the first reflex. In some embodiments, obtaining the at least one additional event while in the first triggered mode may further include retrieving prior events from a memory (e.g., a buffer memory). In some embodiments, storing events obtained while in the monitoring mode may include storing, in a memory, at least one event for a window of time such that the at least one event and associated patterns may be removed from the memory after the window of time. In some embodiments, the method may further include receiving an event report message from another learning device in which the received event report message indicates another event that was generated by the another learning device in response to the another learning device obtaining another event that may correspond to the first trigger pattern.

In some embodiments, at least one of the stored events may be obtained based on occurrence data that may be generated locally. In some embodiments, at least one of the stored events may be obtained based on occurrence data that may be generated remotely. In some embodiments, the at least one of the stored events that may be obtained based on the occurrence data that may be generated remotely may be generated in response to the first learning device receiving an event report message from a second learning device, in which case the first learning device and the second learning device may be part of a decentralized system that includes a plurality of learning devices in a location that may be connected via a wired or a wireless communication link. In some embodiments, the at least one of the stored events that may be obtained based on the occurrence data that may be generated remotely corresponds to at least one of the first reward pattern and the first correction pattern. In some embodiments, at least one of the stored events may be obtained based on occurrence data that may be received from non-learning devices via a wired or wireless communication link.

In some embodiments, conducting the predetermined action associated with the first reflex in response to determining that the trigger weight associated with the first reflex exceeds the trigger weight threshold may include generating a resulting event based on conducting the predetermined action, and broadcasting an event report message that indicates the resulting event and that may be capable of being used by another learning device. In some embodiments, activating the first triggered mode for the first reflex associated with the predetermined action when at least one of the stored events corresponds to the first trigger pattern associated with the first reflex may include applying a pattern filter to a pattern based on the at least one of the stored events, and activating the first triggered mode for the first reflex associated with the predetermined action when the at least one of the stored events corresponds to the first trigger pattern associated with the first reflex and when the pattern is not discarded based on the applied pattern filter. In some embodiments, the first reflex and the second reflex may be only removable from the first learning device based on a garbage collection policy. In some embodiments, conducting the predetermined action associated with the first reflex in response to determining that the trigger weight associated with the first reflex exceeds the trigger weight threshold may include generating a pattern of events that may be used by a motor driver to drive an actuator. In some embodiments, one or more of the first correction pattern and the first reward pattern may be order-dependent. In some embodiments, one or more of the first correction pattern and the first reward pattern may be order-independent.

Various embodiments may include a computing device configured with processor-executable instructions to perform operations of the methods described above. Various embodiments may include a computing device having means for performing functions of the operations of the methods described above. Various embodiments may include non-transitory processor-readable storage media on which are stored processor-executable instructions configured to cause a processor of a computing device to perform operations of the methods described above. Various embodiments may include a system that may include one or more learning devices configured to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 8 is a diagram of two exemplary learning rates for a learning device suitable for use in various embodiments.

DETAILED DESCRIPTION

Figure 1A:
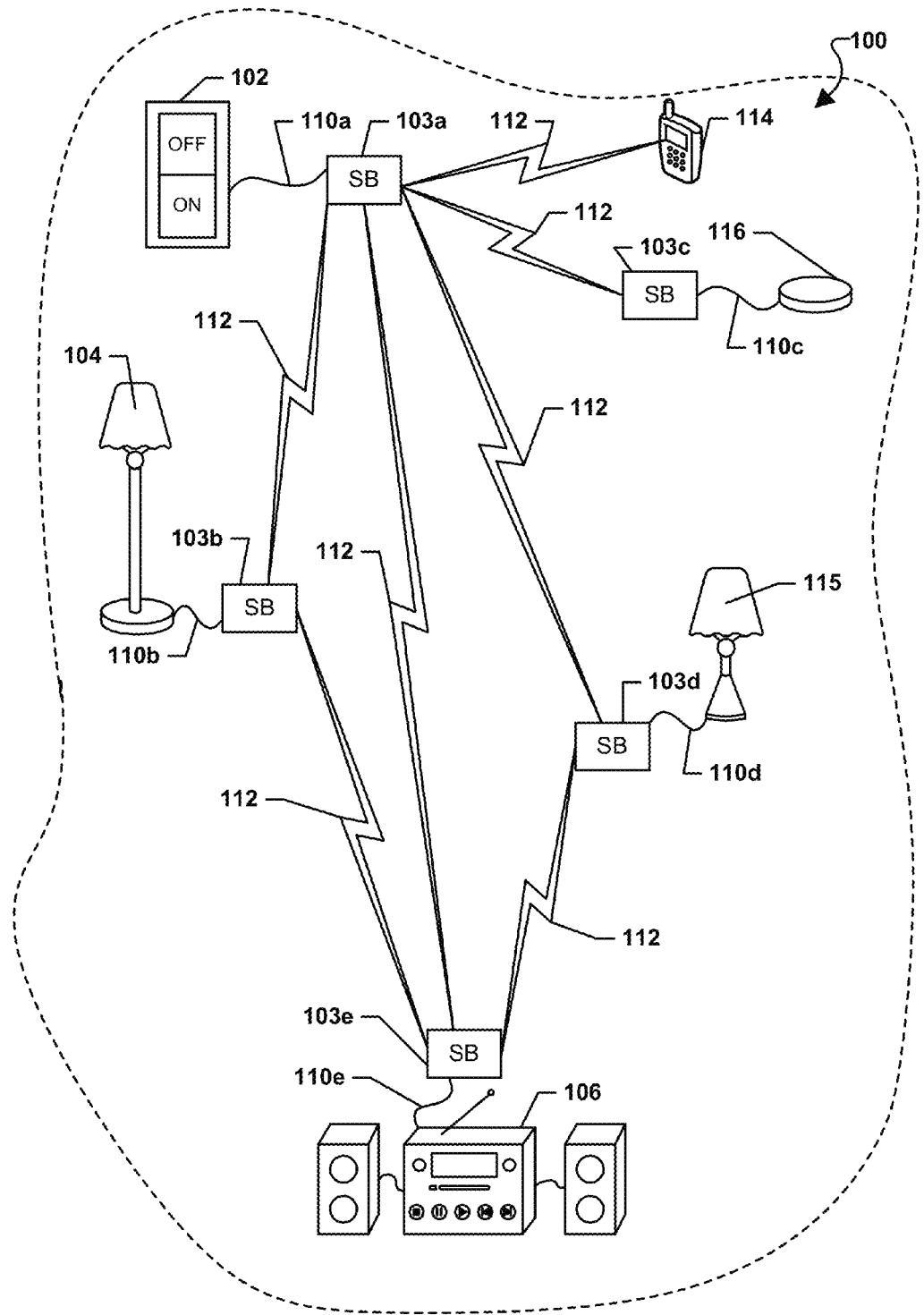
FIGS. 1A-1B are system block diagrams illustrating exemplary systems implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "learning device(s)," "smart device(s)," and "smart box(es)" are used herein to refer to computing devices capable of learning behaviors from observed information by correlating predefined actions with information related to triggers, such data indicating user inputs, detected changes in states, received signals or transmissions, and other information that may be obtained at the devices. Learning devices may be configured to store new relationships or correlations between triggers and predefined actions over time. In response to detecting a trigger already correlated to a predefined action, a learning device may perform the predefined action or alternatively perform operations to cause other associated devices to perform correlated actions. Throughout the disclosure, the modifier "smart" may be used to indicate an appliance (e.g., a lamp) is a learning device. For example, the term "smart lamp" refers to a lamp that is configured to be a learning device, is coupled to and controlled by a learning device, or otherwise includes components of a learning device.

The term "event" is used herein to refer to data (e.g., an object or other data structure) that represents an action, condition, and/or situation that has been detected or generated by one or more learning devices. Events may be generated (or otherwise obtained) and stored locally on learning devices in response to obtaining information (referred to herein as "occurrence data") indicating the occurrence of an action or condition. Occurrence data may include various data describing an action or condition, as well as identifying the device that performed or detected the action or condition, such as device identifiers, timestamps, priority information, gain information, state identifiers, etc. Occurrence data may be received or obtained by a learning device from signals or other information from devices connected to the learning devices (e.g., a sensor directly coupled to a processor or core of a learning device, etc.) or otherwise controlled by the learning device (e.g., a non-programmable lamp, etc.). Occurrence data may also be received or obtained by learning devices from broadcast messages (referred to herein as "event report messages") received from other nearby devices. For example, after generating a first event based on locally encountered sensor data, a first learning device may broadcast an event report message with occurrence data indicating that the first event has occurred so that a second learning device may be enabled to also generate the first event based on the data within the event report message.

The term "reflex" is used herein to refer to stored information within a learning device that indicates at least a correlation or relationship between a trigger and an action the learning device is configured to perform. The stored information of a reflex may include patterns that may be matched to events generated within a predetermined time window to cause the learning device to perform the action of the reflex and/or adjust persistent data stored in relation to the reflex (e.g., trigger weights). Events may be considered the building blocks of the patterns within a reflex. For example, a trigger pattern stored within a reflex may be comprised of one or more events.

Various embodiments provide devices, methods, protocols, systems, and non-transitory processor-readable storage media with processor-executable instructions that enable continuous configuration of learning devices via observing and correlating events to trigger actions. In various embodiments, the learning processes may emulate biological systems to enable learning devices to be easily configured by a user through intuitive training methods. Learning devices may be easily configured to react in a desired manner in response to events, which may be generated as a result of user actions, changes in state of other learning devices, etc. Through simple repetition, a variety of behaviors can be learned by and thus implemented in a decentralized system of a plurality of learning devices without the need for preconditioning or a programmer interface. Using repeated rewarding training inputs, a user may easily train the learning devices to automatically perform predefined tasks in response to various triggers. In a similar manner, a user may easily train the learning device to stop automatically performing a particular task in response to other triggers by using correcting inputs (e.g., a single correction input, repeated correction inputs over time, etc.).

Various embodiments enable systems that allow for continuous configuration in a manner that is more natural to users. Learning devices need not be turned off, reset, or cleared in order to learn a new behavior or unlearn a previously programmed response to a trigger. Embodiment systems and training protocols enable learning devices to learn from or react to other learning devices.

Interactions and operations of embodiment learning devices may be illustrated by way of an example. In response to receiving occurrence data related to a button press, a first learning device may generate an event, which may be reported by the learning device in an event report message via wireless (or wired) signals. A second nearby learning device may receive the event report message, generate a similar event, and process the event, unless the second learning device is filtering that event. In response to processing the event, the second learning device may perform a function, which in turn may generate additional events, such as based on occurrence data resulting from the performed function.

In some embodiments, a learning device may monitor a receiver circuit (e.g., a WiFi, Bluetooth®, or other wireless transceiver) for event report messages in a monitoring mode for future processing. The learning device may receive event report messages via broadcast transmissions (or wireless communication links) by another learning device. For example, a first learning device may be a smart wall switch that wirelessly broadcasts an event report message corresponding to or in response to it being toggled from 'off' to 'on,' and the broadcast event report messages may be received by a nearby second learning device, such as a smart lamp. Learning devices receiving such event report messages may process the messages and generate events based on the included occurrence data. For example, the occurrence data may indicate a state change in a nearby smart wall switch that may be received and used by a smart lamp (e.g., a floor lamp coupled to a learning device) to generate a wall switch 'on' event. Nearby learning devices may not need to be paired with transmitting learning devices to receive and process event report messages being broadcast. As such, events may be freely reported for reception by any learning device within communication range, so that learning devices can freely learn behaviors based on information from other learning devices. In this manner, complex system behaviors may be easily programmed or configured, with learning devices leveraging other learning devices. In some embodiments, in response to processing a received event report message, a learning device may broadcast additional event report messages that may be received by other nearby learning devices.

Alternatively, a learning device may generate (or receive/obtain) an event based on occurrence data observed at the learning device, such as based on sensor data received by the processor of the learning device from a directly coupled sensor. For example, a learning device may be a smart lamp which, when toggled from 'off' to 'on,' may generate its own corresponding 'off' to 'on' event.

Regardless of whether a learning device obtains events based on directly observed occurrences or data within received event report messages, the learning device may store events in memory, such as temporarily storing (i.e., buffering) events for a predetermined period of time. After that period of time, the learning device may ignore an event in the memory (e.g., a buffer memory) and delete it if the event does not match (or is not part of a pattern of events that matches) a stored or predetermined pattern of a reflex or if no other event or pattern is received/obtained. However, if the learning device determines that one or more events in the memory match a stored or predetermined pattern of a reflex (e.g., a trigger pattern stored in memory of the learning device), the learning device may utilize such events to learn or perform actions. In particular, in response to matching a pattern in the memory to a trigger pattern of a reflex, a learning device may enter (or activate) a triggered mode. While in the triggered mode, the learning device may determine whether the matched trigger pattern's reflex has a weight (i.e., a trigger weight) exceeding a threshold. The learning device may conduct an action associated with the reflex when the weight associated with the reflex exceeds the threshold. For example, a learning device may perform an action to turn on a light, tune a stereo system to a particular radio station, or take any other action that the learning device is capable of performing. In some embodiments, the learning device may identify a trigger pattern by generating the trigger pattern with one or more events in the memory. While in the triggered mode, the learning device may continue to generate events based on received event report messages or detected occurrence data. If at least one additional event (or pattern of events) obtained while in the trigger mode corresponds to a predetermined correction pattern or a predetermined reward pattern corresponding to the reflex associated with the identified trigger pattern, then the learning device may adjust one or more trigger weights associated with the reflex. For example, if the additional event corresponds to a correction pattern, the learning device may reduce the trigger weights of the reflex associated with an identified trigger pattern. However, if the additional event does not correspond to a known trigger pattern, correction pattern, or reward pattern, the learning device may create a new reflex with a trigger pattern based on the additional event(s), as well as a copy of the predefined action, correction pattern, and reward pattern of the reflex related to the triggered mode. In some embodiments, the learning device may be configured to adjust various parameters associated with the reflex and/or its trigger weight, such as scaling factors or weighting values associated with equations for calculating trigger weights if at least one additional event (or pattern of events) obtained while in the trigger mode corresponds to a predetermined correction pattern or a predetermined reward pattern corresponding to the reflex associated with the identified trigger pattern.

In some embodiments, the learning device may not conduct an action upon identifying a trigger pattern of a reflex when the trigger weights associated with the reflex are not above a predefined threshold. This threshold and the process of incrementally increasing trigger weights function to enable learning devices to learn from repetition and avoid inadvertent learning (i.e., learning from random or inadvertent events to perform undesired functions). For example, if the learning device is a smart lamp, the smart lamp may generate an event based on an event report message received from a nearby new wall switch (e.g., a new wall switch "toggle on" event), and identify the event as matching a trigger pattern associated with a reflex stored on the smart lamp. However, the smart lamp may have initially set the trigger weight of the reflex below a threshold to keep the smart lamp from learning to performing its action (e.g., turn on) until additional event report messages are received from the nearby wall switch. Thus, the smart lamp may not conduct the predefined action of the reflex upon identifying the trigger pattern until a sufficient number of event patterns have been observed that match the trigger pattern, bringing the associated trigger weight of the reflex above the predefined threshold.

Regardless of whether a learning device is in a monitor mode or a triggered mode, the learning device may continuously obtain locally-observed occurrence data and/or receive event report messages to generate events that are temporarily stored in a memory (e.g., a buffer memory). For example, if the learning device is a smart lamp, a user may turn the smart lamp on by toggling a lamp switch, and in response to such a toggle, the smart lamp may generate an 'on' event. In some embodiments, the learning device may retrieve prior events from the memory while in the triggered mode. The learning device may determine whether one or more of the events stored in the memory match a correction pattern or a reward pattern to allow the learning device to learn to automatically perform predefined tasks or reflexes by adjusting trigger weights of the reflexes. Some patterns may have defined orders of events (referred to as order-dependent event patterns) and other patterns may have no defined order of events (referred to as order-independent event patterns). Thus, the learning device may be trained using events in an order-independent (or alternatively order-dependent) manner. For example, the learning device associated with the lamp may be trained to cause the lamp to react to the wall switch 'on' event in response to either observing a first 'on' event from a wall switch and then a second 'on' event from a lamp switch, or observing the second 'on' event from the lamp switch and then the first 'on' event from the wall switch.

In some embodiments, the learning device may be configured to utilize a time window during which events remain stored in the memory for evaluation and after which events may be deleted from the memory. The learning device may remove events and/or patterns from the memory after the time since generating the event and/or the associated pattern has exceeded the time window (e.g., 5-10 seconds, etc.). This time window enables the learning device to correlate two or more events or patterns that occur relatively close together, including correlating of events regardless of their order of perception. Thus, a learning device may learn to perform an action in response to encountering a particular trigger, even when an event or pattern associated with that action is observed before an event or pattern of the particular trigger. For example, a user may train a learning device coupled to a lamp to turn on the lamp in response to receiving an event report message indicating an "on" state from a learning device coupled to a wall switch, even when the user turns the lamp on just before flipping the wall switch to 'on,' provided the two events fall within the time window of the memory. In some embodiments, the learning device may observe multiple trigger patterns of one or more events within a single time window (e.g., 5-10 seconds, etc.).

As indicated above, the learning device may generate events based on remotely observed occurrence data received via event report messages. For example, a second learning device such as a smart wall switch may be toggled to the 'on' position and may broadcast an event report message including occurrence data indicating the 'on' state, and upon receipt, a first learning device (e.g., a smart lamp) may generate an 'on' event based on the occurrence data from the received event report message. In this way, an embodiment method for controlling devices in a location may be enabled whereby a first learning device may be configured to locally obtain occurrence data, make decisions based on events it generates based on the obtained occurrence data, and take actions such as generating other events at the first learning device as well as broadcasting event report messages that may be received by a second learning device, causing the second device to make a decision and take action. In some embodiments, the learning device may receive event report messages or other signals that may be converted into events and patterns from non-learning devices through a wired or wireless communication. For example, a wall switch may have a transmitter that wirelessly emits one signal when it is toggled on and a different signal when it is toggled off. In this manner, learning devices may receive signals from non-learning devices and learn to associate actions with events generated based on the signals received from these devices.

In some embodiments, multiple learning devices in a decentralized system may store reflexes having a similar trigger pattern, and so that they may be configured to conduct their respective actions in response to obtaining the same occurrence data and generating the same event. For example, a single toggle of a wall switch may cause a floor lamp to turn on, a stereo to turn on, and a television to turn on. In some embodiments, two different learning devices may detect or receive the same occurrence data, and in response, individually take actions and generate subsequent occurrence data that may be communicated to each other in event report messages. For example, in response to receiving the same original event response message, a first learning device may perform a first action and generate a first event response message while the second learning device simultaneously performs a second action and generates a second event response message. In this situation, the first learning device may receive the second event response message and the second learning device may receive the first event response message and each may take a further action (or not)

in response based upon previously learned reflexes. It should be appreciated that a first learning device may be configured to broadcast an event report message including occurrence data that may be processed as either a correction pattern or reward pattern by a second learning device.

Embodiment learning devices may include or be included within toys or entertainment products. In particular, an embodiment learning device may be a child's toy that is a closed-loop system including various motors for driving physical functionalities, sensors for detecting light sensor data, user input elements (e.g., buttons), and a processor coupled to the other components and configured to process inputs and sensor data from the sensors to create reflexes and/or trigger action patterns of stored reflexes. For example, a learning device may be a toy car that includes sensors for detecting whether the toy car is on top of (or in front of) a white or black color of a floor, motors for rotating left and right wheels independently, a processor, a left wheel motor button that activates the rotation of a left wheel via a corresponding motor, and a right wheel motor button that activates the rotation of a right wheel via a corresponding motor. Initially, the toy car may not be configured with reflexes that cause the wheels to be rotated based on any sensor data from the sensors. However, a user may create a first reflex by pressing the left wheel motor button when sensor data is obtained that indicates a white color on the floor (i.e., when the toy car is over a mostly white surface of the floor). With the first created reflex, the toy car may activate the left wheel motor (and thus rotate the left wheel) when subsequently obtained sensor data indicates the toy car is over a mostly white surface of the floor. The user may also create a second reflex by pressing the right wheel motor button when sensor data is obtained that indicates a black color on the floor (i.e., when the toy car is over a mostly black surface of the floor). Thus, with the second reflex, the toy car may be trained to activate the right wheel motor (and thus rotate the right wheel) when sensor data is obtained that indicates a black color on the floor (i.e., when the toy car is over a mostly black surface of the floor). In other words, the first and second reflexes may cause the toy car to move based only on the predominant color on the floor at a given time and without the user pressing any motor buttons. In this way, the user may train the toy car to follow a black line painted on an otherwise white floor, simply by training the toy car to trigger a left or right wheel rotation action pattern with a white or black sensor data event pattern.

In various embodiments, learning devices may utilize a regular, periodic timing mechanism to determine whether events are obtained (e.g., sensor data from coupled sensors has been received, etc.). Such a mechanism may be like a "heartbeat" that regularly causes the learning devices to perform operations of their reflexes in response to trigger patterns. For example, the toy car learning device described above may be configured to evaluate whether it is on top of a black or a white section of the floor at a regular interval or "heartbeat," thus causing the toy car to be moved via the rotating wheels in a regular manner. In some embodiments, learning devices may poll one or more sensors based on one or more periodic timing mechanisms or "heartbeats" (e.g., request current sensor data every few milliseconds, etc.). For example, a learning device may transmit requests at a predefined interval that causes one or more sensor units that are coupled to the learning device via wired or wireless connections to generate event report messages. In various embodiments, learning devices may utilize different periodic timing mechanisms (or "heartbeats") for different evaluations. For example, a learning device may implement a first "heartbeat" mechanism that causes the learning device to evaluate a first type of input (e.g., incoming light sensor data) at a first frequency (e.g., every few milliseconds, etc.) and a second "heartbeat" mechanism that causes the learning device to evaluate a second type of input (e.g., received messages from other devices, etc.) at a second frequency (e.g., every second, etc.). In some embodiments, periodic timing mechanisms or "heartbeats" may span multiple wired or wireless learning devices and/or reporters, such as sensor units. For example, a first and second learning device may utilize a singular timing mechanism (e.g., a synched "heartbeat") for obtaining events internally and/or for request up-to-date information (e.g., via event report messages) from other external devices, such as other nearby learning devices or sensors.

In some embodiments, out-of-band techniques may be used to adjust learning devices within a decentralized system when the learning devices are operating incorrectly or unexpectedly. In particular, to conduct debugging, provisioning, diagnostics, or calibration operations, such as changing a learning device state (e.g., a system variable, etc.) or a learned behavior (e.g., a stored reflex), non-learning devices outside of the decentralized system may exchange communications with learning devices to query and/or adjust weights, gains, and/or other stored settings. For example, a learning device may be configured to receive communications via out-of-band wired or wireless signaling (e.g., Bluetooth, WiFi, etc.) from a debugging device that cause the learning device to adjust weight generation properties (e.g., gains, etc.) for various stored reflexes. As another example, a debugging device may exchange communications with a learning device to learn (or "peer into") the current state of reflexes (e.g., trigger weights, gains, etc.) stored on the learning device. Embodiment out-of-band techniques may include transmitting communications from devices using programmatic and/or graphical user interface (GUI) interfaces for adjusting behaviors of learning devices without using occurrence data (or event report messages). In other words, communications transmitted by devices at a factory or other off-site location, such as manufacturer devices, and/or devices located nearby learning devices, such as on-site technician devices, may be capable of immediately correcting erroneous data within learning devices without requiring users to perform repetitive activities (e.g., flipping switches to adjust trigger weights, etc.).

Through these mechanisms of learning responses to events and broadcasting event messages for reception by other learning devices, various embodiments provide a decentralized, distributed system of learning devices that may learn from user interactions over time within without the need for direct programming or interactions with a programming interface. Embodiment decentralized systems do not require a main controller or other central unit to perform any learning operations. In particular, the embodiment systems do not utilize a single device to identify patterns of events to be correlated to the actions of other devices. Instead, each learning device in some embodiments decentralized system may be configured to monitor for events and learn independently from other learning devices in the system, determining only whether its particular actions should be performed in response to detecting events relevant to itself. Thus, the embodiments utilize techniques that observe and correlate events to trigger actions to cause individual learning devices in a system to learn to control their own behaviors based on their own reception of events and triggers.

Various embodiments may be further distinguished from conventional automation systems using machine learning in that the embodiment techniques utilize reflexes to uniquely trigger predefined actions of individual learning devices. Conventional techniques may not separate triggers from actions, but may merely identify a sequence of related occurrences. Such conventional techniques observe events occurring in a sequence and cause operations of the sequence to be performed by devices whenever one or more of the events of the sequence are subsequently detected. Thus, as the presence of different events within a known sequence may cause the performance of the various remainder actions of the sequence, conventional techniques may not be considered to utilize defined actions that occur in response to defined triggers (i.e., separately-defined triggers and actions), as is described in this disclosure. In other words, the embodiment techniques may not learn new sequences of actions to perform based on observed events, but instead may only learn to associate new triggers with predefined actions.

Further, conventional techniques may replace or rewrite associations between events when devices of a system are used in different ways over time. For example, conventional techniques may overwrite a first sequence of events with a second sequence of events when the second sequence is a variation of the first sequence (e.g., a variation that is more recently or more frequently observed in a system). Various embodiments differ from such conventional techniques, as individual embodiment learning devices may generate multiple reflexes that each may associate a different trigger (or trigger pattern) with the same action to be performed by the learning device. In other words, instead of rewriting or replacing observed associations based on observed event variations, embodiment learning devices may store additional associations to trigger their predefined functionalities. For example, a learning device may store a first reflex that associates a wall switch 'on' event with a lamp light action (e.g., turn on) and a second reflex that associates a stereo power-on event with the lamp light action (e.g., turn on). This is beneficial as multiple reflexes that associate different triggers with the same action may enable preferred responses of a learning device for different users or the same user but under different circumstances. For example, a learning device may store different reflexes to accommodate a first user who desires a light to turn on when a wall switch is flipped and a second user who desires the light to turn on when a stereo is powered on and a desk lamp is turned on.

Various embodiments also implement a unique process of learning (e.g., observing and correlating events to trigger actions) for learning devices. In particular, various embodiments may utilize predefined correction and reward patterns to adjust the viability of reflexes on-the-fly. In response to repeatedly detecting a predefined correction pattern, a learning device may incrementally adjust a weight associated with a related reflex until eventually its predefined action may not be performed when an associated trigger pattern is subsequently detected. Thus, the reflex pattern may remain in memory of the device but the related reflex may no longer be performed as the learning device has effectively unlearned the reflex. At a later time, the reflex pattern may be reactivated by the user repeating the pattern of events and actions, which the learning device may observe and in response adjust weights of the related reflex until its associated weight will trigger an action when the event is observed. Similarly, in response to repeatedly detecting a predefined reward pattern, the learning device may incrementally adjust weights of the reflex so that the predefined action may be performed when the associated trigger pattern is subsequently detected. In other words, the embodiment techniques may nullify associations in reflexes based on corrective information without overwriting or removing the nullified associations based on subsequently encountered (or stored) events, leaving these reflexes stored in memory so they may be revived with subsequently received reward patterns.

In some embodiments, reflexes or other data may be removed from memory when necessary to make room for storing new reflexes. For example, in order to add a new reflex having a previously unknown trigger element for a predefined action, an already existing reflex may be removed or deleted from a full memory. However, such removal of a reflex from a learning device's memory may be procedural and based on a garbage collection policy (e.g., remove least frequently used or oldest reflex, etc.), and thus not in response to receiving a variation or update of the associations indicated in the reflex.

The various embodiments utilize explicit correction, reward, and action patterns that are predefined and static for each reflex (or action) of an individual learning device, and thus re-weighting triggers for reflexes is a direct procedure that does not require analysis of other events that may or may not be relevant to the associated reflexes. The predefined reward and correction patterns ensure that the learning of individual learning devices is supervised by users and responsive to user preferences/expectations, and not merely based on aggregated occurrences over time. Further, the embodiment learning devices may adjust an existing reflex based on reward or correction patterns that are detected in response to determining that the action associated with the existing reflex has been performed. In other words, weights for trigger patterns are increased or decreased only after the actions associated with the trigger patterns are actually performed and the related correction or reward patterns are generated based on obtained occurrence data. For example, when an action is performed in response to observing a trigger pattern, a user may press a "correction" button on the learning device to indicate that the user does not prefer the association of the action and the trigger. This method of learning is different from conventional techniques that may require users to confirm the correctness of associations between triggers and actions prior to the actions being performed.

Further, the various embodiment techniques enable "fast" training times of learning devices in which learning devices may generate associations between triggers and actions "on the fly." Most conventional machine learning techniques require "offline" learning, such as techniques that may train a target device by first using another machine to generate or program new programming (or instructions) and then updating the target device with the new programming at a separate time. Such conventional techniques may provide inferior training experiences for simple, trainable associations of devices. For example, if a user wanted a new behavior in a device, but a conventional training procedure required a prolonged period (e.g., hours) for programming and/or updating of the device to enact behavior changes, the user may lose his/her train of thought, become confused, or lose interest. The various embodiment techniques do not require such "offline" learning, as the reflex creation techniques and reward/correction mechanisms described herein allow for fast training of a learning device based on obtained events (e.g., signals from other learning devices, data from sensors attached to the learning device, etc.). Thus, the various embodiment techniques enable learning device training in a time that makes sense for people and seems intuitive.

In the following descriptions, learning devices may be referred to as a smart box or smart boxes, which are particular embodiments of learning devices having the components described below with reference to FIGS. 1C and 2. However, it should be appreciated that other learning devices or smart devices having similar components and functionalities may also be configured to utilize various embodiments as described in this disclosure.

FIG. 1A illustrates an embodiment system 100 in which various devices 102, 104, 106, 114, 115, 116 may be controlled by smart boxes 103a-103e that send and receive signals to each other. The signals communicated between the smart boxes 103a-103e may include data or other information that enables each smart box to recognize a signal as being related to the occurrence of a particular action or condition within the system 100. In particular, the smart boxes 103a-103e may broadcast, via radio frequency (RF) transmissions 112 or wireless communication links, event report messages that include occurrence data as described below with reference to FIG. 3A. The smart boxes 103a-103e may alternatively or additionally communicate with each other via wire connections, light, sound, or combinations of such media.

As an example, a system 100 enabled by various embodiments may include a wall switch 102 connected to a smart box 103a that transmit signals which enable the wall switch 102 to control responses by other devices (e.g., to turn on a floor lamp 104). The wall switch 102 may be connected to the smart box 103a by a wired connection 110, or the smart box 103a and the wall switch 102 may be combined into a single unit. When the wall switch 102 is toggled, its associated smart box 103a may detect this change in state and emit an event report message via an RF transmission 112, which may be received by any of the other smart boxes 103b-103e within a radius of the transmitting smart box 103a. One such receiving smart box 103b may be connected to the floor lamp 104 via wired connection 110b. By way of example, the floor lamp smart box 103b may be trained to respond to an event report message corresponding to the wall switch 102 being moved to the 'on' position by generating an event that causes the floor lamp 104 to be turned on. When the floor lamp 104 is turned on, its smart box 103b may broadcast event report messages that include occurrence data indicating the event and that may be received by other nearby smart boxes 103c-103e as well as the smart box 103a connected to the wall switch 102. Alternatively or in addition, the smart boxes 103a, 103c-103e may include a light sensor that may sense the light from the floor lamp 104 so that turning on of the lamp may be treated as a signal indicating an occurrence/condition/action.

As illustrated in FIG. 1A, a variety of devices may be coupled to the smart boxes, such as a desk lamp 115, a stereo 106, a mobile phone 114, and a sensor 116. Although the smart boxes 103a-103e are shown to be separate from the individual devices 102, 104, 115, 116, each device may include an internal smart box, and a smart box within one device may be coupled to a separate device. For ease of description, any reference to the floor lamp 104, the wall switch 102, the desk lamp 115, the sensor 116, and the stereo 106 may also refer to its corresponding smart box unless otherwise stated.

Although not shown in FIG. 1A, non-learning devices may be included in the system 100 to transmit signals (i.e., event report messages) that may be received and processed by the other learning devices or smart boxes throughout the system. For example, the wall switch 102 may have a transmitter in lieu of the shown smart box 103a. When toggled on, the wall switch may send an encoded 'on' signal (e.g., a one-bit event report message) and when the wall switch is toggled off, it may send a different encoded 'off' signal (e.g., a two-bit event report message). Another smart box in the system (e.g., smart box 103b connected to the floor lamp 104) may receive either signal and convert this to an event, which may correspond to an associated action of a stored reflex.

A smart box may typically be configured to broadcast or otherwise transmit event report messages indicating events at the smart box, such as actions performed at or by the smart box and/or conditions detected at the smart box (e.g., sensor data). For example, a smart box or a transmitter (a "reporter") wirelessly connected to the smart box may broadcast a signal including data that indicates that a garage door has been opened. It should appreciated that a smart box may not typically be configured to directly engage with other smart boxes in a location, but instead may merely report occurrence data without soliciting responses and/or without consideration of the operations of other devices. However, in some embodiments, smart boxes may directly communicate with each other via such transmissions 112. For example, a new smart box placed within a location (e.g., a home, office, etc.) may transmit signals to other learning devices within the location to ask for data indicating their favorite (or most frequently encountered) events, and in response to receiving response signals from the other devices, the new smart box may be configured to set a bias.

Figure 1B:
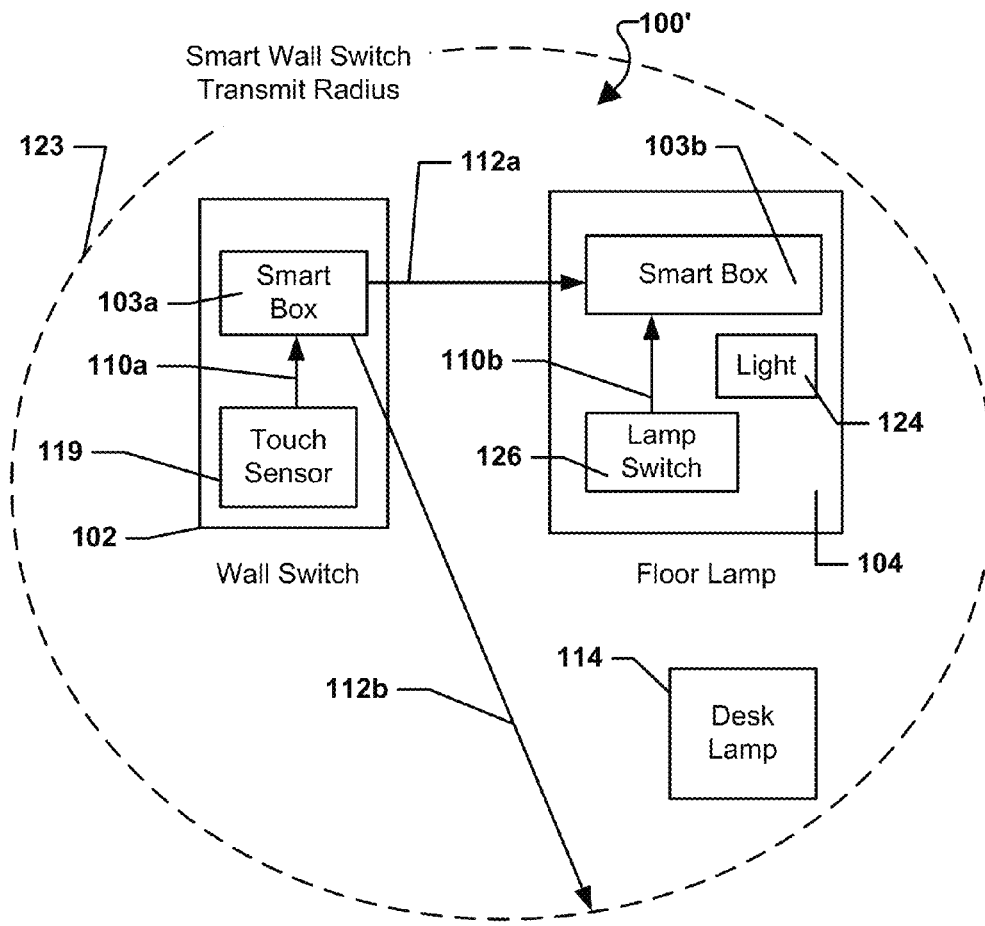

FIG. 1B illustrates that a wall switch 102 in a system 100' may be connected to a smart box 103a, either internally or by another connection such as a wired connection 110a. The wall switch 102 may have a touch sensor 119 or toggle. When the touch sensor 119 is touched or toggled (e.g., the wall switch 102 is turned on), a state change may be communicated as occurrence data to the smart box 103a via the wired connection 110a. The smart box 103a may interpret the state change indicated by the occurrence data as an event and wirelessly transmit an event report message associated with the event, such as by RF transmissions 112a, 112b. The event report message may be received by any smart box within the reception range 123 of the wall switch 102. In some embodiments, the floor lamp 104 may include or be coupled to a smart box 103b that receives the RF transmission 112a. Some time after receiving the event report message via the RF transmission 112a, the lamp switch 126 on the floor lamp 104 may be switched on by a user, thus turning on the light 124. The floor lamp 104 may signal to its smart box 103b that it is now in the 'on' state, and the smart box 103b may interpret this signal as occurrence data. This signal may be transmitted by a wired connection 110b between the lamp switch 126 and the smart box 103b, or wirelessly (e.g., via a Bluetooth® data link). When the smart box 103b includes a switch that energizes the lamp, this signaling may be the actuation of this switch.

In various embodiments, the smart box 103b associated with the floor lamp 104 may be trained to energize or cause the floor lamp 104 to turn on in response to receiving a toggle signal (i.e., an event report message including occurrence data indicating the toggle action) from the wall switch smart box 103a by the user manually turning on the floor lamp 104 just before or soon after toggling the wall switch 102 (e.g., within 5-10 seconds). To accomplish such learning, the smart box 103b may recognize when the events related to the wall switch toggle (as reported in the event report message) and the activation of the floor lamp 104 (as reported via occurrence data obtained from the floor lamp 104) occur within a predetermined window of time. This may be accomplished at least in part by temporarily storing (i.e., buffering) events generated from obtained occurrence data for the predetermined window of time, processing and correlating events stored in the memory, and deleting events from the memory after that time. For example, the smart box 103*b* connected to the floor lamp 104 may associate the 'on' event of the wall switch 102 with the 'on' event of the lamp switch 126 of the floor lamp 104 when the two events are generated or occur within the predetermined window of time, in effect learning that future wall switch 102 'on' events should trigger the activation of the floor lamp 104. In some embodiments, the order of events may be significant, while in some embodiments, the order of events may not matter, and so the order of events may be reversed so long as the events occur (or are generated) within the predetermined window of time. For example, the smart box 103*a* connected to the wall switch 102 may associate the 'on' event of lamp switch 126 of the floor lamp 104 with the subsequent 'on' event of the wall switch 102 (e.g., a touch to the touch sensor 119), in effect still learning that future wall switch 102 'on' events should trigger the activation of the floor lamp 104. As described in more detail below, such training may require some repetition to avoid inadvertent learning of undesired behaviors.

Figure 1C:
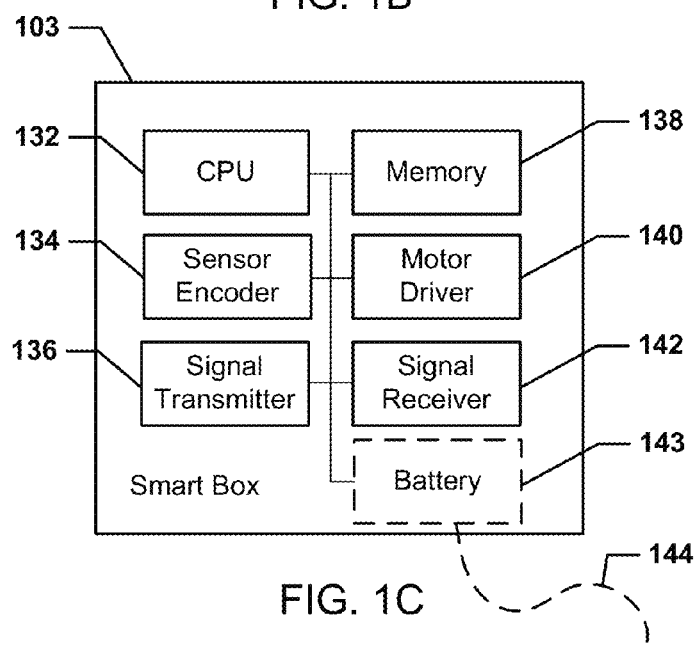
FIG. 1C is a component block diagram of an embodiment learning device.

As illustrated in FIG. 1C, an embodiment smart box 103 may include a processor 132 (referred to in FIG. 1C as a central processor unit (CPU)) configured to process event report messages received from a signal receiver 142. The smart box 103 may include a signal transmitter 136 configured to transmit occurrence data in event report messages via RF signals that may be received by other learning devices or smart boxes. As described above, the occurrence data within such event report messages may define or characterize an encountered condition or performed action at the smart box 103 (i.e., event report messages may characterize the events generated at the smart box 103). Further, via its signal receiver 142, the smart box 103 may receive event report messages via similar transmitted RF signals from other devices, and may save received occurrence data from received signals as events in a buffer in memory 138 using a data structure as described below. In some embodiments, the memory 138 may include an amount (e.g., 32 Kilobytes (KB), 64 KB, etc.) of storage (e.g., random access memory (RAM), flash, etc.) for storing reflexes having associated patterns as described throughout this disclosure. The embodiment smart box 103 may include a sensor encoder 134 to obtain occurrence data indicating changes in states detected by the smart box 103. For example, if the smart box 103 is connected to a floor lamp and the floor lamp is turned on, a sensor encoder 134 in the connected smart box 103 may generate occurrence data to digitally identify or map the change in state. This occurrence data may be stored in memory 138 of the smart box 103 and broadcast within event report messages for other learning devices (e.g., smart boxes) within its broadcast range. Other learning devices may receive event report messages including occurrence data through their signal receivers, and eventually process related events by various learning algorithms described herein. In some embodiments, the memory 138 may include volatile random access memory (RAM) unit(s) and non-volatile flash memory unit(s). In such embodiments, the RAM units may be used to operate the various functions of the smart box 103 and the flash units may be used to store persistent data (e.g., reflexes, etc.) and log data (e.g., obtained events, signals, etc.). In some embodiments, reflexes (as described below) may not be stored in flash memory but instead may be stored in volatile RAM in order to promote efficient and easy resetting of learned behaviors (e.g., reset to an untrained state by turning off power and erase all reflexes in RAM). In some embodiments, the flash memory may vary in size and otherwise may be optional. For example, the flash memory may be a 64 MB storage unit equal to a 64 MB RAM unit, both included within the memory 138 as represented in FIG. 1C.

Additionally, the smart box 103 may include a motor driver 140 to perform physical actions on a connected device as a learned reflex action in response to a correlated trigger. For example, if the smart box 103 is connected to a floor lamp and determines based on an event generated in response to a received event report message that the floor lamp should turn on, the processor 132 of the smart box 103 may signal the motor driver 140 to actuate a power switch on the floor lamp. Instead of (or in addition to) a motor driver 140, the smart box 103 may include a relay configured to connect an appliance to an external power supply (e.g., 120 V AC power) as a learned reflex action in response to a correlated trigger.

In some embodiments, the smart box 103 may include a battery 143 (e.g., a rechargeable lithium-ion battery, etc.) coupled to components of the smart box 103. In some embodiments, the smart box 103 may additionally include a wire or other interface 144 (e.g., plugs or prongs for connecting to an alternating current (AC) power outlet, etc.) for receiving electrical current for charging the rechargeable battery 143 or otherwise providing power to the various components of the smart box 103.

Figure 2:
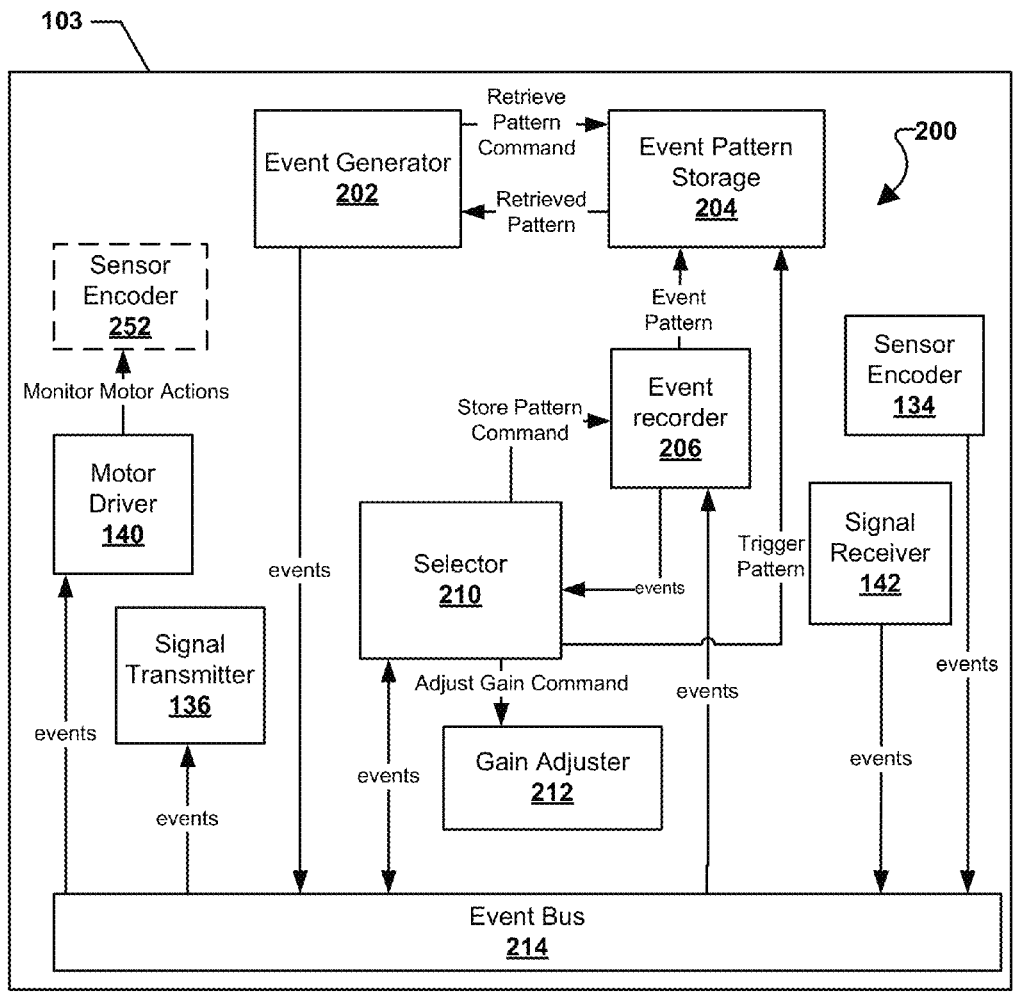
FIG. 2 is a component block diagram of an embodiment learning device.

FIG. 2 illustrates an embodiment architecture 200 of a smart box 103 showing an example of how the various functional components may be coupled together or communicate in order to learn new behaviors from events and perform learned behaviors in response to subsequent events. A smart box 103 may include an event generator 202, a sensor encoder 134, and a signal receiver 142. The event generator 202 may generate an event or a sequence of one or more events in response to receiving data indicating a known event pattern (e.g., a previously learned or a preprogrammed pattern). For example, if a pattern of events is associated with a predefined action of turning on a floor lamp connected to the smart box 103, then the event generator 202 may generate a "lamp-on" event in response to matching an event generated from occurrence data received within a signal with a pattern stored in an event pattern storage 204. The generated event is then communicated via the event bus 214 to the motor driver 140 to turn on the light of the floor lamp connected to the smart box 103.

The smart box 103 may also receive occurrence data within signals (e.g., event report messages) from another smart box via a signal receiver 142. Data from signals received by the signal receiver 142 may be transported as events to other device components via the event bus 214, such as to the event recorder 206.

A smart box 103 may also recognize an event from the sensor encoder 134, which may communicate the event to other components via the event bus 214. For example, if a user manually turns on a floor lamp connected to the smart box 103, occurrence data indicating that change in state (e.g., turning the light from 'off' to 'on') may be digitally encoded by the sensor encoder 134 converting the change in state to an event.

A signal transmitter 136 may subsequently transmit occurrence data based on an event received via the event bus 214 so that the occurrence data may also be received by another smart box via event report messages. This may allow the transfer of information about events from one smart box 103 to another, allowing smart boxes to learn from each other and create complex system behaviors based upon behaviors learned by each respective smart box. The retransmission or broadcasting of data related to events (i.e., occurrence data in event report messages) may allow the smart boxes to be daisy-chained together extending the signal range of a given smart box.

The event recorder 206 may receive an event from the event bus 214 and save the event in event pattern storage 204. In some embodiments, the event recorder 206 may receive occurrence data and create an event based on the received data for storage in the event pattern storage 204. An event selector 210 may receive one or more events from the event recorder 206. In response to receiving a particular combination of events, the selector 210 may generate a store pattern command and send the store pattern command to the event recorder 206 instructing it to store the combination of events as a pattern in the event pattern storage 204. In some embodiments, the event selector 210 may receive events directly from the event bus 214.

The operations and interactions of the components with a smart box 103 are illustrated in the following example. A smart box 103 connected to a floor lamp may receive occurrence data indicating a change in state via an event report message from a wall switch, received at the smart box 103 through the signal receiver 142. The smart box 103 via the signal receiver 142 may communicate an event related to the wall switch change in state via the event bus 214 to the event recorder 206. Shortly thereafter, a user may manually turn on the light 124 of the floor lamp connected to the smart box 103, and in response the sensor encoder 134 may convert this change in state to an event and communicate the event via the event bus 214 to the event recorder 206. The event recorder 206 may send the events to the selector 210 as they are received. The selector 210 may process the pattern of events, generated based on the wall switch toggle and the floor lamp's manual on-light occurrence data, with a learning algorithm. After processing the events, the selector 210 may instruct the event recorder 206 to store the pattern of events in the event pattern storage 204 through a store pattern command. The event pattern storage 204 may store the learned association between events as a reflex with a particular weight association. In some embodiments, the event pattern storage 204 may store predetermined patterns and/or events as well, such as patterns or events used to generate correction patterns, reward patterns, trigger patterns, and action patterns.

Depending on the associations between observed events and actions, the selector 210 may work with a gain adjuster 212 to change the weight of an event (e.g., increase the trigger weight of the trigger event) associated with an observed action pattern (e.g., an observation that the user has turned on the floor lamp) and/or other properties related to the equations and/or calculations of weights (i.e., bias, scale, etc.) as described below.

Optionally, the sensor encoder 252 may provide additional events based on the commencement of an instructed action. These additional events may be a confirmation that an instructed event actually occurred (e.g., a light actually came on in response to an 'on' action being performed, etc.) and may be processed as reward events (or patterns) to help the smart box 103 learn associations between events and actions.

Figure 3A:
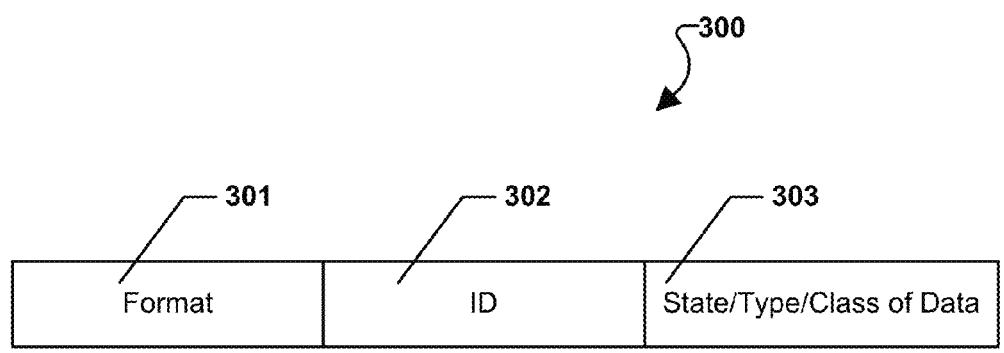
FIG. 3A is a component block diagram of an embodiment event report message structure with three components.

FIG. 3A illustrates a data structure 300 that may be used to characterize occurrence data. Occurrence data may be reflected in a data record to include a format component 301, an identification component 302, and a state component 303. The processor 132 (or CPU) of a smart box (e.g., as shown in FIG. 1C) may record decoding information as the format component 301. This may include a protocol version, an encryption type, a sequence number, a transaction identifier (e.g., information that may be used to differentiate between various occurrence data from the next without indication a direction, order, or sequence), a record time, a transmit time, etc. However, record time and transmit time may be optional fields in the format component 301. In some embodiments, transaction identifiers (or IDs) may not be contiguous in value or otherwise indicate an order numbers (e.g., increasing or decreasing in a sequence). As described above, a smart box may be configured to transmit signals (i.e., event report messages) that at least include the data structure 300, and other learning devices may be configured to receive such signals and use this format component 301 to read the rest of the occurrence data in the data structure 300. The identification component 302 may indicate a device that originated the occurrence data, and the state component 303 may correspond to the state or change in state that the occurrence data represents. In some embodiments, the state component 303 may include analog state data, such as volts (e.g., 0.02) in addition to operational states of devices (e.g., 'on', 'off', etc.).

For example, a data structure 300 for occurrence data may include a format component 301 of "V2.1", an identification component 302 of "WALLSWITCH102," and a state component 303 of "ON." This may represent a data format version of 2.1 on a smart box connected to the wall switch and may represent that the wall switch was toggled from 'off' to 'on.' Continuing this example, the occurrence data and an associated event may be generated at the wall switch (shown in FIG. 1A). Once generated, the occurrence data may be broadcast in an event report message from the smart box associated with the wall switch so that it may be received by all smart boxes within its broadcast range. A nearby smart box associated with the floor lamp may receive and process the broadcasted occurrence data. Since occurrence data may have similar data components as later described event data structure 350 (in FIG. 3 B), a receiving smart box may utilize the occurrence data to generate and decode events. This may help facilitate event filtering and pattern generation.

Figure 3B:
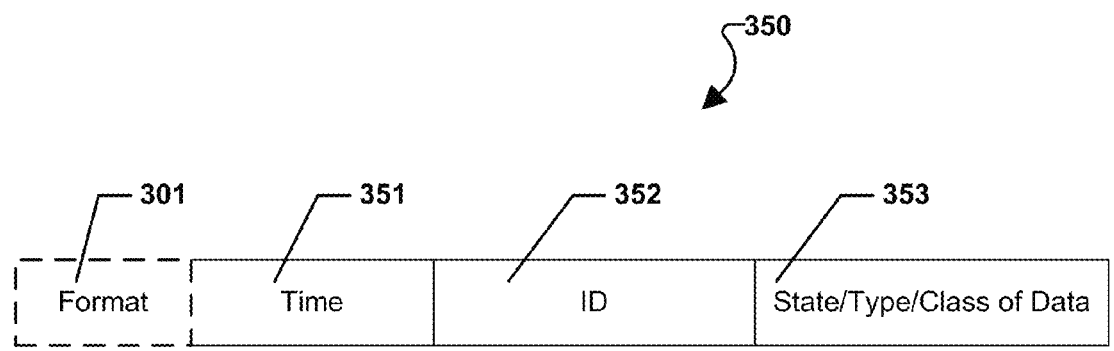
FIG. 3B is a component block diagram of an embodiment event data structure with three components.

FIG. 3B illustrates a data structure 350 that may be used to record or characterize an event. The data structure 350 may optionally include the format component 301 as described above. An event may be reflected in a data record to include a time component 351, an identification component 352, and a state component 353. Event data structures 350 are similar to the data structure 300 as described above in FIG. 3A with regards to occurrence data, and events may be generated at the same time as the occurrence data. The data structure 300 (i.e., occurrence data) may be used by smart boxes to generate the data structure 350 (i.e., events) and vice versa. When a smart box receives occurrence data for an event through any event-originating source (e.g., a signal receiver 142) it may store data characterizing the event in the event recorder 206, which may record the time component 351 associated with the event. The time component 351 may be the time that the event was created or observed by the receiving smart box. Alternatively, the time component 351 may indicate a time assigned by an originating smart box prior to transmitting the occurrence data of the event (i.e., the time an action was performed or a condition was observed, etc.). The identification component 352 may indicate a device that originated the occurrence data of the event, and the state component 353 may correspond to the state or change in state that the event represents.

For example, an event may include a time component 351 of 17:12:02, an identification component 352 of "WALLSWITCH102," and a state component of "ON." This may represent an event created at 17:12:02 on the smart box connected to the wall switch and may represent that the wall switch was toggled from 'off' to 'on.' Continuing this illustration, occurrence data describing such an event may be broadcast in an event report message from the smart box associated with the wall switch to any smart box within its broadcast range. The smart box associated with the floor lamp may receive the broadcasted event report message and process the included occurrence data to generate an event for processing with a learning algorithm as described below.

An event pattern may include one or more events obtained, generated, or otherwise encountered in a time window or sequence. For example, a particular event pattern may include a first event generated internally by a learning device (e.g., a smart floor lamp, etc.) and a second event obtained by the learning device in response to receiving a signal received from another device (e.g., a smart wall switch, etc.). As later described, event patterns may be trigger patterns, action patterns, correction patterns, or reward patterns. Regardless of which type, event patterns may be order-dependent, such that the order in which particular events are received constitutes a pattern. Alternatively, event patterns may be order-independent where the pattern is independent of the processing order for the events. For example, a first event (referred to as event A) may be obtained (e.g., generated based on received occurrence data) at time 0 and second and third events (referred to as event B and event C respectively) may be obtained simultaneously at a later time 1 (denoted as A:0, B:1, C:1). In an order-dependent pattern, the learning device may only recognize the pattern if event A is obtained first and events B and C are simultaneously obtained after event A (denoted as A:0, B:1, C:1). However, if event C is obtained at time 2 instead of time 1, then the pattern (A:0, B:1, C:2) may not equal the pattern A:0, B:1, C:1 because the event C was obtained at time 2 instead of time 1. Thus, the first pattern created by obtaining event C at time 1 (A:0, B:1, C:1) and the second pattern created by obtaining event C at time 2 (A:0, B:1, C:2) are different because the times for obtaining event C are different. In an order-independent pattern, the learning device may treat obtained events A:0, B:1, C:1 the same as obtained events A:0, B:1, C:2 because the time of C is not important so long as event C is obtained within the same predetermined time window as event A and event B. In other words, for order-independence, the same events merely need to be obtained within a particular time window. Time windows observed by smart boxes or learning devices are further described below with reference to FIGS. 3C-3H.

In some embodiments, multiple smart boxes or learning devices may generate patterns (e.g., trigger patterns and action patterns) and conduct actions based on a single event. For example a user may toggle the wall switch from 'off' to 'on' causing the wall switch to generate a single first event. Upon generating the first event, the wall switch may broadcast a related event report message wirelessly to all nearby learning devices. A first nearby learning device may be the floor lamp, for example, which may generate the first event based on the received event report message and convert it to a trigger pattern. In response to the trigger pattern, the floor lamp may generate an action pattern and activate the light based on the action pattern. Simultaneously, a nearby stereo may receive the same event report message and similarly generate the first event based on the received event report message, convert it to a trigger pattern, generate a different associated action pattern than the floor lamp, and play music based on the different action pattern. Thus, a single broadcasted event report message related to the first event in this example caused the floor lamp to activate its light and the stereo to play music.

In some embodiments, multiple smart boxes may generate action patterns and conduct corresponding actions based on receiving multiple event report messages related to multiple individual events. For example, a user may toggle the wall switch from FIG. 1A from 'off' to 'on' which generates the first event at the wall switch. The user may also toggle a lamp switch on the smart floor lamp from off to 'on' which causes the smart floor lamp to generate a second event at the smart floor lamp. Event report messages related to the first and second events (i.e., including occurrence data for the first and second events respectively) may be broadcast from their respective smart boxes within a 5-10 second time window. Still within the time window, a nearby smart stereo and a smart desk lamp may receive both event report messages related to the first and second events. The smart stereo may generate a trigger pattern and a corresponding action pattern based on receiving the event report messages related to the first and second events. The action pattern generation may cause the stereo to turn on and begin playing music, for example. Simultaneously, the smart desk lamp generates a trigger pattern and a different action pattern based on receiving the event report messages related to the same two events. Upon generating the action pattern, the smart desk lamp may turn on its light, for example.

FIGS. 3C-3H illustrate how various embodiment learning devices may use time window 362 that rolls over time to identify and/or correlate patterns of events. As described above, such a time window 362 may be a predetermined amount of time, such as a number of seconds (e.g., 5-10 seconds), that may provide a temporal limit on the events that may be eligible for being identified as patterns or parts of patterns at any given time. In other words, events occurring or obtained by the smart box within the time window 362 (e.g., events having a time component 351 as described above in FIG. 3B that falls within the time window 362), may be combined to generate patterns for use in triggering actions and/or adjusting trigger weights for reflexes as described below. In some embodiments, the smart box may be configured to remove obtained events from a memory, buffer, or other storage when such obtained events no longer fall within the predefined time window 362.

Figure 3C:
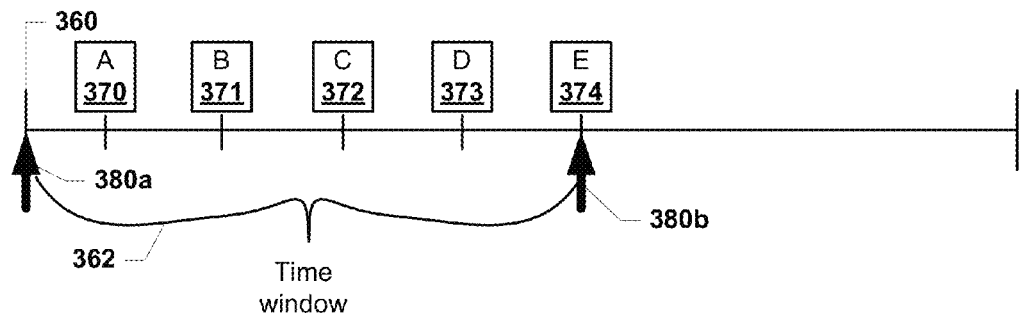
FIGS. 3C-3H are diagrams of exemplary time windows that may be utilized by a smart box (or learning device) to identify and/or correlate patterns of events suitable for use in various embodiments.

FIG. 3C shows the exemplary time window 362 against a timeline 360. Obtained or observed events 370-374 (referred to as events A-E in FIGS. 3C-3F) may have been encountered by the smart box within the time window 362 with reference to a first time 380a and a second time 380b. The length of the time window 362 may be the length of time between the first time 380a and the second time 380b. Thus, at the second time 380b, the smart box may use any of the obtained events 370-374 in any combination or order to generate patterns that may be matched to predefined patterns within stored reflexes. For example, the smart box may generate patterns using any combination and/or order of the events A-E, such as "A, B, C, D, E", "A, B, C, D," "A, B, C," "A, B" "A", "A, B, C, D, E", "A, C, E", "E, C, A", "A, E, C", etc.

Figure 3D:
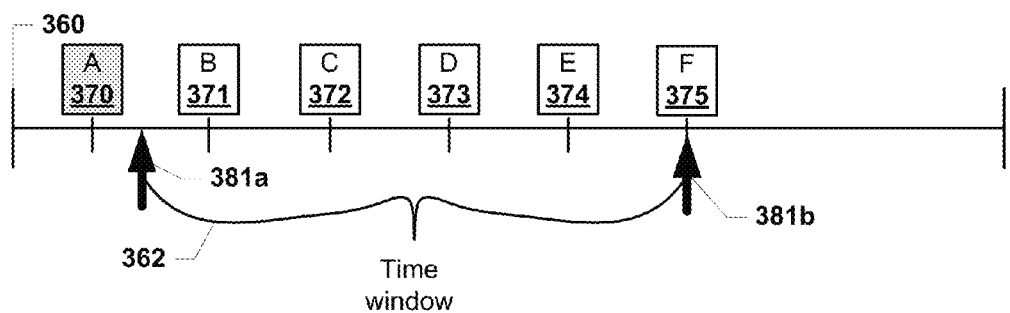

FIG. 3D illustrates the events 371-375 (referred to as events B-F in FIG. 3D) that are obtained in the time window 362 between a third time 381a and a fourth time 381b. For example, at the fourth time 381b, event 'A' 370 may no longer be within the time window 362 (i.e., event 'A' 370 may correspond to a time earlier than the third time 381a); however, any combination of the events B-F 371-375 may be combined to generate patterns that may match predefined information within reflexes stored on the smart box. In some embodiments, the event 'A' 370 may be deleted or otherwise removed from a memory, buffer, or other storage at the fourth time 381b.

Figure 3E:
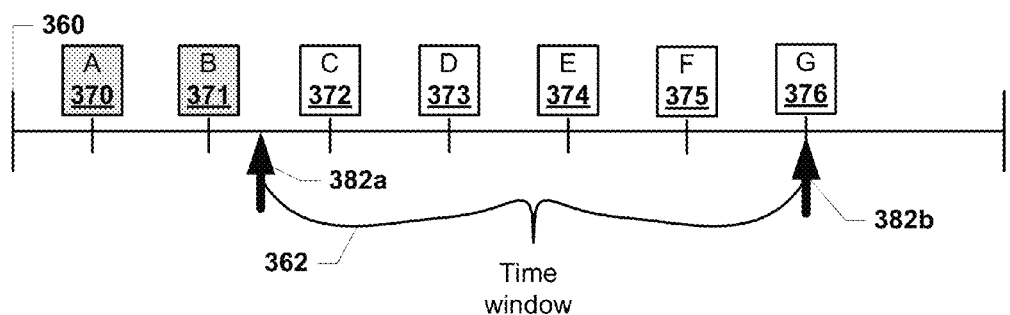

Similarly, FIG. 3E illustrates the events 372-376 (referred to as events C-G in FIG. 3E) that may be obtained by the smart box within the time window 362 between a fifth time 382a and a sixth time 382b. For example, at the sixth time 382b, event 'A' 370 and event 'B' 371 may no longer be within the time window 362; however, any combination of the events C-G 372-376 may be combined to generate patterns that may match predefined information within reflexes stored on the smart box. In some embodiments, the event 'B' 371 may be deleted or otherwise removed from a memory, buffer, or other storage at the sixth time 382 (i.e., when it falls outside the time window 362). The smart box may continue rolling (or progressing) the time window 362 in a similar fashion, continually evaluating events that fall within the time window 362 to determine whether they correspond to predefined patterns.

Figure 3F:
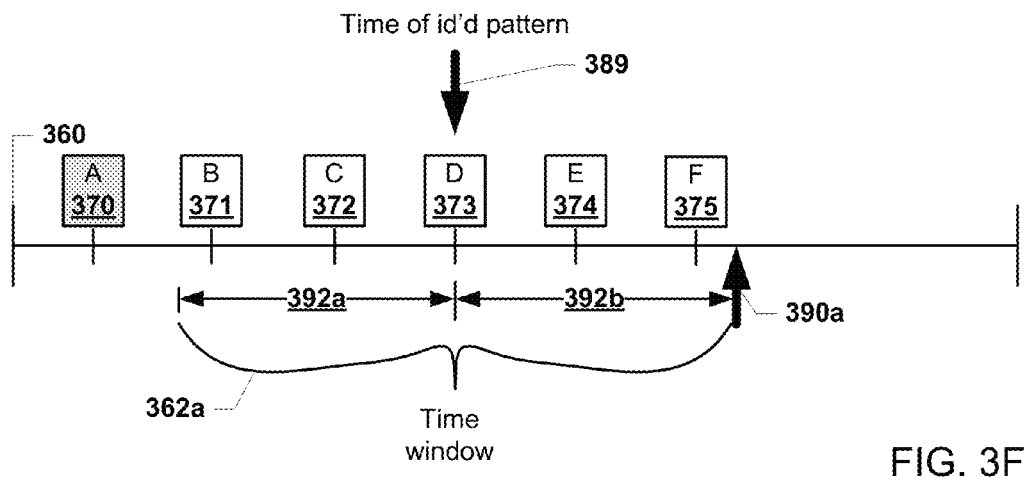
Figure 3G:
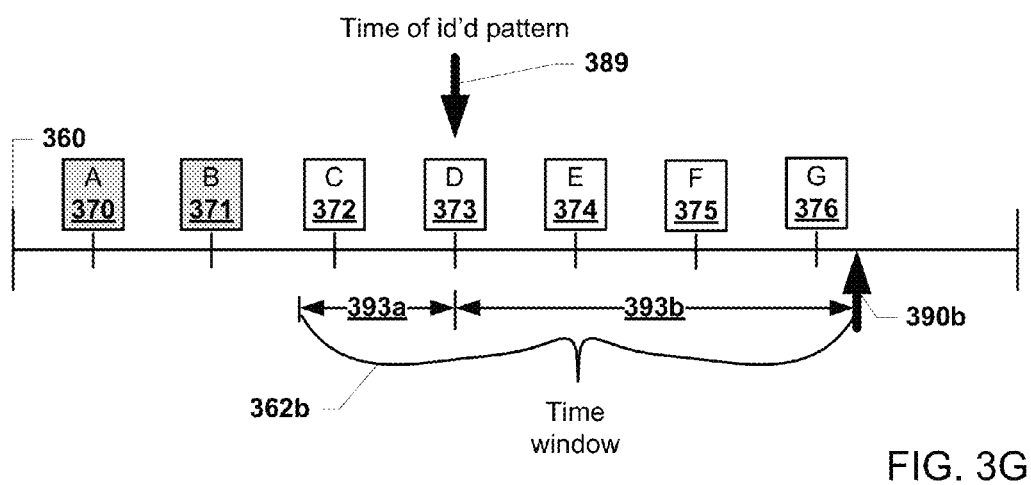
Figure 3H:
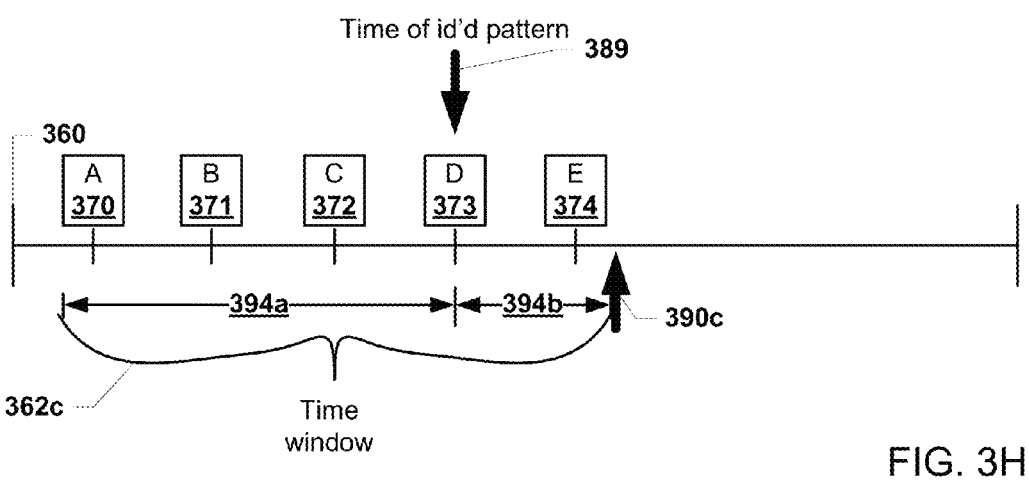

FIGS. 3F-3H illustrate various other exemplary time windows in relation to an identified pattern. As described herein, a smart box (or learning device) may correlate events, such as a floor lamp 'on' event or a wall switch 'on' event, to identified triggers or other patterns occurring within such predefined time windows. For example, in response to detecting the occurrence of a trigger pattern of a certain reflex (e.g., an obtained wall switch 'on' event), the smart box may determine whether a related reward pattern or correction pattern of the reflex also occurred within a time window of 5-10 seconds from the trigger pattern. The smart box may evaluate obtained events that are obtained before and/or after the identified pattern (e.g., trigger pattern) to determine whether a related pattern has also been encountered.

FIGS. 3F-3H illustrate various time windows 362a-362c relative to an identified pattern comprised of event 'D' 373 and a time 389 associated with the identified pattern (referred to as "Time of id'd pattern" in FIGS. 3F-3H). FIG. 3F illustrates a first time window 362a that is configured to include a first period 392a occurring before the time 389 associated with the identified pattern (i.e., event 'D' 373) and that is equal to a second period 392b occurring after the time 389 associated with the identified pattern. The smart box may be configured to obtain and store (or buffer) events that may be correlated to the identified pattern until a first end time 390a that occurs after the second period 392b has elapsed from the time 389 associated with the identified pattern. With the first period 392a and the second period 392b being of the same duration, an equal number of events may potentially be obtained within the periods 392a, 392b occurring before and after the time 389 associated with the identified pattern. In other words, with the first time window 362a, the smart box may be capable of correlating any or all of an event 'B' 371, an event 'C' 372, an event 'E' 374, and an event 'F' 375 with the identified pattern of event 'D' 373. As another example, the smart box may correlate the identified pattern of event 'D' 373 with a reward pattern that includes event 'B' 371 and event 'F' 375, etc.

FIG. 3G illustrates a second time window 362b that is configured to include a third period 393a occurring before the time 389 associated with the identified pattern (i.e., event 'D' 373) that is shorter (or smaller in time) than a fourth period 393b occurring after the time 389 associated with the identified pattern. The smart box may be configured to obtain and store (or buffer) events that may be correlated to the identified pattern until a second end time 390b that occurs after the fourth period 393b has elapsed from the time 389 associated with the identified pattern. Therefore, a greater number of events may potentially be obtained within the fourth period 393b occurring after the identified pattern. In other words, with the second time window 362b, the smart box may be capable of correlating any or all of the event 'C' 372, the event 'E' 374, the event 'F' 375, and an event 'G' 376 with the identified pattern of event 'D' 373. For example, the smart box may correlate the identified pattern of event 'D' 373 with a correction pattern that includes event 'C' 372, event 'E' 374, and event 'G' 376, etc.

FIG. 3H illustrates a third time window 362c that is configured to include a fifth period 394a occurring before the time 389 associated with the identified pattern (i.e., event 'D' 373) that is longer (or greater in time) than a sixth period 394b occurring after the time 389 associated with the identified pattern. The smart box may be configured to obtain and store (or buffer) events that may be correlated to the identified pattern until a third end time 390c that occurs after the sixth period 394b has elapsed from the time 389 associated with the identified pattern. Therefore, a greater number of events may potentially be obtained and stored within the fifth period 394a occurring before the identified pattern. In other words, with the third time window 362c, the smart box may be capable of correlating any or all of the event 'A' 370, event 'B' 371, the event 'C' 372, and the event 'E' 374 with the identified pattern of event 'D' 373. For example, the smart box may correlate the identified pattern of event 'D' 373 with a correction pattern that includes the event 'C' 372 and the event 'E' 374, etc.

Figure 4:
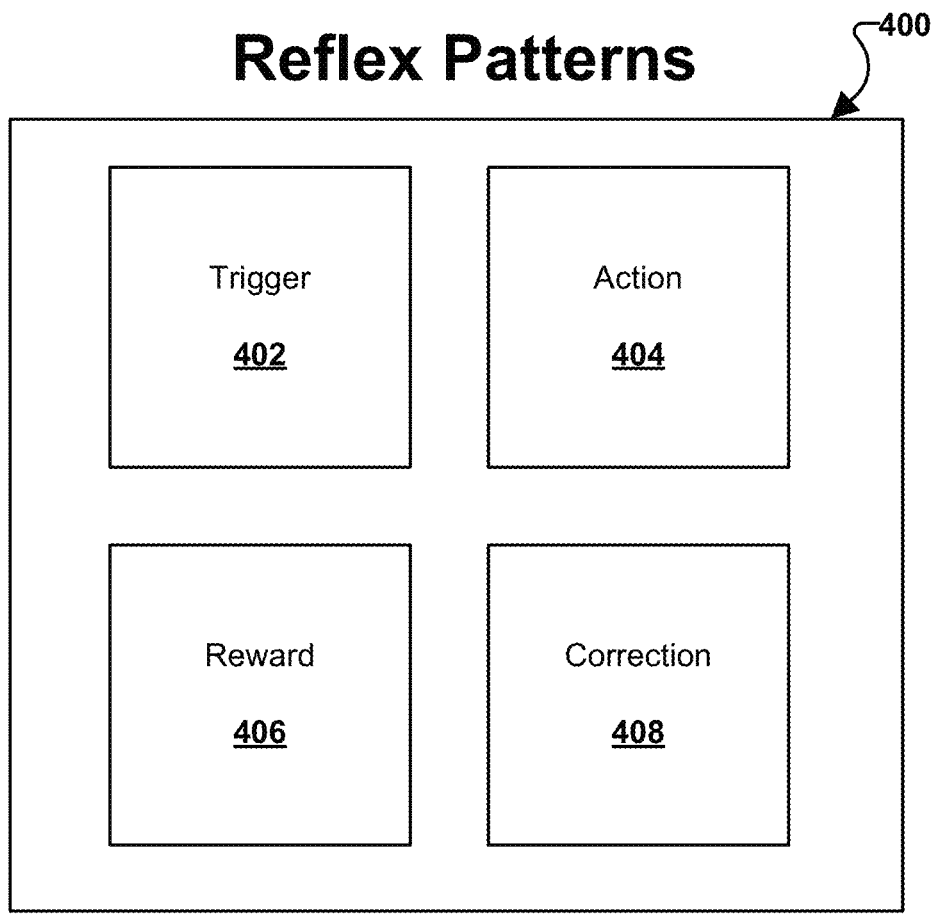
FIG. 4 is a component block diagram of an embodiment reflex that consists of four patterns.

As described above, a reflex may be stored information that indicates a predefined action that a smart box may take or initiate in response to detecting an associated trigger. As illustrated in FIG. 4, four patterns may make up a reflex 400, specifically a trigger pattern 402, an action pattern 404, a reward pattern 406, and a correction pattern 408. Patterns may include one or more events and events may be associated with data. However, in some embodiments, a pattern may be related to a 1-bit signal (e.g., an interrupt line goes high). For example, a 1-bit signal may be a reward signal that may be converted to a reward pattern and put on a logical event bus of a smart box. Such a 1-bit signal reward pattern may take the sensor encoder path, as described above, as an interrupt sensor may be a type of sensor encoder. Other pattern types (e.g., action, trigger, etc.) may also be defined by simple signals (e.g., 1-bit signals or interrupts).

When a smart box obtains an event (or multiple events) matching a known trigger pattern of a known reflex, the smart box may generate the corresponding action pattern 404. A reflex may have a predetermined reward pattern and a predetermined correction pattern. If a smart box receives a reward pattern when it is allowed to learn, the smart box may increase a weighting (i.e., the trigger weight) on the association between the trigger pattern 402 and the action pattern 404. Once the association weighting exceeds a threshold amount, the smart box will may execute the action pattern in response to the trigger pattern. Similarly, a reflex 400 may have a predetermined correction pattern 408, and if a smart box receives a correction pattern when it is allowed to learn, the smart box may decrease the association weighting between the trigger pattern 402 and the action pattern 404. Processing of the correction pattern 408 may modify the association weighting enough times that the association weighting may drop below the threshold amount and the smart box will effectively learn not to perform the action pattern 404 in response to the trigger pattern 402. In this manner, the smart box may learn the association between a trigger pattern 402 and a corresponding action pattern 404, and unlearn undesired trigger/action associations. In various embodiments, the correction pattern 408 and/or the reward pattern 406 may be obtained based on data received by the smart box from another smart box device, such as a nearby device emitting event report messages in response to performing an action, receiving an input, etc.

In some embodiments, a method of enabling an "allowed to learn" state (or a learning mode) for the smart box may be used to associate a predefined action pattern 404 of a reflex 400 of the smart box with a trigger pattern. Such a learning mode may be an operational state of the smart box during which the smart box may be enabled to change trigger weights of the reflex 400. Once an obtained pattern is matched to a trigger pattern 402 of a known reflex 400, the reflex may enter the learning mode. In other embodiments, the smart box may enter the learning mode when the action pattern 404 is generated. In other embodiments, the smart box may enter a global learning mode or state, which may be independent of triggers (e.g., turning on a learning switch) and during which the smart box may change trigger weights for various reflexes or otherwise generate new reflexes based on obtained events. In various embodiments, a reflex 400 may include data indicating the status of its various modes, such as bits, flags, or other indicators indicating whether the reflex 400 is in an active monitoring mode, triggered mode, learning mode, etc.

A smart box may be configured with one or more reflexes with action patterns for predetermined, known capabilities of the smart box. Although the smart box may utilize multiple reflexes with different corresponding actions, in some embodiments, the smart box may not be configured to perform actions outside of the static set of known capabilities or actions of the smart box, such as action patterns indicated in data provided by a manufacturer. Thus, the smart box may be configured to generate new reflexes with unknown triggers correlated to known actions, but may not be configured to generate new reflexes with actions that are not predefined.

As an illustration, a stereo learning device (or a stereo coupled to a learning device or smart box) may be configured with predetermined actions for setting a volume level to any value in a finite range of volume level values (e.g., 0-10, etc.), activating a radio (or radio tuner) 'on', deactivating the radio (or radio tuner), setting a radio station to any value in a finite range of radio station values (e.g., 88.1-121.9, etc.), setting a frequency modulation (FM) configuration or an amplitude modulation (AM) configuration, etc. The stereo learning device may store reflexes for each of these predetermined actions with various trigger patterns. For example, the stereo learning device may store a first reflex with an action pattern that sets the radio station to a first value (e.g., 92.3 FM) and a trigger pattern of a lamp 'on' event, a second reflex with an action pattern that sets the radio station to a second value (e.g., 101.5 FM) and a trigger pattern of a wall switch 'on' event, a third reflex with an action pattern that sets the volume level to 8 and a trigger pattern of the lamp 'on' event, etc.

Patterns may be created from one or more events (e.g., time component, device component, etc.) obtained at a smart box, such as events generated based on occurrence data obtained by a sensor (e.g. a light sensor, a switch vision sensor, etc.) and/or one or more events generated based on occurrence data received by the signal receiver 142. Events may be stored in memory 138 and used by the event recorder 206 to create or recognize patterns. Prior to evaluating events to create or recognize patterns, a filter may be applied to events to reduce the set of events that may be considered. For example, a floor lamp smart box may ignore events related to event report messages from a stereo. As an alternate example, the stereo may ignore events obtained or generated after some time of day, such as 11:00 PM. Once a smart box generates a pattern of events, it may determine whether the pattern matches any known trigger patterns that correspond to a stored reflex.

If an identified pattern matches a stored trigger pattern in a reflex and the related trigger weight is equal to or above a particular threshold, its paired action pattern may be generated. A current trigger weight ($W^i$) for a certain reflex ($Reflex^i$) may be calculated based on the following equation:

$$W^i(\Sigma_{k=0}^n m^{k,i} x^{k,i} s^{k,i}) b^i;$$

where i is a reflex counter or identifier, n is the number of events associated with a trigger pattern of the reflex, k identifies a counter for individual events in the trigger pattern of the reflex, m is an event match indicator for an individual event in the trigger pattern of the reflex, x is a match weight associated with the individual event in the trigger pattern of the reflex, s is a scale factor applied to the individual event in the trigger pattern of the reflex, and b is a bias for an entire weight match applied to the individual event in the trigger pattern of the reflex. Thus, the current trigger weight, $W^i$, of a $Reflex^i$ equals the sum of the event match (m) multiplied by the match weight (x) and the scale factor (s) plus the bias b in the trigger pattern associated with $Reflex^i$. In some embodiments, match weights (x) may be adjusted by gains associated with their respective events, and as described in this disclosure, gains may be set based on whether a learning device is within a critical period or steady state period. In some embodiments, smart boxes may normalize values from 0.0 to 1.0. Further, in some embodiments, the event match indicator for an event (m) may be a floating value between 0.0 and 1.0 that may indicate whether the event was matched perfectly or not. (i.e., an event match value of 1.0 may represent a perfect match and an event match of 0.0 may indicate a complete mismatch).

As an illustration, if an identified pattern of a single event matches a known trigger pattern for a certain reflex ($Reflex^i$), then the event match indicator (m) for the single event may be set to 1. Assuming the match weight (x) for the single event is set to 1 based on an associated gain value, the scale factor (s) is also set to 1, and the bias (b) for $Reflex^i$ is set to 0, then the new or current trigger weight $W^i$ for the $Reflex^i$ may be equal to 1. If the same pattern is received again, then the match weight (x) may be adjusted by the current gain associated with the reflex, resulting in an increase in a subsequent, new trigger weight ($W^i$) that may be greater than the trigger weight threshold. Thus, the new trigger weight ($W^i$) may increase or decrease. For example, receiving the same trigger pattern a second time may increase the trigger weight ($W^i$) to 1.5 assuming that $m^{k,i}$ is set to 1, $x^{k,i}$ is adjusted to 1.5, $s^{k,i}$ is set to 1, and $b^i$ is set to 0. Under the same conditions, if the identified pattern does not match a known trigger pattern, then m may be equal to 0 resulting in a new trigger weight $W^i$ also equal to 0.

As an additional illustration, a stereo (e.g., stereo 106 as described above in FIG. 1A) may include or be coupled to a smart box capable of storing and utilizing various reflexes.

In particular, the stereo (via its smart box) may store a first reflex ($R^i$) that has a trigger pattern including a first event related to an 'on' signal from a nearby ceiling light and a second event related to a signal from a presence sensor (e.g., pressure sensor, motion sensor, etc.) in a nearby recliner. For example, the first event may correspond to a signal transmitted by the ceiling light (or a smart box coupled to the ceiling light) when activated and the second event may correspond to a signal transmitted by the recliner (or a smart box coupled to the recliner) when a person sits in the recliner. The first reflex may also include an action pattern that may cause the stereo to turn on in response to the stereo detecting the occurrence of the trigger pattern (i.e., both the ceiling light and the recliner events). In other words, based on the first reflex, the stereo may activate its radio and play music in response to the ceiling light being turned on and someone sitting in the recliner within a predefined time window (e.g., 5-10 seconds, etc.).

The following tables illustrate exemplary properties of the equation with respect to the first reflex of the stereo (i.e., $R^i$). For the purpose of the following examples and tables, the action pattern (i.e., turning the stereo on and playing music) of the first reflex may be triggered when the trigger weight of the first reflex (i.e., $W_i$) is greater than or equal to a trigger threshold value of 1.5, a condition that may occur in response to the stereo receiving at least one of the first event and the second event. The first event may be event k=0 and the second event may be k=1. Further, except for the match indicator for various events ($m^{n,i}$), it should be appreciated that the various values in the following properties may be predefined, such as set by a manufacturer, developer, or user. For example, the match weight for an event may be set by a manufacturer or may be based on previous events encountered at a smart box.

TABLE A

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 1 | 0 | 1.0 | 1.0 | 1.0 | 0.0 | 1.0 | 1.0 | 0.0 |

As shown in the exemplary properties of Table A above, in one scenario, only the first event (i.e., k=0) may be received by the stereo. Thus, the smart box of the stereo may set the event match indicator for the first event ($m^{0,i}$) to 1.0 (i.e., there is a match for the first event) and the event match indicator for the second event ($m^{1,i}$) to 0.0 (i.e., there is no match for the second event). The trigger weight of the first reflex may be computed by summing the sub-weight calculation for each event, such that the sub-weight of the first event computes to 1.0. In other words, $(m^{0,i}*x^{0,i}*s^{0,i})+b^i=(1.0*1.0*1.0)+0.0=1.0$. As there is no second event, the event match indicator for the second event ($m^{1,i}$) may be 0.0, and thus the sub-weight calculation for the second event may be 0.0. In other words, $(m^{1,i}*x^{1,i}*s^{1,i})+b^i=(0.0*1.0*1.0)+0.0=0.0$. Accordingly, the total trigger weight of the first reflex ($W^i$) is 1.0 (i.e., 1.0+0.0), which is less than the trigger threshold value of 1.5. Thus, with only the first event received, the action pattern of the first reflex may not be triggered (e.g., the stereo may not activate its radio).

TABLE B

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 1.8 | 0.1 | 1.0 | 1.0 | 1.0 | 0.8 | 1.0 | 1.0 | 0.0 |

As shown in the exemplary properties of Table B above, in another scenario, both the first event (i.e., k=0) and the second event (i.e., k=1) may be received by the stereo. Thus, the smart box may set the event match indicator for the first event ($m^{0,i}$) to 1.0 (i.e., there is a match for the first event), and the event match indicator for the second event ($m^{1,i}$) to a non-zero value. However, in some cases, the second event may not be matched exactly, and thus the match indicator for the second event ($m^{1,i}$) may be set to 0.8 (i.e., there is at least a partial match for the second event). The value of 0.8 for the event match indicator for the second event ($m^{1,i}$) may indicate that the second event match was an imperfect match for a system that normalizes values from 0.0 to 1.0; where 1.0 represents a perfect match for the event match value.

As described above, the trigger weight ($W^i$) may be computed by summing the sub-weight calculation for each event, such that the sub-weight of the first event computes to 1.0. In other words, $(m^{0,i}*x^{0,i}*s^{0,i})+b^i=(1.0*1.0*1.0)+0.0=1.0$. Further, the sub-weight of the second event computes to 0.8. In other words, $(m^{1,i}*x^{1,i}*s^{1,i})+b^i=(0.8*1.0*1.0)+0.0=0.8$. Accordingly, the total trigger weight of the first reflex ($W^i$) may be 1.8 (i.e., 1.0+0.8), which is greater than the trigger threshold value of 1.5. Thus, with both the first event and the second event obtained at the smart box, the action pattern of the first reflex may be generated, causing an action to be performed (e.g., the stereo may activate its radio and play music, etc.). In some embodiments, the action pattern of the first reflex may be generated and cause an action to be performed in response to the calculation of any total trigger weight of the first reflex ($W^i$) that is greater than or equal to the trigger threshold value (e.g., 1.5).

TABLE C

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 1.6 | 1 | 0.0 | 1.0 | 1.0 | 0.8 | 2.0 | 1.0 | 0.0 |

In some embodiments, based on the match weights for various events, the smart box may be configured to perform actions in response to obtaining a single event. For example, the stereo smart box may be configured to activate its radio functionality in response to only receiving a signal indicating someone has sat in the recliner (i.e., the action pattern may be triggered by a presence sensor event associated with the recliner). As shown in the exemplary properties in Table C above, the first event may not be obtained (i.e., $m^{0,i}=0.0$), the second event may be obtained (i.e., $m^{1,i}=0.8$), and the match weight for the second event ($x^{1,i}$) may be set to a value of 2.0. Due to the higher match weight for the second event, the radio of the stereo may be activated when only the second event is obtained at the stereo. In other words, the trigger weight for the first reflex may be greater than 1.5 based only on obtaining the second event (i.e., $((m^{0,i}*x^{0,i}*s^{0,i})+(m^{1,i}*x^{1,i}*s^{1,i}))+b^i=((0.0*1.0*1.0)+(0.8*2.0*1.0))+0.0=1.6$.

TABLE D

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 2.6 | 0.1 | 0.7 | 1.0 | 2.0 | 0.6 | 1.0 | 2.0 | 0.0 |

In some embodiments, when imperfect event matching is likely, such as in a noisy RF environment, scale factors may be adjusted such that reflexes may be triggered even when matching may be low. For example, as shown in Table D above, the scale factor for the first event ($s^{0,i}$) and the scale factor for the second event ($s^{1,i}$) may be increased to a value of 2.0 in order to enable trigger weights above the 1.5 threshold value, even when matching indicators are less than ideal (e.g., less than 1.0, less than 0.8, etc.). In other words, the stereo may activate its radio to play music in response to receiving both the first event and the second event with less than ideal matching indicators (e.g., 0.7 and 0.6, respectively) and calculating a trigger weight of 2.6 for the first reflex (i.e., $((m^{0,i}*x^{0,i}*s^{0,i})+(m^{1,i}*x^{1,i}*s^{1,i})+b^1 = ((0.7*1.0*2.0)+(0.6*1.0*2.0))+0.0=2.6$.

TABLE E

| $W^i$ | Events Received (k) | $m^{0,i}$ | $x^{0,i}$ | $s^{0,i}$ | $m^{1,i}$ | $x^{1,i}$ | $s^{1,i}$ | $b^i$ |
|---|---|---|---|---|---|---|---|---|
| 1.8 | 1 | 0.0 | 1.0 | 1.0 | 0.8 | 1.0 | 1.0 | 1.0 |
| 1.9 | 0 | 0.9 | 1.0 | 1.0 | 0.0 | 1.0 | 1.0 | 1.0 |

In some embodiments, bias values for trigger weight calculations may be adjusted in order to cause action patterns to be triggered in response to a smart box obtaining a single event. For example, as shown in Table E above, the bias ($b^i$) may be set to 1.0, which allows either the first event or the second event to individually cause the stereo to activate its radio via the first reflex. In other words, the action pattern may be triggered when only the second event is obtained (i.e., $((m^{0,i}*x^{0,i}*s^{0,i})+(m^{1,i}*x^{1,i}*s^{1,i}))+b^i = ((0.0*1.0*1.0)+(0.8*1.0*1.0))+1.0=1.8$) or when only the first event is obtained (i.e., $((m^{0,i}*x^{0,i}*s^{0,i})+(m^{1,i}*x^{1,i}*s^{1,i}))+b^i=((0.9*1.0*1.0)+(0.0*1.0*1.0))+1.0=1.9$).

Figure 5:
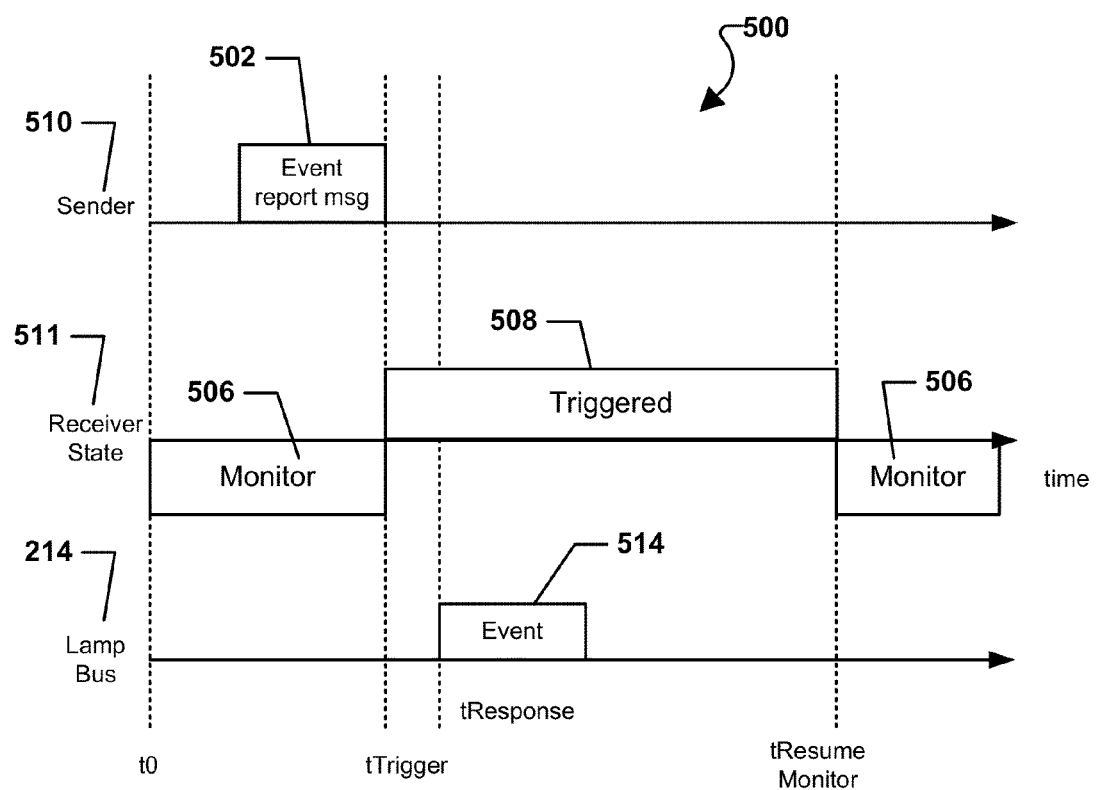
FIG. 5 is an exemplary timeline diagram of a reflex system changing states in response to generating events suitable for use in various embodiments.
Figure 6:
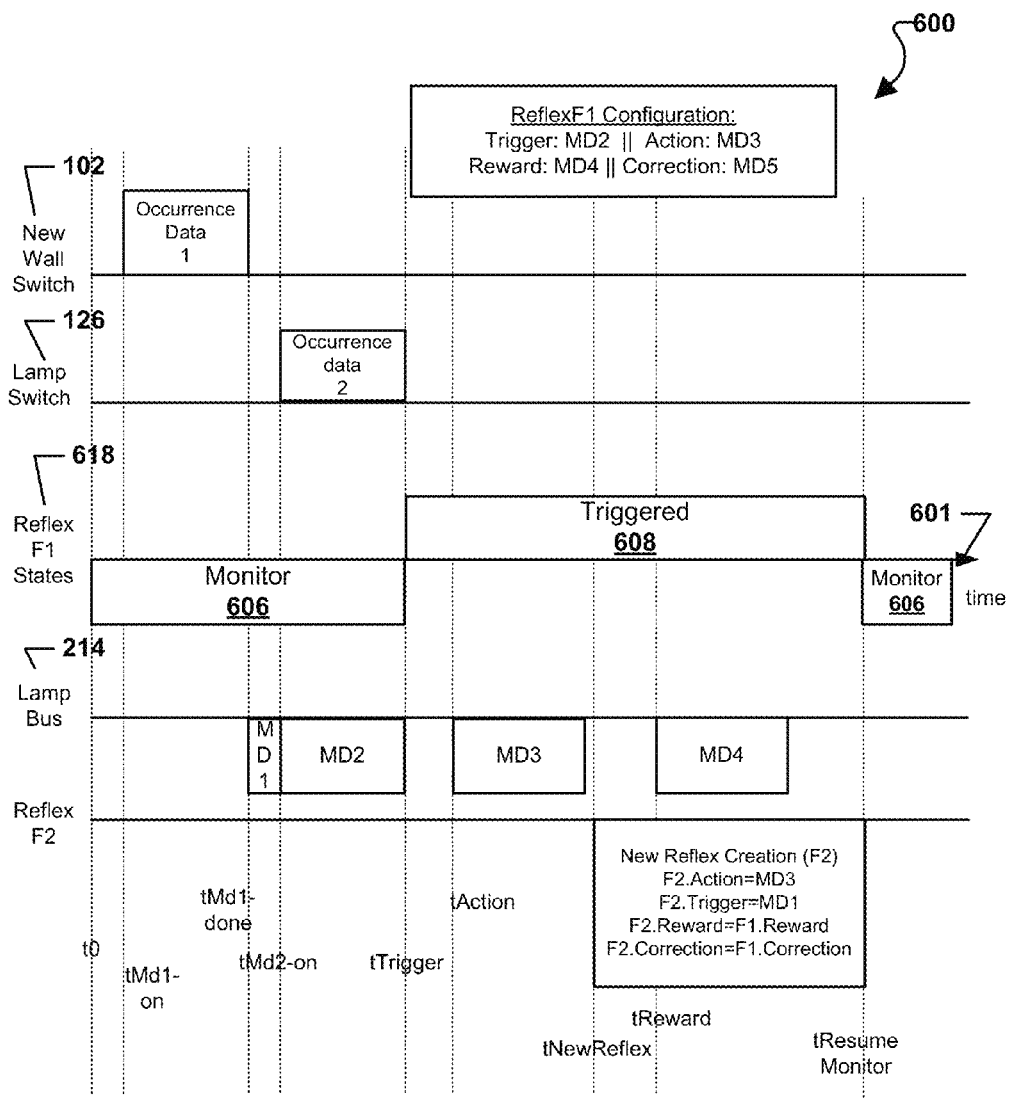
FIG. 6 is an exemplary timeline diagram illustrating the creation of a new reflex based on an existing reflex suitable for use in various embodiments.
Figure 7:
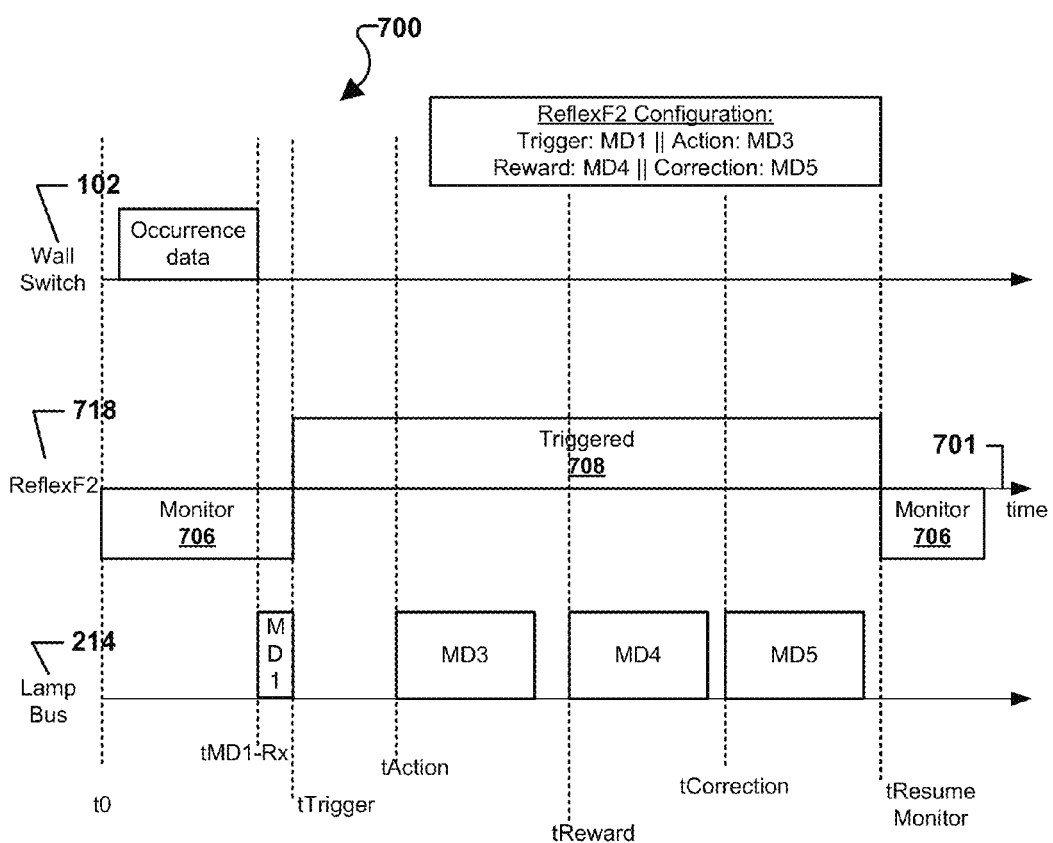
FIG. 7 is an exemplary timeline diagram illustrating the training of a newly created reflex suitable for use in various embodiments.

FIGS. 5-7 are timeline diagrams illustrating how events (including actions) may be recognized (or identified) as patterns in reflexes. In the descriptions of these timelines, references are made to a wall switch and a floor lamp as a short hand for the smart boxes associated with those devices. Further, the wall switch and the floor lamp are used as illustrative examples of the types of devices that may be coupled to a smart box. Thus, the references to the wall switch and floor lamp are not intended to limit the scope of the claims in any manner.

FIG. 5 is a timeline diagram 500 of event transmissions that correspond to a reflex that shows times of transmissions between a sender 510 (e.g., wall switch) and a receiver (e.g., lamp). These event transmissions (or event report messages) may include occurrence data that may help the receiver generate an event. The timeline diagram begins at time 0 (or t="t0" as shown in FIG. 5) with the receiver in a monitor mode 506, and ends when the receiver returns to the monitor mode 506 at time "tResumeMonitor" (or t="tResumeMonitor"). In some embodiments, the sender 510 in diagram 500 may be a wall switch broadcasting occurrence data of an event, which may be received by the floor lamp. The floor lamp may have a receiver state 511 associated with each stored reflex, which may be in either a monitor mode 506 or a triggered mode 508. The default state of each reflex associated with the floor lamp may be the monitor mode 506. The floor lamp may also have an event bus 214 (typically in its smart box), which may transfer events to other smart box components.

For the purposes of illustration, at time t=t0, the floor lamp may be considered to be in the monitor mode 506 with respect to all reflexes. The floor lamp may receive an event report message 502, such as via its signal receiver 142. For example, a user may toggle the wall switch from 'off' to 'on'. In response, the wall switch may record the toggle as an event with a sensor encoder 134 (shown in FIG. 2). The wall switch may transmit an event report message 502 having occurrence data related to the new event through the wall switch's signal transmitter 136. The event report message 502 may be received by other smart boxes, such as the floor lamp.

At t=tTrigger, the event report message 502 may be received by the floor lamp. The floor lamp may determine that an event generated based on the event report message 502 matches a trigger pattern of a reflex, and may enter the triggered mode 508 with respect to the matched reflex. During the triggered mode 508, the floor lamp may continue to search for other events to determine whether a reward and/or correction pattern is present to enable learning or unlearning, respectively.

At t=tResponse, the floor lamp may generate the event 514 associated with an action pattern of the matching reflex, which may activate a motor driver 140 to cause an action, such as turning on the light 124 of the floor lamp (shown in FIGS. 1B and 1C). The event 514 is placed on the event bus 214 of the floor lamp, which may be eventually converted to a pattern and stored in memory 138. In some embodiments, a generated action pattern may be a trigger pattern for additional action patterns. For example, turning on the floor lamp may be a trigger pattern for turning on the stereo. In other words, multiple learning devices may be daisy-chained together allowing trigger patterns and action patterns to be generated and transmitting corresponding data from device to device.

At t=tResume Monitor, the floor lamp may leave the triggered mode 508 and re-enter the monitor mode 506 in which the floor lamp may search for and receive new event report messages.

As FIG. 5 illustrates, the floor lamp may enter a single triggered mode with respect to a single reflex. In some embodiments, the floor lamp may have multiple reflexes stored in memory and may obtain (or generate) multiple events at overlapping intervals of time. Assuming the floor lamp obtains multiple events that result in multiple trigger patterns, the floor lamp may enter concurrent triggered modes. Each triggered mode may correspond to different reflexes. For example, the floor lamp may simultaneously receive an event report message related to an EventA from a wall switch and an event report message related to an Event B from a stereo. EventA may correspond to a trigger pattern from a first reflex stored in memory of the floor lamp. In response, the floor lamp may enter a triggered mode with respect to the first reflex, ReflexA. EventB may correspond to a different trigger pattern of a different reflex, ReflexB. Thus, the floor lamp may concurrently enter a second triggered mode with respect to ReflexB. Each triggered mode may be represented as illustrated in FIG. 5; however, the floor lamp may process each event, reflex, and triggered mode independently.

The floor lamp may generate events of trigger patterns for different reflexes at different times, which may cause the floor lamp to enter triggered mode with respect to one reflex at a different time than the other triggered mode for the other reflex. Assuming the triggered modes of each reflex overlap the same time period (e.g., 5 seconds), the floor lamp may exit the triggered mode with respect to the first reflex but remain in the triggered mode with respect to the second reflex. Eventually, the floor lamp may exit the triggered mode with respect to each reflex and return to the monitor mode with respect to each reflex.

FIG. 6 is a timeline diagram 600 illustrating a learning timeline to create a new reflex. The diagram 600 illustrates how a known reflex (referred to as "ReflexF1" or 'F1") may be used to create a new reflex (referred to as "ReflexF2" or "F2"). Diagram 600 includes a new wall switch, a lamp switch, and a floor lamp. The floor lamp has a known ReflexF1, which has states 618 including the monitor mode 606 and the triggered mode 608. ReflexF2 is not known and will be eventually created on this timeline 601. Timeline 601 begins at time 0 ("t=t0") and ends at time "ResumeMonitor" (t="tResumeMonitor").

At t=t0, the floor lamp may start in the monitor mode 606 with respect to ReflexF1. ReflexF1 may include a trigger pattern (referred to as MD2), an action pattern (referred to as MD3), a reward pattern (referred to as MD4), and a correction pattern (referred to as MD5). The floor lamp may monitor generated events for patterns that match the trigger pattern of ReflexF1 (MD2).

At t=tMd1-on, the new wall switch may be switched from 'off' to 'on' generating an event and causing related occurrence data (referred to as "occurrence data 1") to be broadcast by the wall switch in an event report message received by the floor lamp. The occurrence data from the event report message from the new wall switch may be used by the floor lamp to generate an event that may be combined with one or more events or may individually be used to create a pattern ("MD1").

At t=tMd1-done, the floor lamp may receive the event report message with "occurrence data 1," generate a related event, and convert it (and possible other events stored in a memory) into a pattern known as pattern "MD1". At this time, the floor lamp may place pattern MD1 on the event bus for further processing or temporary storage in memory. The floor lamp may determine that pattern MD1 does not match any known trigger patterns of known reflexes of the floor lamp and thus may continue to operate in the monitor mode 606.

At t=tMd2-on, the lamp switch may be turned from 'off' to 'on' and, in response, the floor lamp may generate an event based on occurrence data related to the state change (referred to as "occurrence data 2"). Simultaneously, the floor lamp may combine the event generated from the "occurrence data 2" with other events collectively processed as a pattern MD2 and place the pattern MD2 on the event bus for temporary storage in memory.

At t=tTrigger, the floor lamp may match the pattern MD2 to the trigger pattern of ReflexF1. The floor lamp may then enter the triggered mode 608 for ReflexF1 because pattern MD2 matches the trigger pattern of ReflexF1. In some embodiments, the floor lamp may complete an internal transmission and convert the event generated from the "occurrence data 2" into the pattern MD2 at t=tTrigger.

At t=tAction, the floor lamp may generate the action pattern for ReflexF1 (MD3) associated with the known trigger pattern for ReflexF1 (MD2) that is located on event bus or stored in the floor lamp's memory. The generation of the pattern MD3 may cause a motor driver connected to the floor lamp to turn on a light.

Figure 11:
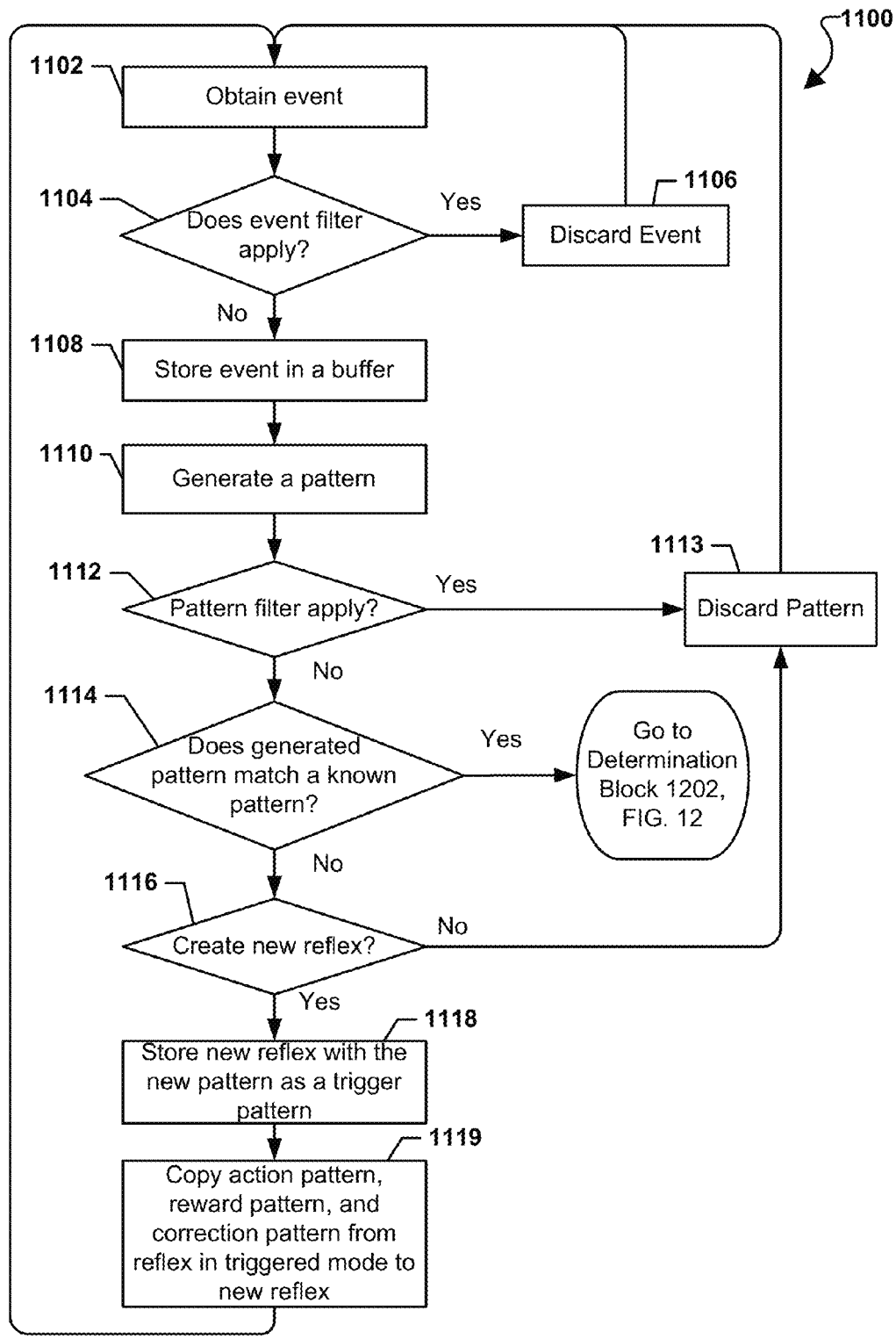
FIG. 11 is a process flow diagram illustrating an embodiment method of generating and processing events to perform actions or associate actions with triggers.

At t=tNewReflex, a new reflex (referred to as "ReflexF2" or "F2") is created because there is no existing reflex with a trigger pattern matching the pattern MD1. The only known trigger pattern is MD2 associated with ReflexF1. In creating ReflexF2, the floor lamp may copy the action pattern, the reward pattern, and the correction pattern associated with the ReflexF1 into the new reflex, and may assign the pattern (MD1) received on the timeline 601 to the new reflex as its trigger pattern. The weights associated with the copied patterns may be adjusted when copied to the new reflex. Thus, the new reflex (ReflexF2) may have a trigger pattern equal to pattern MD1 and related to the occurrence data received from the new wall switch ("occurrence data 1"), an action pattern equal to pattern MD3 associated with turning the floor lamp on, a reward pattern equal to pattern MD4, and a correction pattern equal to pattern MD5. In some embodiments, when the floor lamp may be configured to perform more than one action (e.g., turn on, turn off, etc.) and thus utilize at least two reflexes (i.e., at least one reflex per action), then new reflexes created in response to detecting unknown patterns may be copied from an existing reflex in its triggered mode. In other words, in order to determine which existing reflex to copy from when creating a new reflex, the floor lamp may perform operations to correlate events (or patterns of events) with known actions of reflexes in their triggered mode (i.e., patterns for a new reflex may be copied from a pre-existing reflex whose action pattern is encountered within a time window of the unknown pattern/event). FIG. 11 illustrates an embodiment method that includes operations for a smart box to add a new reflex.

At t=tReward another component may generate events that match a reward pattern, such as pattern MD4 known as the reward pattern for ReflexF1. For example, a motor driver may generate an event equal to pattern MD4 when the light of the floor lamp turns on (shown in FIGS. 1B-1C). The motor driver may send pattern MD4 to the event recorder. Since pattern MD4 matches the reward pattern of ReflexF1 (and newly created ReflexF2), the trigger weight associated with ReflexF1 may be increased as ReflexF1 is in its triggered mode 608. In some embodiments, the reward pattern may be a self-generating pattern such that as long as the light of the floor lamp turns on a reward pattern equal to pattern MD4 is always generated and the trigger weight may increase.

While in a learning-enabled mode, if a reward pattern (MD4) is matched, then reward gains may be applied (e.g., increasing the trigger weight, etc.). In some embodiments, although the match weight (x as described above) is typically modified while in a learning-enabled mode, any parameter or value in the equation may be adjusted while in a learning-enabled mode. In other words, increasing or decreasing the trigger weight of a reflex may include adjusting any parameter in the trigger weight equation.

However, if the correction pattern (MD5) is matched, then the correction gains may be applied (e.g., decreasing the trigger weight). In some embodiments, the reward pattern or the correction pattern may be generated by an additional occurrence, such as an input or a button that the user may activate in order to provide feedback that the response was as desired (or not desired). For example, after the floor lamp turns its light on, a user may press a button on the floor lamp, which generates a reward pattern. Based on the reward pattern, the floor lamp may increase the trigger weight of the related reflex.

At t=tResume Monitor, the floor lamp ends its triggered mode 608 for ReflexF1 and returns to the monitor mode 606. In some embodiments, the floor lamp may subsequently receive pattern MD1, which may cause the floor lamp to activate its light based on a triggered action of ReflexF2.

In some embodiments, a new reflex may be generated regardless of the order in which various occurrence data is received or obtained by the floor lamp. In other words, an unknown trigger pattern (e.g., MD1) could be received and used before, during, and after a trigger window and thus cause the creation of a reflex independent of the order of receiving occurrence data. For example, if the "occurrence data 1" is received and used to generate the pattern MD1 after the floor lamp has entered its triggered mode 608 for ReflexF1 (i.e., after "occurrence data 2" is received and MD2 has been obtained), the floor lamp may still create ReflexF2, as the MD1 may still have occurred within a time window relative to the triggered mode 608.

FIG. 7 illustrates how the newly created reflex, ReflexF2, from FIG. 6 may be rewarded and/or corrected to increase/decrease its association with an action along a timeline 701. Depending on the state 718 of ReflexF2, the floor lamp may be in monitor mode 706 or triggered mode 708 with respect to ReflexF2. In monitor mode 706, the floor lamp is looking for trigger pattern that matches with respect to a reflex. If the floor lamp generates a pattern of events that matches a known trigger pattern of a stored reflex, the floor lamp may enter the triggered mode of the reflex containing the matching trigger pattern. In diagram 700, ReflexF2 may have a trigger pattern equal to pattern MD1, an action pattern equal to pattern MD3, a reward pattern equal to pattern MD4, and a correction pattern equal to pattern MD5.

At t=t0, the wall switch may generate an event and broadcast an event report message with occurrence data related to the event. The floor lamp, in the monitor mode 706, may receive the event report message by t=tMD1-Rx.

At t=tMD1-Rx, the floor lamp receives the entire event report message with the occurrence data, generate an event in response, and transfers it to the event recorder, which may convert the event into pattern MD1 and place it on a event bus (as shown in FIG. 2). The floor lamp may transfer pattern MD1 from the event bus to a temporary storage in memory (e.g., event pattern storage 204 in FIG. 2).

At t=tTrigger, the floor lamp may process pattern MD1 and determine that it matches a known trigger pattern associated with ReflexF2. Thus, the floor lamp may enter the triggered mode 708 with respect to ReflexF2 where floor lamp may learn or unlearn with respect to ReflexF2.

At t=tAction, the floor lamp may generate the action pattern (MD3) associated with ReflexF2, which is put on the event bus. The motor driver may retrieve the action pattern (MD3) from the event bus and conduct an action associated with the generated action pattern (e.g., turn on the light of floor lamp).

At t=tReward, a reward pattern (MD4) associated with ReflexF2 may be generated from another component. For example, the generated action pattern (MD3) may cause a motor driver to turn on the floor lamp. When the floor lamp turns on, the motor driver may receive feedback or a sensor encoder may sense a change in state on the lamp, thus generating pattern MD4. Pattern Md.4 may be subsequently stored in event pattern storage. Pattern MD4 may match the reward pattern of ReflexF2, and as a result the weights associated with the ReflexF2 trigger pattern (MD1) may be increased.

In some embodiments, once the trigger weight of a reflex reaches a maximum level, the trigger weight may not be further adjusted, allowing system resources to be used elsewhere. Such a maximum level may be utilized to limit the dynamic range of the weight calculations or to reduce the amount of RAM included within learning devices. For example, when a less dynamic range of trigger weights are used for a reflex (e.g., a smaller range in between a minimum and maximum trigger weight), less RAM may be used in learning devices (e.g., 8-bits instead of 16-bits).

In some embodiments, the memory of the floor lamp may be of a size such that it may only store a limited number of patterns and/or reflexes. In such a case, if a trigger weight of a stored reflex reaches a minimum weight value (e.g., a 'discard threshold'), the trigger weight may be considered so low that it may likely never trigger a reflex. In such a case, the floor lamp may re-use (or reclaim) the memory allocated to that reflex for new reflexes. Thus, setting a lower limit for correcting a reflex with a low trigger weight may allow the memory to devote storage for other patterns and/or reflexes. In other embodiments, when there are limited resources for storing new reflexes, the floor lamp may reallocate memory from the most infrequently used or lowest likely to be used (via weight properties) to new reflexes without using a minimum or "discard" threshold (i.e., the floor lamp may simply replace the most useless reflexes).

At t=tCorrection, a different component may generate a correction pattern (MD5). For example, if the floor lamp is turned off within the triggered mode 708, a sensor encoder may convert this change in state to an event, which may be passed to the event recorder to create a correction pattern MD5. Pattern MD5 may be matched to the correction pattern of ReflexF2 (which is in the triggered mode 708), and as a result the trigger weights may be reduced to weaken the association between the trigger pattern (MD1) and the action pattern (MD3) of ReflexF2.

At t=tResume Monitor, the floor lamp may exit the triggered mode 708 associated with ReflexF2, and the floor lamp may return to monitor mode 706. The triggered mode 708 may end simply because it has been timed out. For example, a triggered mode 708 may only last for ten seconds, so after operating in the triggered mode 708 for ten seconds, the floor lamp may exit the triggered mode 708 with respect to ReflexF2 and may enter a corresponding monitor mode 706.

FIG. 8 illustrates different types of learning rates for reflexes of a learning device, such as the floor lamp. Each device may have a critical learning period 801 and a steady state learning period 802 of learning. In other words, the critical learning period 801 and steady state learning period 802 may correspond to different learning states or learning conditions of a learning device. For example, the critical learning period 801 may correspond to a fast learning state and the steady state learning period 802 may correspond to a slow or normal learning state. Different sets of gains may be applied to triggers weights when in each of these periods. Although FIG. 8 shows two learning periods 801, 802, it should be appreciated that reflexes may utilize more than two learning periods.

The critical learning period 801 may be typically associated with the initial state of the learning device. This may be a time in which training the initial behavior of the learning device would be more beneficial to the user. Initial dynamic reflexes are likely to be created in this state; meaning that various gain values associated with the critical learning period 801 (referred to as "Gain Set 1" in FIG. 8) may be high (i.e., a high gain set) and the smart box is more likely to learn and unlearn. For example, manufacturers may set the floor lamp to a critical learning period 801 with initially high gains to enable it to quickly associate with a wall switch or any other device. Once the first trigger-action association has occurred, the floor lamp may change to a steady state learning period 802.

The steady state learning period 802 may occur when a particular device has been initially trained, and additional training is allowed but is intended to be more difficult. Gains associated with the steady state learning period 802 (referred to as "Gain Set 2" in FIG. 8) may have low gains (i.e., a low gain set) to make learning more difficult. For example, if the floor lamp has an 'on' event association with an 'on' event related to the wall switch, the floor lamp may be in a steady state learning period 802. While in the steady state learning period 802, the floor lamp may learn additional associations, such as activating in response to received occurrence data from the stereo. However, instead of instantly learning an association between the stereo and the floor lamp, the floor lamp may have to encounter a trigger pattern (e.g., a stereo 'on' event based on occurrence data received from the stereo), an action pattern (e.g., a floor lamp 'on' event based on occurrence data indicating the lamp has been turned on), and a reward pattern (e.g., based on receiving a "reward" signal or occurrence data from a user input button on the lamp) multiple times before the floor lamp learns to turn on when the stereo turns on.

The relation of the gains associated with the critical learning period 801 ("Gain Set 1"), and the gains associated with the steady state learning period 802 ("Gain Set 2") may be illustrated with the following equation:

Gain Set 1≥Gain Set 2

In other words, a learning device using the above equation may learn more quickly with Gain Set 1 than Gain Set 2.

In some embodiments, each gain set may have individual gains or weights associated with the trigger, reward, and correction pattern of a reflex at different stages of operation. Two or more gain levels may be used to adjust the gains closer to a critical period and a steady state period. For example, there may be a third gain set, which may be a hybrid between the critical period and the steady state period (e.g., less repetition is needed to learn). As the gains are adjusted, the weights associated with a particular pattern may be adjusted to determine matches within the system.

Whether a particular reflex is dynamic or static may affect the gains and learning associated with the learning device. A particular learning device may have a built-in static reflex, which may not be adjusted. For example, the floor lamp may have a built-in reflex incapable of being re-weighted regardless of encountering related reward patterns or correction patterns. In other words, learning devices may not nullify (or "forget") static reflexes through the use of weight adjustments (e.g., correcting). However, in contrast, dynamic reflexes may be created spontaneously and may be adjusted over time. For example, the floor lamp may adjust the weights of a dynamic reflex (e.g., ReflexF2 as illustrated above) over time such that no action of the floor lamp may be performed corresponding to a trigger pattern associated with the wall switch. In other words, a learning device may lower the trigger weight of a reflex related to the association between a trigger pattern (e.g., occurrence at a wall switch) and an action pattern (e.g., turning on the floor lamp) such that the trigger weight is below a threshold and thus the action may not be performed. However, in some embodiments, dynamic reflexes may be converted to static reflexes such that the association may not be forgotten. In some embodiments, dynamic reflexes may be given a rigid state such that it is difficult to change the trigger weight of a reflex having an association between an action and a trigger, thus making such dynamic reflexes more persistent.

Figure 9:
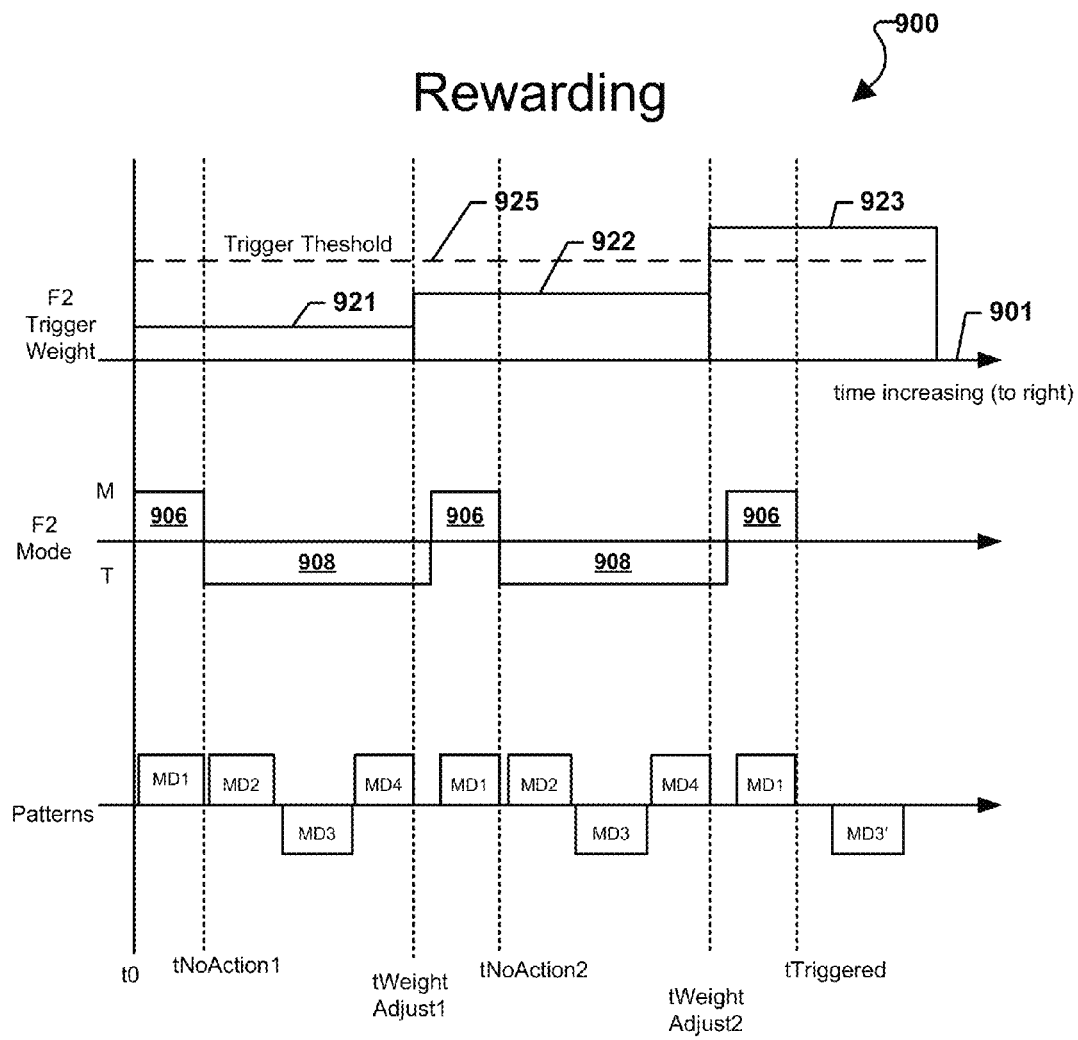
FIG. 9 is an exemplary timeline illustrating reward signals for training a learning device by increasing the trigger weight of a known reflex through repetition suitable for use in various embodiments.
Figure 10:
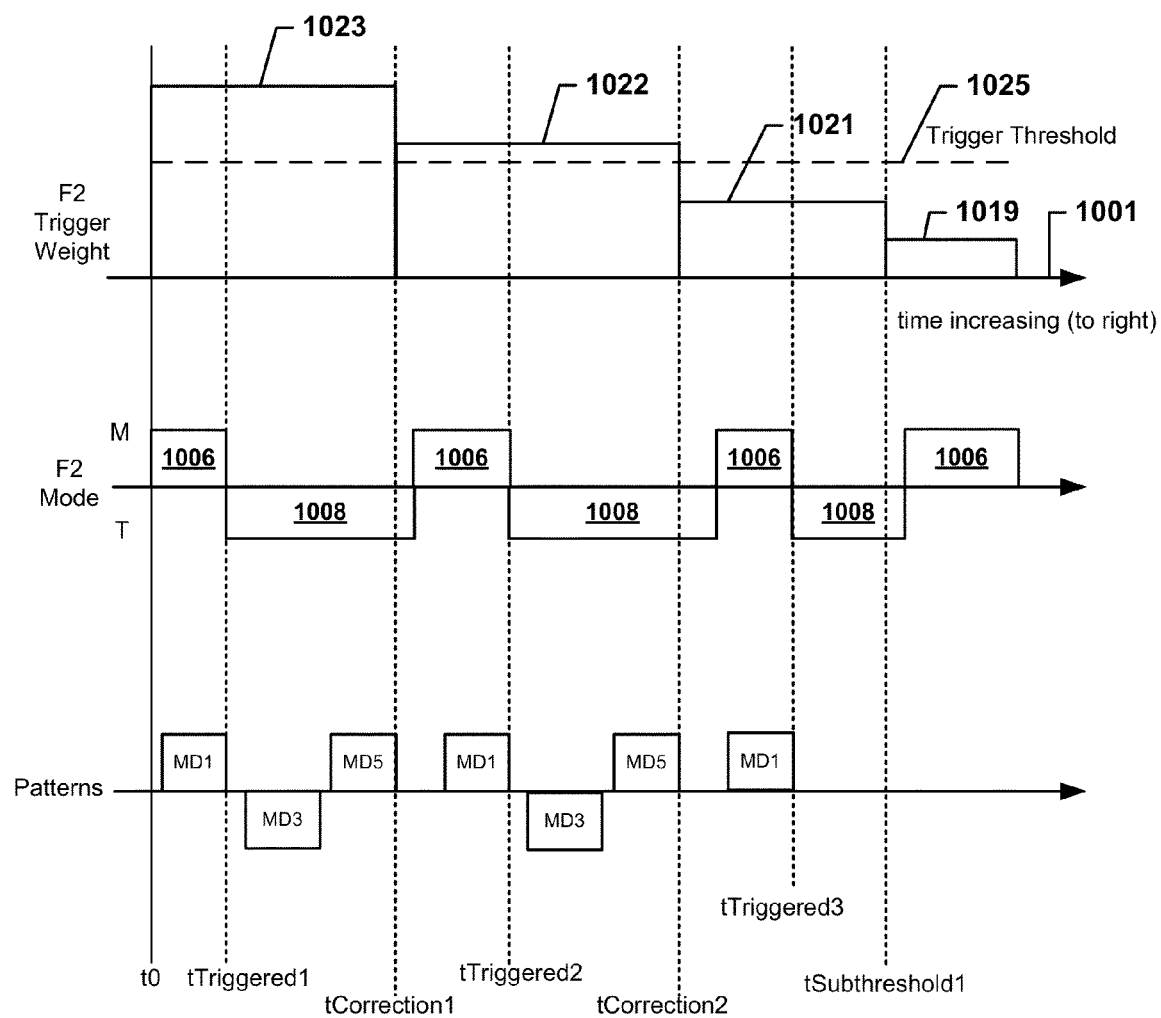
FIG. 10 is an exemplary timeline diagram illustrating correction signals for training a learning device by decreasing trigger weights of a known reflex through repetition suitable for use in various embodiments.

FIGS. 9 and 10 illustrate examples of learning and unlearning of a dynamic reflex in a steady state learning period 802 as shown in FIG. 8. The same principles illustrated in FIGS. 9 and 10 hold true for a dynamic reflex in a critical learning period 801.

FIG. 9 is a timeline diagram 900 that shows how rewarding a trigger-action association may change the weights of a trigger pattern until the trigger pattern has a weight equal to or above a trigger weight threshold 925. Diagram 900 includes two known reflexes ReflexF1 and ReflexF2. ReflexF1 has a trigger pattern (referred to as "MD2"), and a first trigger weight above its trigger threshold (not shown). ReflexF1 also has an action pattern (referred to as "MD3"), a reward pattern (referred to as "MD4"), and a correction pattern (referred to as "MD5"). ReflexF2 is the same as ReflexF1 except that ReflexF2 has a different trigger pattern (referred to as "MD1"), and may have a second trigger weight initially below the trigger weight threshold 925. Diagram 900 shows a timeline 901 of events and reactions, which may alter the trigger weight of ReflexF2.

At time t=t0, the floor lamp may be in the monitor mode 906 with respect to ReflexF2. In the monitor mode 906, the floor lamp may monitor for incoming signals related to events matching the trigger pattern ReflexF2. During the monitor mode 906, the floor lamp may encounter or obtain an event corresponding to trigger pattern MD1. For example, a new wall switch, which may be identical to the first wall switch, may send an event report message with occurrence data to the floor lamp when the new wall switch toggles from 'off' to 'on', and the floor lamp may then generate a trigger pattern MD1 based on the received' event report message and occurrence data.

At time t=tNoAction1, the floor lamp may process the trigger pattern MD1 for ReflexF1 and ReflexF2. As previously discussed, MD1 may only be associated with ReflexF2, thus floor lamp may enter the triggered mode 908 with respect to ReflexF2. Since ReflexF2 has a current trigger weight at a first trigger weight level 921 that is below the trigger weight threshold 925 at t=tNoAction1, the floor lamp may not generate the action pattern for ReflexF2 (e.g., MD3). However, shortly thereafter, the floor lamp may generate trigger pattern MD2 after receiving another event report message with occurrence data corresponding to the new wall switch. For example, the new wall switch may toggle from 'off' to 'on' and send a related event report message to the floor lamp, causing the floor lamp to generate the trigger pattern MD2 based on the event report message. As trigger pattern MD2 corresponds to ReflexF1 and the trigger weight is above its trigger threshold, the floor lamp may generate action pattern MD3. The floor lamp may subsequently generate a corresponding action event that results in the lamp turning on its light. Once the light turns on, the change in state may be recorded by a sensor encoder, which creates an associated event and generates the reward pattern MD4.

At time t=tWeightAdjust1, reward pattern MD4 may be processed to adjust the trigger weights for both ReflexF1 and ReflexF2. While in triggered mode 908 with respect to ReflexF2, the floor lamp may determine that pattern MD4 matches the reward pattern of ReflexF2, and may increase the trigger weight of MD1 and ReflexF2. The new trigger weight is at a second trigger weight level 922, which is still below the trigger weight threshold 925. After the triggered mode 908 times out, the floor lamp may enter the monitor mode 906 again.

The process of encountering events and generating their corresponding patterns MD1, MD2, MD3 (or MD3'), and MD4 may repeat resulting in adjusting the trigger weight of ReflexF2 to increase above the trigger weight threshold 925 to a third trigger weight level 923 at t=tWeightAdjust2.

At any time after adjusting the trigger weight of ReflexF2 above the trigger weight threshold 925, the floor lamp may encounter an event corresponding to the pattern MD1, which may result in the generation of action pattern MD3' without the need of encountering pattern MD2 to trigger ReflexF1. For example, before the floor lamp may have only turned on when it generated pattern MD2 corresponding to an 'on' event of the new wall switch. Now the wall switch may send an event report message including occurrence data that may result in the generation of an event corresponding to pattern MD1 to the floor lamp and thus in the floor lamp being triggered to turn on its light via ReflexF2.

FIG. 10 is a timeline diagram 1000 that illustrates correcting a trigger-action association by adjusting the trigger weight until it is below the trigger weight threshold 1025. Diagram 1000 is similar to diagram 900 except that a correction event is encountered by the floor lamp and the floor lamp subsequently generates a correction pattern. This correction pattern decreases the trigger weight of a reflex. Unlike diagram 900, a correction process in diagram 1000 may involve only one reflex. Here, only ReflexF2 is involved and includes the same trigger pattern, MD1, action pattern, MD3, reward pattern, MD4, and correction pattern, MD5, as in diagram 900. Also unlike diagram 900, ReflexF2 in diagram 1000 may begin with an initial trigger weight of 1023 above its trigger weight threshold 1025. Thus, upon generating trigger pattern MD1, the floor lamp may generate a corresponding action pattern and associated action.

At time t=t0, the floor lamp may monitor for events in a monitor mode 1006. During the monitor mode 1006, the floor lamp may encounter a trigger event corresponding to trigger pattern MD1. For example, a new wall switch may broadcast an event report message with occurrence data related to an 'on' event and corresponding to pattern MD1 because the new wall switch was toggled from 'off' to 'on'. As the event is received, the floor lamp may generate the corresponding trigger pattern.

At time t=tTriggered1, the floor lamp may receive the event report message related to the on-event and generate the pattern MD1. The floor lamp may determine that the pattern MD1 is a known trigger pattern corresponding to ReflexF2 and thus may enter the triggered mode 1008 with respect to ReflexF2. Shortly thereafter, the floor lamp may determine that the first trigger weight level 1023 for ReflexF2 is above trigger weight threshold 1025 and may generate an action pattern MD3, which results in an action event and a physical action of the floor lamp turning on its light. The floor lamp may also encounter an event corresponding to a correction pattern MD5 while in the triggered mode 1008. For example, the floor lamp may generate a correction pattern MD5 upon encountering an event when a user presses a separate correction button on the floor lamp (e.g., a button labeled "Correction"). A user may press this button to send a correction event to the floor lamp and in response the floor lamp may generate the correction pattern MD5. In an alternative example, the floor lamp may generate a correction pattern when a user manually turns off the floor lamp within a brief time window of a previous trigger pattern. The opposite input of a previous trigger pattern may correspond to a correction pattern and the floor lamp may learn to disassociate trigger patterns and action patterns.

At time t=tCorrection1, the floor lamp may determine that the correction pattern MD5 matches the correction pattern of ReflexF2. Thus, the floor lamp may reduce the trigger weight associated with ReflexF2 to a second trigger weight level 1022. The second trigger weight level 1022 is still above the trigger weight threshold 1025, thus the floor lamp may still activate its light. Eventually, the triggered mode 1008 ends due to time constraints and the floor lamp may enter the monitor mode 1006 again.

While in the monitor mode 1006, the floor lamp may encounter a second trigger event and generate a second trigger pattern MD1. For example, the new wall switch may again be toggled from 'off' to 'on'. At time t=tTriggered2, the floor lamp may determine that the second pattern MD1 matches the known trigger pattern of ReflexF2 and may enter triggered mode 1008 with respect to ReflexF2. Since ReflexF2 currently has a second trigger weight level 1022 above trigger weight threshold 1025, the floor lamp may generate action pattern MD3 and the associated mechanical action (e.g., turn on the light). While the floor lamp is in the triggered mode 1008 with ReflexF2, the floor lamp may again encounter a correction event from the correction button and generate the correction pattern MD5. Since pattern MD5 corresponds to ReflexF2, at time t=tCorrection2, the trigger weight is reduced to a third trigger weight level 1021, which is below the trigger weight threshold 1025. Thus, if the floor lamp encounters another trigger event and generates another trigger pattern MD1 at time t=tTriggered3, the floor lamp may not generate a corresponding action pattern MD3 in a triggered mode 1008. In other words, the floor lamp may have effectively forgotten the trigger action association of ReflexF2 and may not activate its light upon generating trigger pattern MD1 in the future (or at least until retrained to respond to that manner to the trigger pattern).

In some embodiments, trigger weights below their association trigger weight threshold may continually lowered in response to the floor lamp entering its trigger mode without encountering a reward pattern. For example, in FIG. 10, at time tTriggered3, the floor lamp may detect a trigger pattern MD1 without a subsequent reward pattern, and as a result, the floor lamp may continue to decrease the trigger weight for ReflexF2 to a fourth trigger weight level 1019 as shown at time t=tSubthreshold1. In some embodiments, the trigger weight of a reflex may be periodically decreased (or decayed) over time once the trigger weight is below its associated trigger weight threshold and no reward pattern is encountered.

In some embodiments, the floor lamp may remove ReflexF2 immediately or at some time after its trigger weight is below the trigger weight threshold 1025 and there is a memory shortage. Thus, if the floor lamp detects the trigger pattern (MD1) of ReflexF2 after ReflexF2 has been deleted, the floor lamp may create a new reflex with pattern MD1 as its trigger pattern assuming the other conditions are met (e.g., having a reward present during the triggered mode). In some embodiments, the floor lamp may remove a reflex that has a trigger weight above its associated threshold due to memory shortages (e.g., reaching a memory limit for stored reflexes). For example, when the floor lamp encounters a new trigger pattern within a triggered mode but has no available storage in local memory, the floor lamp may remove a stored reflex that has a trigger weight above a trigger threshold but that is not often used, least likely to be used, and/or has the lowest trigger weight of all reflexes with trigger weights exceeding their respective trigger weight thresholds.

FIG. 11 illustrates an embodiment method 1100 that may be implemented in a smart box for learning actions associated with events. Although the embodiment method 1100 may be used with any smart box, for ease of description, the method 1100 is described with reference to the example of smart box connected to the floor lamp receiving an event report message from a smart box connected to the wall switch. Additionally, any reference to the floor lamp, the wall switch, or the stereo, also encompasses their corresponding smart boxes respectively. For example, operations described as being performed by the floor lamp may be performed by the processor of the smart box associated with the floor lamp. These smart boxes actually perform the operations of exchanging occurrence data within event report messages, and processing events and/or patterns.

In block 1102 the floor lamp may obtain an event. For example, the floor lamp may receive an event report message including occurrence data over a RF transmission from the wall switch and, based on the data in the event report message, the floor lamp may generate the event as a data structure as described above with reference to FIG. 3B. In such an example, the event report message may be transmitted by the wall switch when a user toggles the wall switch from 'off' to 'on'. As described above, the floor lamp may alternatively obtain an event based on a sensor (e.g., light sensor, etc.) coupled to the floor lamp, and/or in response to performing an action. Over time and in subsequent iterations of the operations of the methods 1100 and 1200, the floor lamp may obtain additional elements that may or may not be related to the obtained event. For example, after activating a triggered mode based on the obtained event, the floor lamp may obtain additional events by retrieving prior events obtained and stored in the memory, such as events generated in response to received event report messages and/or actions performed by the floor lamp.

In determination block 1104, the floor lamp may determine whether an event filter applies. Event filters may include time filters, type filters, device event filters, etc. In response to determining that an event filter applies (i.e., determination block 1104="Yes"), the floor lamp, may discard the event from further processing in block 1106, and continue to monitor for new incoming signals in block 1102. In some embodiments, if the event filter is a time-based filter, there may be a preset schedule to discard events during the day. For example, the stereo may have a time filter that it will ignore obtained events from the hours of midnight to 10 AM. In another example, an event filter at the floor lamp may simply ignore all obtained events from the stereo. In a further example, the stereo may ignore obtained events associated with a particular user. In some embodiments, a wall switch may receive a User ID input (e.g., fingerprint data, a pass code, nearby mobile device data from Bluetooth or Near Field Communication (NFC), etc.) and include that User ID in the occurrence data within an event report message. A father who owns a stereo may not want anyone other than him to turn on his stereo with wall switch. Thus, the stereo may discard all obtained events if they do not contain the father's user ID, thereby preventing others from turning on the stereo with the wall switch. However, if an event filter does not apply (i.e., determination block 1104="No"), the floor lamp may store the event in a buffer located in memory 138 (shown in FIG. 1C).

Assuming an event filter does not apply, the floor lamp may store the event in the buffer located in memory 138 in block 1108. The event may be stored in a buffer or memory to facilitate generating a pattern at event recorder 206 while the floor lamp is in monitor mode. In other words, the floor lamp may perform storing of events while in monitor mode. Although not shown, the floor lamp may temporarily store or buffer events in memory for a particular period of time (e.g., 5-10 seconds) and then discard the events to make room for new events.

In block 1110, the floor lamp may generate a pattern based on the event residing in the memory. In some embodiments, the floor lamp may generate a pattern based on multiple events residing in the memory, such as by retrieving and combining various events stored in memory. For example, the floor lamp may have generated a pattern based on two events generated based on event report messages received when two different wall switches are turned to the 'on' position. Patterns may be generated by one of four ways: (1) based on the time-ordered sequence of events; (2) reducing multiple events to a singlet; (3) heuristics; and (4) removing time from events in pattern generation.

When generating a pattern based on a time-ordered sequence of events, the time the event is generated or otherwise obtained may matter. Thus, if an event is not created within a certain time window, the floor lamp may not generate a pattern based on the event. For example, the floor lamp may have a trigger pattern equivalent to an 'on' event related to the wall switch and an 'on' event related to the stereo. If the floor lamp obtains the 'on' event related to the wall switch within the time window but the 'on' event related to the stereo is obtained outside of the time window, then the floor lamp may not recognize the trigger event. In some embodiments, a pattern may only be generated if an event A is obtained before event B. For example, if the floor lamp obtains the stereo 'on' event prior to the wall switch 'on' event, the floor lamp may not recognize these events as a trigger pattern because the floor lamp only accepts trigger patterns when the wall switch event is obtained first.

In some embodiments, multiple events may be reduced to a single event or a singlet. For example, the floor lamp may obtain two 'A' events at different times and then a 'B' event, which are stored in the lamp event buffer or memory. The floor lamp may generate a pattern based on one 'A' event and one 'B' event, discarding the second 'A' event. Thus, a trigger pattern having two 'A' events and a 'B' event may be reduced to a trigger pattern having one 'A' event and one 'B' event. Since the 'A' event is repeated at a different time, the floor lamp may ignore the repeated event.

In some embodiments, the floor lamp may conduct a series of heuristic calculations to determine whether to disregard the event. Some of these heuristic calculations may simply include a counting mechanism. For example, the floor lamp may determine whether it has received the 'A' event three times (e.g., an 'on' event related to the wall switch), at which point the floor lamp may generate a corresponding pattern such as a trigger pattern based on a heuristic rule of receiving the three 'A' events equates to generating a trigger pattern.

In some embodiments, the floor lamp may disregard time when creating patterns from events. Disregarding time may coincide with the heuristic calculations. For example, if the floor lamp receives three 'A' events and one 'B' event in memory 138, the floor lamp may perform a series of heuristic calculations to determine whether to generate a pattern based on the events without a time window. Disregarding time may also include order-independence. For example, the floor lamp may create the same pattern regardless of whether it obtains an 'A' event followed by a 'B' event or a 'B' event followed by an 'A' event.

In determination block 1112, the floor lamp may determine whether to apply a pattern filter. This may be similar to the event filter described with reference to determination block 1104, which may include stored ignore patterns, time-based filters, device type filters, etc. The floor lamp may employ the pattern filter to remove a pattern from memory (e.g., a 32K memory, 64K memory, etc.) when the pattern falls below a threshold, such as a time threshold. In response to the floor lamp determining that a pattern filter applies (i.e., determination block 1112="Yes"), the floor lamp may discard the pattern and refrain from further processing of that pattern in block 1113. In some embodiments, the floor lamp may filter patterns generated for recently conducted actions. For example, when the floor lamp turns on, the floor lamp may generate an action pattern from an event. If the action pattern was not ignored for a period of time, the floor lamp may try to process the action pattern as a trigger pattern to another action (e.g., to turn on the stereo). To avoid the creation of a new trigger-action association, the floor lamp may create a temporary ignore pattern filter in which the floor lamp ignores generated action patterns for a short period of time. After the floor lamp discards the pattern, the floor lamp returns to obtaining new events in block 1102. In some embodiments, the floor lamp may constantly obtain events in block 1102.

In some embodiments, the floor lamp may apply pattern filters if a trigger weight of the pattern or the corresponding reflex is below a low threshold value. By applying a pattern filter, the floor lamp may be able to remove patterns from its memory when the threshold value of a particular reflex is below a certain set value. The floor lamp may reduce the trigger weight of a reflex through the correcting process described throughout the application. Removing patterns may allow the floor lamp to conserve resources (e.g., memory) for the creation of new reflexes. In some embodiments, the floor lamp may be configured to utilize a predetermined, limited number of reflexes (e.g., 2 reflexes per lamp) so that users are less likely to get confused regarding the floor lamp's learned capabilities at any given time, regardless of the available local storage. Such limits to stored reflexes may also have the added benefit of improving performance, such as by improving pattern matching speeds by decreasing the number of patterns that may need to be compared due to fewer stored reflexes and patterns.

Referring back to determination block 1112, in response to determining that a pattern filter does not apply (i.e., determination block 1112="No"), the floor lamp may determine whether the generated pattern matches a known pattern in determination block 1114. For example, the floor lamp may determine that the received event is within the time window of the time based filter. Thus, the floor lamp continues to process the event as a pattern. The floor lamp may determine whether the generated pattern is a known pattern of any type, such as a known trigger pattern, a known correction pattern, a known reward pattern, etc.

As an example, in determination block 1114, the floor lamp may determine whether a generated pattern corresponds to a known trigger pattern of a reflex, such trigger pattern 'MD2' for reflex 'ReflexF1' described above with reference to FIG. 6. In response to determining that the generated pattern matches a known pattern, (i.e., determination block 1114="Yes"), the floor lamp may perform the operations of determination block 1202 described below with reference to FIG. 12. For example, the floor lamp may enter a triggered mode related to a reflex when the at least one event corresponds to a trigger pattern associated with the reflex, and may conduct an action associated with the reflex.

However, in response to determining that the generated pattern does not match a known pattern (i.e., determination block 1114=No), the floor lamp may determine whether to create a new reflex in determination block 1116. For example, as described above in the scenario of FIG. 7, the generated pattern may be pattern 'MD1' that does not correspond to a known pattern (i.e., ReflexF2 has not yet been created), and so the floor lamp may determine whether it should create a new reflex having pattern MD1 as its new trigger pattern. The floor lamp may decide whether a new reflex should be created based on whether both an unknown pattern was detected and a reflex is in its triggered mode.

In response to the floor lamp deciding not to create a new reflex (i.e., determination block 1116="No"), the floor lamp may discard the generated pattern in block 1113 and begin to monitor for new events in block 1102. In some embodiments, the floor lamp may be switched to a non-learning mode in which the floor lamp cannot learn new associations, thereby disabling its ability to create new reflexes. For example, the floor lamp may have previously learned to turn its light on/off when wall switch sends an event report message associated with an on/off event. A user may be satisfied with this simple on/off association and may disable any additional learning by the floor lamp. Thus, the floor lamp may not learn additional associations with occurrences (e.g., power on, etc.) at the stereo or any other learning device. In other embodiments, the floor lamp may have other considerations (e.g., not enough memory, triggered mode timed out, etc.) to keep it from learning a new reflex.

In response to the floor lamp deciding to create a new reflex (i.e., determination block 1116="Yes"), the floor lamp may store the new pattern as a trigger pattern for a new reflex in block 1118. A new reflex may be created with a predetermined action pattern, reward pattern and a correction pattern. Thus, in block 1119, the floor lamp may copy to the new reflex the action pattern, reward pattern, and correction pattern from the reflex that is currently in its triggered mode. For example, as illustrated in FIG. 6 above, the floor lamp may create ReflexF2 containing a new pattern MD1 as the trigger pattern, and copy the action pattern, the reward pattern, and the correction pattern from the only other known ReflexF1. In an alternative example, the floor lamp may create a new reflex by taking patterns from any other stored reflex in its triggered mode.

As previously noted, the floor lamp may obtain additional events while in the triggered mode, and such additional events may be associated with or correlated to a different trigger. The floor lamp may attempt to identify or match patterns based on these additional events to patterns of reflexes stored in memory. However, the patterns based on these additional events may not correspond to a known pattern of a stored reflex, and the floor lamp may decide to create a new reflex. In other words, the floor lamp may create a second reflex with a trigger pattern, action pattern, correction pattern, and reward pattern when patterns based on the additional events do not correspond to at least one of the trigger pattern, action pattern, correction pattern, and reward pattern associated with a known reflex.

Figure 12:
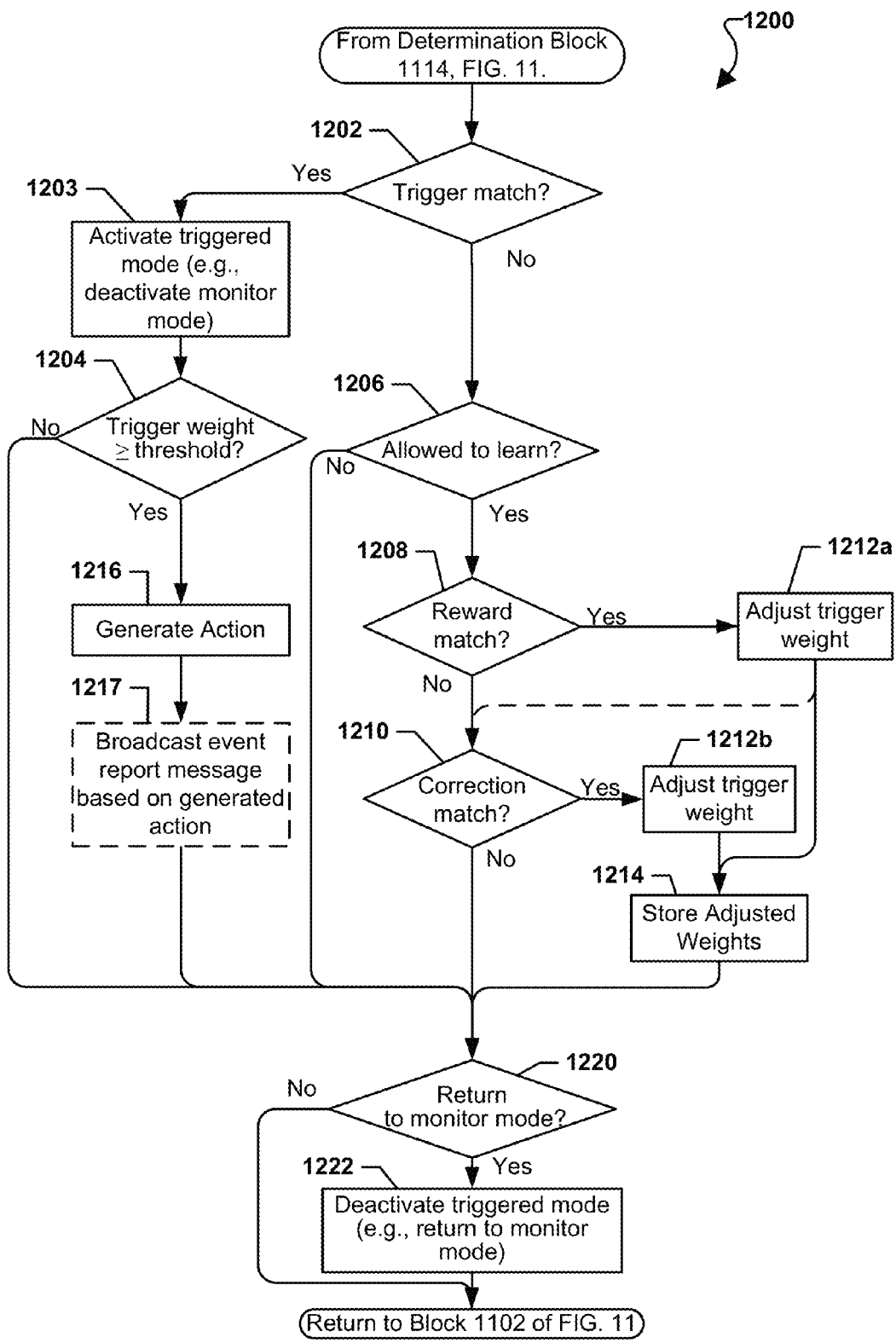
FIG. 12 is a process flow diagram illustrating embodiment operations for the adjustment of trigger weights for learning and unlearning.

FIG. 12 illustrates an embodiment method 1200 of continued processing of a matched pattern from FIG. 11. As described above, in response to determining that the generated pattern matches a known pattern, (i.e., determination block 1114 of FIG. 11="Yes"), the floor lamp may determine whether the generated pattern matches a known trigger pattern of a reflex in determination block 1202. For example, the floor lamp may determine whether the pattern generated based on a wall switch 'on' event matches a known trigger pattern of a stored reflex (e.g., pattern MD1 matches trigger pattern for ReflexF2 shown in FIG. 6). In response to the floor lamp determining that the generated pattern matches a known trigger pattern (i.e., determination block 1202="Yes"), the floor lamp may activate (or turn 'on') a triggered mode for the reflex associated with the known trigger pattern that matches the generated pattern in block 1203. Activating the triggered mode may de-activate the monitor mode associated with the reflex. It should be noted that the floor lamp may receive and identify additional events while in the triggered mode related to the reflex, such as other events that are associated with other reflexes, causing concurrently activated triggered modes.

The floor lamp may determine whether the trigger weight of the reflex of the matching pattern is equal to or above the trigger threshold in determination block 1204. Continuing with the example of FIG. 11, the floor lamp may determine that generated pattern MD1 matches a known trigger pattern of the recently created ReflexF2, and may compare the current stored trigger weight for the ReflexF2 to its respective trigger threshold. In determination block 1204, the floor lamp may determine whether the trigger weight is equal to or above the threshold. In response to determining that the trigger weight is equal to or above the threshold (i.e., determination block 1204="Yes"), the floor lamp may generate an action in block 1216, such as by using the reflex of the matching trigger pattern to generate a pattern or resulting event that causes the floor lamp to conduct or perform a predetermined action. For example, the floor lamp may turn on its light 124 if the trigger weight of ReflexF2 is above the trigger weight threshold 925 as illustrated in FIG. 9. In various embodiments, generating the action may include generating a pattern of events that may be further propagated externally or internally and that are used by a motor driver to drive an actuator.

In some embodiments, the floor lamp may be configured to generate a limited number of actions when in the triggered. For example, the floor lamp may only generate one action during any one triggered mode, regardless of the number of trigger patterns received during that triggered mode.

In optional block 1217, the floor lamp may broadcast an event report message based on the generated action, such as a broadcast message including occurrence data indicating the generated action (or its resulting event). In response to the floor lamp determining that the matched trigger weight is not greater than or equal to the trigger threshold for the reflex (i.e., determination block 1204="No"), or if the action is generated with the operations in block 1216 and a broadcast is made with the operations in optional block 1217, the floor lamp may perform the operations in determination block 1220 described below.

In response to the floor lamp determining that the generated pattern does not match a known trigger pattern (i.e., determination block 1202="No"), the floor lamp may determine whether the floor lamp is allowed to learn in determination block 1206. For example, the floor lamp may have previously processed the trigger pattern (e.g., MD1) and is currently monitoring for generated reward patterns and correction patterns while in a triggered mode. Thus, the floor lamp may obtain a reward event and generate the corresponding reward pattern (e.g., MD4) shortly after receiving the trigger pattern and entering the activated trigger mode for the associated reflex.

In response to determining that the floor lamp is not allowed to learn (i.e., determination block 1206="No"), the floor lamp may perform the operations in determination block 1220 described below. For example, the floor lamp may have a designated time window of five seconds after generating a trigger pattern to learn/unlearn a new action associated with the trigger pattern (e.g., MD1). As long as a reward pattern or correction pattern is generated within the five-second window, the floor lamp may learn/unlearn actions with the trigger pattern (e.g., MD1); however, the floor lamp may not learn new associations or unlearn old associations if the received reward/correction pattern is outside the five second time window. In another example, the floor lamp may not be able to learn simply because the associated reflex is in an unlearn state or the associated reflex is a static reflex which may not learn or unlearn.

However, if the floor lamp determines that it is allowed to learn regarding an action-trigger association of a reflex (i.e. determination block 1206="Yes"), in determination block 1208, the floor lamp may determine whether the generated pattern matches a reward pattern. In some embodiments, the floor lamp may receive or generate a reward pattern within a learning time window. For example, a user may press a reward button on the floor lamp within five seconds of switching on the wall switch and turning on the floor lamp. By pressing a reward button on the floor lamp, it may generate a reward pattern (e.g., pattern MD4 as illustrated in FIG. 7). In an alternative example, a user may turn on the lamp switch 126 attached to the floor lamp within five second of turning on the wall switch, causing the floor lamp to generate a reward pattern (e.g., MD4) when the lamp activates confirming that the floor lamp turned on.

In some embodiments, the floor lamp may be allowed to learn based on whether it is in the monitor mode or the trigger mode. For example, when in monitor mode for a particular reflex, the floor lamp is not allowed to learn regarding that reflex; however, learning may be allowed when in the triggered mode of the reflex. In some embodiments, one or more reflexes may be allowed to learn due to other factors, such as the overall state or configuration of the floor lamp. For example, the floor lamp may be configured to disallow any learning due to a system setting, such as an active debug mode during which various reflexes may be tested.

If the floor lamp determines that the generated pattern matches a reward pattern (i.e., determination block 1208="Yes"), in block 1212*a* the floor lamp may adjust the trigger weight of the associated reflex. In some embodiments, the floor lamp may adjust the trigger weight associated with the appropriate reflex by increasing the trigger weight. For example, if the floor lamp receives or generates a pattern (e.g., MD4) within a five-second learning time window of encountering a trigger pattern (e.g., MD1), the floor lamp may increase the trigger weight of the reflex of the trigger pattern. After the trigger weights are adjusted, in block 1214, the floor lamp may store the adjusted trigger weights in memory 138 and the floor lamp may perform the operations in determination block 1220 as described below.

In some embodiments, the floor lamp may optionally perform the operations in determination block 1210 after performing the operations in block 1212*a*. In other words, the floor lamp may be configured to evaluate both whether a reward pattern has been matched in determination block 1208 and whether a correction pattern has been matched in determination block 1210 in response to determining it is allowed to learn (i.e., determination block 1206="Yes"), regardless of the determinations of determination block 1208. In other words, reward and correction matches may be checked in parallel by the floor lamp.

If the floor lamp determines that the generated pattern does not match a known reward pattern (i.e., determination block 1208="No"), the floor lamp may check for a correction pattern match in determination block 1210. In some embodiments, the floor lamp may receive or generate a correction pattern within a learning time window. For example, a user may press a correction button on the floor lamp within five seconds of switching on the wall switch and turning on the floor lamp. By pressing the correction button, the floor lamp may generate a correction pattern (e.g., pattern MD5 as illustrated in FIG. 7). In an alternative example, a user may turn off the lamp switch 126 attached to the floor lamp within five-second of turning on the wall switch, causing the floor lamp to generate a correction pattern (e.g., MD4) when the floor lamp turns off its light 124.

If the floor lamp determines that the generated pattern matches a known correction pattern (i.e., determination block 1210="Yes"), the floor lamp may adjust the trigger weight in block 1212b. In some embodiments, the floor lamp may decrease the trigger weights after receiving a correction pattern within the learning time window. For example, the floor lamp may generate a correction pattern (e.g., pattern MD5) when a user turns the lamp switch 126 of the floor lamp to 'off' within five seconds of generating a trigger pattern (e.g., MD1) associated with an 'on' event of the wall switch. The floor lamp may match the generated pattern (MD5) as the correction pattern of ReflexF2 and reduce the trigger weight associated with ReflexF2. In block 1214, the floor lamp may store the adjusted weights in memory 138 and the floor lamp may perform the operations in determination block 1220 as described below. In other words, the floor lamp may adjust one or more trigger weights of the reflex when the at least one additional event corresponds to at least one of a correction pattern and a reward pattern associated with the reflex.

In response to the floor lamp determining that the generated pattern does not match a correction pattern (i.e., determination block 1210="No"), or in response to the floor lamp determining that the matched trigger weight is not greater than or equal to the trigger threshold (i.e., determination block 1204="No"), or in response to the floor lamp determining that is it not allowed to learn (i.e., determination block 1206="No"), or in response to the floor lamp performing the operations of blocks 1217 or 1214, the floor lamp may determine whether to return to a monitor mode in determination block 1220, such as based on an expired duration since entering the activated triggered mode with the operations in block 1203. De-activating the triggered mode may activate the monitor mode associated with the reflex. In response to the floor lamp determining that it should return to the monitor mode (i.e., determination block 1220="Yes"), the floor lamp may deactivate the triggered mode for the reflex in block 1222. In response to the floor lamp determining that it should not return to the monitor mode (i.e., determination block 1220="No") or when the operations of block 1222 have been performed, the floor lamp may continue obtaining events in block 1102 of method 1100 as described above with reference to FIG. 11.

As an illustration based on the scenario shown in FIG. 6, a wall switch may send a new event report message with new occurrence data that is received by the floor lamp (e.g., a wall switch 'on' event). The floor lamp may perform the operations of blocks 1102, 1104, 1108, and 1110 until it generates a first pattern (e.g., pattern MD1) associated with the event based on the received new event report message. Within the same time window, the floor lamp may generate a second pattern (e.g., pattern MD2) based on other occurrence data, and may process the second pattern with the operations in blocks 1102-114 as described above with reference to FIG. 11 and blocks 1202, 1203, 1204, 1216 as described above with reference to FIG. 12. The floor lamp may place a second reflex (e.g., ReflexF1) associated with the second pattern in a triggered mode based on these operations.

The floor lamp may then perform the operations in blocks 1102, 1104, 1108, and 1110 as described above with reference to FIG. 11 until it generates the first pattern (e.g., pattern MD1) associated with the event based on the received new event report message. The floor lamp may continue to process the new pattern by performing the operations of blocks 1112, 1114, 1116, 1118, 1119 as described above with reference to FIG. 11, creating a first reflex (e.g., ReflexF2) with the first pattern as its trigger pattern (e.g., pattern MD1) and copying its action, reward, and correction patterns from the second reflex (e.g., ReflexF1) as the second reflex is in its triggered mode.

If the floor lamp subsequently obtains the same event and generates the first pattern (e.g., pattern MD1) based on other data received from the wall switch, the floor lamp may process the first pattern with reference to the first reflex in the operations of blocks 1102, 1104, 1108, 1110, 1112, and 1114 as described above with reference to FIG. 11. In determination block 1114, the floor lamp may determine that the generated pattern (e.g., pattern MD1) associated with the wall switch matches a known pattern because the pattern associated with the wall switch is now known as a trigger pattern of the first reflex (e.g., ReflexF2) stored in memory. Thus, the floor lamp may continue to perform the operations described above with reference to FIG. 12 for continued processing of the generated pattern for the wall switch 'on' event.

Continuing with the illustration, the floor lamp may process the matched first pattern (MD1) from the new wall switch event and determine that the matched pattern is a trigger pattern match (i.e., determination block 1202="Yes") and may activate the triggered mode for the first reflex (e.g., ReflexF2). However, the trigger weight for the first reflex (e.g., ReflexF2) may be below its trigger threshold, in which case the floor lamp will not generate an action in block 1216 but instead may continue to monitor for other events/patterns. On the other hand, the floor lamp may encounter a different trigger event, such as an 'on' event from the lamp switch 126. The floor lamp may process the on-event from the lamp switch 126 through blocks 1102, 1104, 1108, and 1110 of method 1100 as described above with reference to FIG. 11, generating the second pattern (e.g., pattern MD2) associated with the on-event of the lamp switch 126. The floor lamp may continue processing the on-event pattern through the operations of blocks 1112, 1114 and 1202 as described above with reference to FIG. 11 and FIG. 12. In determination block 1202 of method 1200, the floor lamp may determine that the second patter (MD2) is a trigger pattern match for the second reflex (ReflexF1), and in determination block 1204 determine that the trigger weight for the second reflex is above a threshold value. In that case, based on the trigger weight of the second reflex, the floor lamp may generate an action pattern and associated action (e.g., turning on the light) in block 1216 as described above with reference to FIG. 12. By turning on the light, the floor lamp may generate a reward event and a subsequent reward pattern (e.g., pattern MD4) in block 1110 as described above with reference to FIG. 11. The floor lamp may process the reward pattern through methods 1100 and 1200 as described above until in determination block 1208 the floor lamp determines that the generated reward pattern (MD4) matches the reward pattern of the first reflex (ReflexF2). The floor lamp may adjust the weights associated with ReflexF2 by increasing its trigger weight and storing the adjustment in memory 138, thereby learning the association between the on-event at wall switch and the on-event at floor lamp. This process may be repeated by the floor lamp until the trigger weight of the first reflex (e.g., ReflexF2) is above the trigger threshold, such as shown in FIG. 9.

The embodiment methods described above with reference to FIGS. 11 and 12 may function as a type of recursive algorithm, since events are obtained and stored for a time window, any number of events may be obtained during the time window, and processing of stored events to identify matched patterns and learn new correlations or reflexes may encompass multiple events and combinations of events and reflexes. In order to further disclose how the embodiments may function to enable a user to train embodiment smart boxes and learning devices, the following example of user actions implementing such devices is provided. In this example, a user trains two learning devices, namely a wall switch and a floor lamp, that have not been previously associated with one another. For ease of description, the following references to the floor lamp or wall switch are meant to encompass their associated smart boxes.

In this example, each of the floor lamp and wall switch may have a predefined reflex stored in the memory of their associated smart box. For example, the wall switch may have a predefined reflex, ReflexW, stored in memory that may include a trigger pattern, 'WT', an action pattern, 'WA', a correction pattern, 'WC', and a reward pattern, 'WR'. The trigger pattern, WT, may correspond to a trigger event where a user toggles the wall switch from 'off' to 'on'. When the user toggles the wall switch from 'off' to 'on', the wall switch may generate an event as well as broadcast an event report message including occurrence data related to the 'on' event. From the generated event related to the wall switch's 'on' event, a smart box included within or coupled to the wall switch may generate the trigger pattern WT. Initially, the action pattern, WA, may not correspond to a real life action such as toggling a switch. Instead, WA may simply be computer code ready to be assigned to future reflexes.

The correction pattern WC may correspond to a button on the wall switch labeled "Correction." When a user presses the correction button, the wall switch may generate a correction event as well as broadcast another event report message with occurrence data indicating the correction event. From the generated correction event, the smart box associated with the wall switch may generate the correction pattern WC. The reward pattern, WR, may correspond to an event in which the user presses a reward button on the wall switch labeled "Reward." When the user presses the reward button, the wall switch may generate a reward event as well as broadcast another event report message with occurrence data indicating the reward event. From the generated reward event, the smart box associated with the wall switch may generate the reward pattern, WR.

Similarly, the floor lamp may have a predefined reflex, ReflexF2, stored in memory that may include a trigger pattern, MD1, an action pattern, MD3, a correction pattern, MD5, and a reward pattern, MD4. The trigger pattern, MD1, may correspond to a trigger event in which the user toggles a lamp switch of the floor lamp from off to on. When the user toggles the lamp switch from 'off' to 'on', the wall switch may generate a trigger event as well as broadcast an event report message with occurrence data indicating the lamp's 'on' event. From the generated trigger event, a smart box included within or coupled to the floor lamp may generate the trigger pattern MD1. The action pattern, MD3, may correspond to an event in which the floor lamp turns its light from 'off' to 'on'. The correction pattern, MD5, may correspond to an additional button on the floor lamp labeled "Correction" when the floor lamp is in a triggered mode. When a user presses the correction button, the lamp may generate a correction event as well as broadcast an event report message with occurrence data indicating the lamp's correction event. From the generated correction event, the smart box associated with the floor lamp may generate the correction pattern MD5. The reward pattern, MD4, corresponds to when the user turns on the floor lamp within the triggered mode, generating a reward event as well as broadcasting an event report message with occurrence data indicating the lamp's reward event. From the reward event, the smart box associated with the floor lamp may generate the reward pattern MD4.

With the wall switch and floor lamp initially configured in this manner, a user may train the floor lamp to turn on in response to the wall switch as follows. With the wall switch in the 'off' position and the floor lamp turned off, the user may turn on the wall switch and promptly turn on the floor lamp via manual operations (e.g., flipping switches on the devices). If the two actions are accomplished within a short time period (e.g., 5 to 10 seconds), the smart box associated with the floor lamp may begin to learn the turn-on action correlation by increasing a weight associated with the lamp-on reflex. Similarly, the user may teach the floor lamp to respond to the wall switch being turned off by turning off the wall switch and promptly turning off the floor lamp. Again, if the two actions are accomplished within a short time period (e.g., 5 to 10 seconds), the smart box associated with the floor lamp may begin to learn the turn-off action correlation by increasing a weight associated with the lamp-off reflex.

One such training cycle may not be enough (except in some embodiments in which a previously untrained smart box will learn a first reflex-event correlation in a single step), so the user may repeat the process of turning on the wall switch and promptly turning on the floor lamp, followed a while later by turning off the wall switch and promptly turning off the floor lamp. This series of steps may need to be repeated three or more times, depending upon the learning hysteresis configuration of the smart box associated with the floor lamp.

After two, three or more repetitions, the smart box associated with the floor lamp may have increased the weight associated with the lamp-on and lamp-off reflexes such that a subsequent toggle of the wall switch will cause the floor lamp to turn on or off accordingly. Thus, to train this desired correlation of the wall switch on/off events to the floor lamp on/off actions, the user may simply repeat the process until the floor lamp begins turning on in response to the user toggling the wall switch.

This series of actions by the user causes the following actions to occur within the smart boxes associated with the wall switch and the floor lamp. When the smart box associated with the wall switch senses the 'off' to 'on' toggle, the wall switch may generate a trigger event and associated occurrence data that may be broadcast in an event report message for all learning devices within its broadcast range (e.g., 100 feet) to receive. The smart box associated with the floor lamp, being within the broadcast range of the wall switch, may receive the event report message. Upon receipt, the floor lamp may generate a related event and determine whether an event filter stored in memory prevents further processing of the generated event. In a default state, the floor lamp may not apply a filter to the generated event, thus the floor lamp may store the generated event in a memory. Based on the generated event, the floor lamp may generate the pattern MD2.

Initially, the floor lamp only has stored patterns associated with ReflexF2 in memory (e.g., MD1, MD3, MD5, and MD4). It is assumed for the purposes of this example that the floor lamp is already within a triggered mode for ReflexF2, such as in response to generating the trigger pattern for ReflexF2, pattern MD1, within the same time window as generating the pattern MD2. As the generated pattern MD2 does not match any pattern of the ReflexF2, the generated pattern MD2 may be considered an unknown pattern that may be used as a trigger pattern for a new reflex. The floor lamp may determine whether to create a new reflex with the unknown or unmatched pattern MD2. The floor lamp may have many different reasons to not create a new reflex. For example, the floor lamp may be in a learning prevention mode (e.g., a hold mode) or the floor lamp may be prohibited from creating reflexes from certain patterns associated with a particular device (e.g., the floor lamp will not create reflexes from patterns associated with the wall switch).

In this example the floor lamp is not prevented from creating a new reflex, so the floor lamp may create a new reflex, ReflexF1, with the unknown pattern, MD2, as its trigger pattern. The new reflex, ReflexF1, will include an action pattern, a correction pattern, and a reward pattern to be a complete reflex. Thus, the floor lamp may use patterns from the only known reflex in a triggered mode, ReflexF2, by copying the action, correction, and reward patterns that it has stored in memory (e.g., MD3, MD5, and MD4) and assign those patterns to the new ReflexF1 along with the new trigger pattern MD2. Depending on the settings of the floor lamp, the floor lamp may have just learned a new association between the trigger event related to the wall switch toggling on and the activation of the floor lamp's light. For example, the floor lamp may be in a critical learning period 801 (as shown in FIG. 8) in which the floor lamp learns new reflexes immediately (e.g., a single on/off sequence performed on the floor lamp). Thus, the floor lamp may activate its light once the wall switch toggles from 'off' to 'on'. However, for the purpose of this example, it is assumed that the floor lamp is not in a critical period and has yet to fully learn the association between the wall switch toggle from 'off' to 'on' and activating the light of the floor lamp.

When the user turns on the floor lamp shortly after toggling the wall switch, the smart box associated with the floor lamp may correlate that lamp-on event with the new reflex, ReflexF1, with the recently learned pattern, MD2, as its trigger pattern. The actions of the wall switch being turned off and the floor lamp being turned off soon thereafter may generate similar responses in the wall switch and floor lamp.

When the wall switch is toggled a second time from 'off' to 'on', the associated occurrence data of the on event may again be broadcast in an event report message and received by the floor lamp. Again the floor lamp may process the related event report message with the occurrence data, generating an event and eventually pattern MD2. However, this time the floor lamp matches generated pattern MD2 to the known pattern of ReflexF1. In response to this matching, the floor lamp may also determine that there is a match between pattern MD2 and the stored trigger pattern of ReflexF1 and may enter triggered mode with respect to ReflexF1. Further, the floor lamp may determine whether the trigger weight of ReflexF1 is equal to or above the trigger weight threshold. In this example after only one training cycle, the floor lamp may determine that the trigger weight of ReflexF1 is not equal to or above the trigger weight threshold because ReflexF1 is a new reflex. Thus, the floor lamp may continue to monitor for more events while in the triggered mode for ReflexF1.

When the user turns on the floor lamp within the 5-10 second time window, the floor lamp may generate a reward event which eventually causes the floor lamp to generate reward pattern MD4. The floor lamp processes MD4 and determines that there is a reward pattern match with ReflexF1. In response, the floor lamp, still in the triggered mode with respect to ReflexF1, may increase the trigger weight of ReflexF1. After adjusting the weights or after the 5-10 second time window, the floor lamp may exit the triggered mode with respect to ReflexF1 and enter a monitoring mode where the floor lamp monitors for more events.

Sometime later, the user may toggle the wall switch to on a third time again causing the wall switch to broadcast an event report message with occurrence data that is received by the floor lamp. Again, based on data in the received message, the floor lamp may generate a related event and then pattern MD2. The floor lamp may determine that there is a trigger match between generated pattern MD2 and the trigger pattern of ReflexF1 and may enter the triggered mode with respect to ReflexF1 for a third time. Once again, the floor lamp may determine whether the trigger weight of ReflexF1 is equal to or above the trigger weight threshold. For a third time, the floor lamp may determine that the trigger weight of ReflexF1 is not equal to or above the trigger weight threshold because ReflexF1 is a new reflex. Thus, the floor lamp continues to monitor for more events while in the triggered mode.

Still within the 5-10 second time window of the recent triggered mode of ReflexF1, the user may turn on the floor lamp for third time. In response the floor lamp generates the reward event which eventually causes the floor lamp to generate reward pattern MD4. The floor lamp may process pattern MD4 and determine that there is a reward pattern match with ReflexF1. The floor lamp still in the triggered mode with respect to ReflexF1 may increase the trigger weight of ReflexF1 above the trigger threshold.

Sometime later, when user toggles the wall switch from 'off' to 'on' for a fourth time the same sequence of events occurs, only this time the floor lamp may determine that the trigger weight of ReflexF1 is equal to or above its threshold and therefore it generates the action pattern MD3. In response to the action pattern MD3, the floor lamp may generate an associated action event that energizes a motor controller that turns on the light of the floor lamp. Thereafter, the floor lamp will be turned on in response to the user toggling the wall switch from 'off' to 'on'.

Users of decentralized systems of learning devices may train such learning devices to adapt intelligently to different situations within a location. However, different form factors of learning devices may be valuable for different users, locations, and applications. In particular, to avoid compelling users to purchase all new devices (e.g., furniture, appliances, etc.), existing devices may need to be retrofitted or adapted to include the intelligence of smart boxes to turn them into learning devices. FIGS. 13A-14B illustrate exemplary form factors and/or configurations for smart boxes in relation to other devices within a location. In particular, adapters may be used that convert an otherwise non-programmable or non-learning device into a smart box-enabled device that is capable of learning. Such adapters may include processing logic (i.e., a "brain"), as well as reporters which may be units within the location that exchange data wirelessly with their corresponding brain, as well as other smart boxes in the location.

Figure 13A:
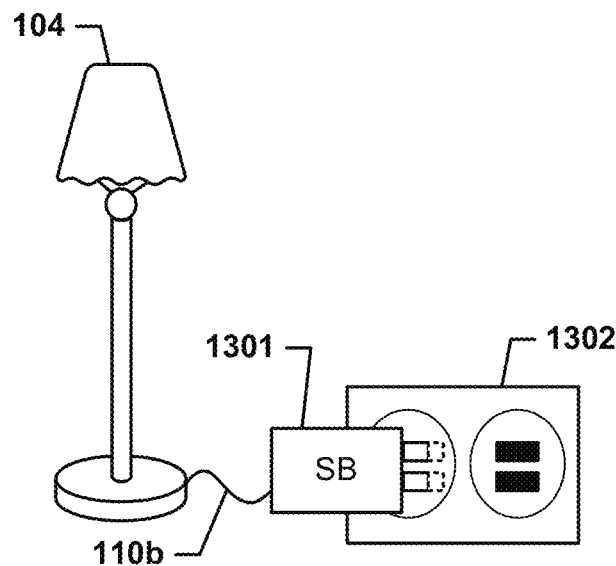
FIGS. 13A-14B are diagrams illustrating exemplary configurations for learning devices within a location suitable for use in various embodiments.

FIG. 13A illustrates an embodiment adapter that may include both a brain and a reporter. In other words, FIG. 13A illustrates a smart box adapter 1301 similar to the smart boxes described above with reference to FIG. 1A. The adapter 1301 may be directly connected to a power outlet 1302 (e.g., an AC power outlet), such as via a two or three-prong connector, as well as to a floor lamp via a connection 110*b* (e.g., a cord and plug from the floor lamp).

With the adapter 1301 in between the outlet 1302 and the floor lamp, the adapter 1301 may be capable of detecting and regulating power draws to the floor lamp, such as via a relay. With a reporter (not shown in FIG. 13A) included, the adapter 1301 may also be configured to wirelessly transmit signals indicating events related to the operations of the floor lamp, such as event report messages with occurrence data indicating power on/off events occurring at the floor lamp.

Figure 13B:
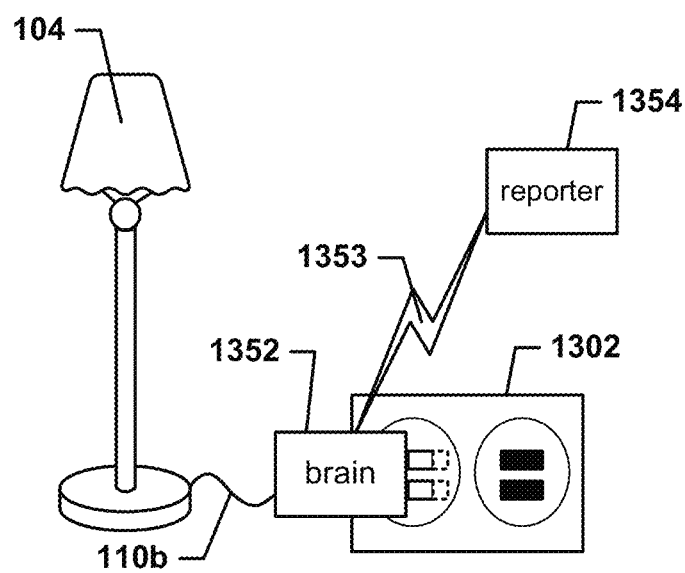

FIG. 13B illustrates another embodiment adapter 1352 that is similar to the adapter 1301 illustrated in FIG. 13A, except that the adapter 1352 may only include the brain element without a directly attached or included reporter unit. In particular, the adapter 1352 without a reporter included may be connected to the power outlet 1302 as well as to the floor lamp via the connection 110b. The reporter 1354 may be placed nearby within the same location, such as on a wall, desk, table top, etc., such that the reporter 1354 is within wireless signal reception range of the adapter 1352. In various embodiments, the reporter 1354 may be a simple wall switch with a wireless transmitter that transmits state changes (e.g., on/off changes), a clock that transmits time changes at various increments (e.g., second, minute, hour, day, etc.), a light sensor that transmits brightness levels, and other similar transmitter devices.

Figure 14A:
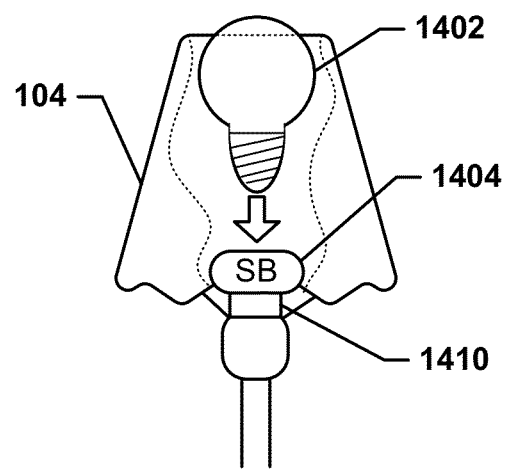

FIG. 14A illustrates another embodiment smart box adapter 1404 that is configured to be placed in the electrical connection between a bulb 1402 and the floor lamp. The adapter 1404 may be inserted within a conventional bulb socket 1410 of the floor lamp such that the adapter 1404 may be in connection with and positioned between the bulb 1402 and the socket 1410. For example, the adapter 1404 may be a ring placed under the bulb 1402. In some embodiments, adapters 1404, 1450 may be configured to draw heat energy from the bulb 1402 that may be used to recharge an internal battery.

Figure 14B:
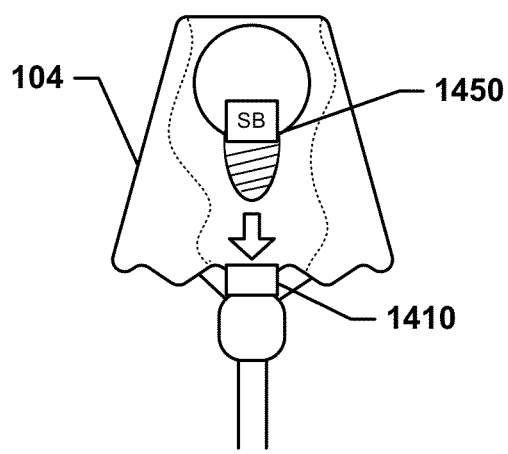

In some embodiments, adapters may be included within replaceable objects (or smart replaceable objects). In this way, intelligence may be integrated in disposable/replaceable components of an appliance so that users may cheaply and easily upgrade pre-existing appliances within a location to be capable of learning (i.e., convert ordinary appliances into learning devices). FIG. 14B illustrates a disposable smart box adapter 1450 included within a bulb (i.e., a "smart bulb") that may replace conventional light bulbs. With such a smart bulb, users may avoid buying a smart lamp in order to have a lamp capable of learning to behave based on occurrences within the location. For example, the adapter 1450 installed within a socket 1410 of a floor lamp may be trained to turn on or off when the adapter receives event report messages with occurrence data related to known trigger patterns from nearby smart boxes (i.e., a connector within the smart bulb may switch the light on/off without using an actual lamp switch). Other exemplary uses of replaceable objects having learning device capabilities may include refrigerator filters, batteries for various battery-powered devices, a toilet seat, faucets, upholstery covers (e.g., sofa, pillow, etc.).

In various embodiments, adapters may need to charge an internal battery in order to ensure operability even when an associated device is turned off. For example, when connected to the socket 1410 as shown in FIGS. 14A-B, the adapters 1404, 1450 may be configured to charge a rechargeable battery with current received via the floor lamp. In various embodiments, such adapters may include circuitry, processing units, and sensors.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware, such as smart box 103, is used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, a dedicated smart device ASIC, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory processor-readable (or computer-readable) storage medium, non-transitory computer-readable medium or non-transitory processor-readable medium. The steps of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for continuous configuration of a first learning device, comprising:
   storing, by the first learning device, events obtained while in a monitoring mode;
   activating, by the first learning device, a first triggered mode for a first reflex when at least one of the stored events corresponds to a first trigger pattern associated with the first reflex, wherein the first reflex indicates a correlation between at least the first trigger pattern and a predetermined action;
   determining whether the first reflex has a trigger weight exceeding a trigger weight threshold;
   conducting the predetermined action associated with the first reflex in response to determining that the trigger weight associated with the first reflex exceeds the trigger weight threshold;
   obtaining at least one additional event while in the first triggered mode;
   determining whether the at least one additional event corresponds to a first correction pattern or a first reward pattern;
   adjusting the trigger weight of the first reflex when the at least one additional event corresponds to at least one of the first correction pattern and the first reward pattern associated with the first reflex and occurring in response to conducting the predetermined action, wherein the adjustment to the trigger weight of the first reflex is different in response to determining that the at least one additional event corresponds to the first correction pattern, than the adjustment to the trigger weight in response to determining that the at least one additional event corresponds to the first reward pattern; and
   creating a second reflex with a second trigger pattern, a second correction pattern, and a second reward pattern when the at least one additional event does not correspond to at least one of the first trigger pattern, the first correction pattern, and the first reward pattern associated with the first reflex.

2. The method of claim 1, wherein adjusting the trigger weight of the first reflex further comprises:
   increasing the trigger weight of the first reflex when the at least one additional event corresponds to the first reward pattern of the first reflex; and
   decreasing the trigger weight of the first reflex when the at least one additional event corresponds to the first correction pattern of the first reflex.

3. The method of claim 2, further comprising:
   entering a critical learning period with the first reflex during which a high gain set is applied to the trigger weight.

4. The method of claim 2, further comprising:
   entering a steady state learning period with the first reflex during which a low gain set is applied to the trigger weight.

5. The method of claim 1, wherein obtaining the at least one additional event while in the first triggered mode further comprises:
   retrieving prior events from a memory.

6. The method of claim 1, wherein storing, by the first learning device, events obtained while in the monitoring mode comprises:
   storing, in a memory, at least one event for a window of time such that the at least one event and associated patterns are removed from the memory after the window of time.

7. The method of claim 1, wherein at least one of the stored events is obtained based on occurrence data that is generated locally.

8. The method of claim 1, wherein at least one of the stored events is obtained based on occurrence data that is generated remotely.

9. The method of claim 8, wherein the at least one of the stored events that is obtained based on the occurrence data that is generated remotely is generated in response to the first learning device receiving an event report message from a second learning device, wherein the first learning device and the second learning device are part of a decentralized system comprised of a plurality of learning devices in a location that are connected via a wired or a wireless communication link.

10. The method of claim 8, wherein the at least one of the stored events that is obtained based on the occurrence data that is generated remotely corresponds to at least one of the first reward pattern and the first correction pattern.

11. The method of claim 1, wherein at least one of the stored events is obtained based on occurrence data that is received from non-learning devices via a wired or wireless communication link.

12. The method of claim 1, further comprising:
   concurrently activating a second triggered mode when the at least one additional event corresponds to a different trigger pattern associated with a third reflex.

13. The method of claim 1, wherein conducting the predetermined action associated with the first reflex in response to determining that the trigger weight associated with the first reflex exceeds the trigger weight threshold comprises:
   generating a resulting event based on conducting the predetermined action; and
   broadcasting an event report message that indicates the resulting event and that is capable of being used by another learning device.

14. The method of claim 1, further comprising:
   receiving, at the first learning device, an event report message from another learning device, wherein the received event report message indicates another event that was generated by the another learning device in response to the another learning device obtaining another event that corresponds to the first trigger pattern.

15. The method of claim 1, wherein activating the first triggered mode for the first reflex associated with the predetermined action when at least one of the stored events corresponds to the first trigger pattern associated with the first reflex comprises:
  applying a pattern filter to a pattern based on the at least one of the stored events; and
  activating the first triggered mode for the first reflex associated with the predetermined action when the at least one of the stored events corresponds to the first trigger pattern associated with the first reflex and when the pattern is not discarded based on the applied pattern filter.

16. The method of claim 1, wherein the first reflex and the second reflex are only removable from the first learning device based on a garbage collection policy.

17. The method of claim 1, wherein conducting the predetermined action associated with the first reflex in response to determining that the trigger weight associated with the first reflex exceeds the trigger weight threshold comprises generating a pattern of events that are used by a motor driver to drive an actuator.

18. The method of claim 1, wherein one or more of the first correction pattern and the first reward pattern are order-dependent.

19. The method of claim 1, wherein one or more of the first correction pattern and the first reward pattern are order-independent.

20. The method of claim 1, wherein obtaining the at least one additional event while in the first triggered mode comprises obtaining the at least one additional event based on one or more periodic timing mechanisms.

21. The method of claim 20, further comprising polling one or more sensors based on the one or more periodic timing mechanisms.

22. The method of claim 20, wherein the one or more periodic timing mechanisms are shared by multiple learning devices.

23. A learning device, comprising:
  a processor configured with processor-executable instructions for performing operations comprising:
    storing, by the processor of the learning device, events obtained while in a monitoring mode;
    activating, by the processor of the learning device, a first triggered mode for a first reflex when at least one of the stored events corresponds to a first trigger pattern associated with the first reflex, wherein the first reflex indicates a correlation between at least the first trigger pattern and a predetermined action;
    determining whether the first reflex has a trigger weight exceeding a trigger weight threshold;
    conducting the predetermined action associated with the first reflex in response to determining that the trigger weight associated with the first reflex exceeds the trigger weight threshold;
    obtaining at least one additional event while in the first triggered mode;
    determining whether the at least one additional event corresponds to a first correction pattern or a first reward pattern;
    adjusting the trigger weight of the first reflex when the at least one additional event corresponds to at least one of the first correction pattern and the first reward pattern associated with the first reflex and occurring in response to conducting the predetermined action, wherein the adjustment to the trigger weight of the first reflex is different in response to determining that the at least one additional event corresponds to the first correction pattern, than the adjustment to the trigger weight in response to determining that the at least one additional event corresponds to the first reward pattern; and
    creating a second reflex with a second trigger pattern, a second correction pattern, and a second reward pattern when the at least one additional event does not correspond to at least one of the first trigger pattern, the first correction pattern, and the first reward pattern associated with the first reflex.

24. The learning device of claim 23, wherein the processor is configured with processor-executable instructions for performing operations such that adjusting the trigger weight of the first reflex further comprises:
  increasing the trigger weight of the first reflex when the at least one additional event corresponds to the first reward pattern of the first reflex; and
  decreasing the trigger weight of the first reflex when the at least one additional event corresponds to the first correction pattern of the first reflex.

25. The learning device of claim 24, wherein the processor is configured with processor-executable instructions for performing operations further comprising:
  entering a critical learning period with the first reflex during which a high gain set is applied to the trigger weight.

26. The learning device of claim 24, wherein the processor is configured with processor-executable instructions for performing operations further comprising:
  entering a steady state learning period with the first reflex during which a low gain set is applied to the trigger weight.

27. The learning device of claim 23, wherein the processor is configured with processor-executable instructions for performing operations such that obtaining the at least one additional event while in the first triggered mode further comprises:
  retrieving prior events from a memory.

28. The learning device of claim 23, wherein the processor is configured with processor-executable instructions for performing operations such that storing events obtained while in the monitoring mode comprises:
  storing, in a memory, at least one event for a window of time such that the at least one event and associated patterns are removed from the memory after the window of time.

29. The learning device of claim 23, wherein at least one of the stored events is obtained based on occurrence data that is generated locally.

30. The learning device of claim 23, wherein at least one of the stored events is obtained based on occurrence data that is generated remotely.

31. The learning device of claim 30, wherein the at least one of the stored events that is obtained based on the occurrence data that is generated remotely is generated in response to the learning device receiving an event report message from another learning device, wherein the learning device and the another learning device are part of a decentralized system comprised of a plurality of learning devices in a location that are connected via a wired or a wireless communication link.

32. The learning device of claim 30, wherein the at least one of the stored events that is obtained based on the occurrence data that is generated remotely corresponds to at least one of the first reward pattern and the first correction pattern.

33. The learning device of claim 23, wherein at least one of the stored events is obtained based on occurrence data that is received from non-learning devices via a wired or wireless communication link.

34. The learning device of claim 23, wherein the processor is configured with processor-executable instructions for performing operations further comprising:
concurrently activating a second triggered mode when the at least one additional event corresponds to a different trigger pattern associated with a third reflex.

35. The learning device of claim 23, wherein the processor is configured with processor-executable instructions for performing operations such that conducting the predetermined action associated with the first reflex in response to determining that the trigger weight associated with the first reflex exceeds the trigger weight threshold comprises:
generating a resulting event based on conducting the predetermined action; and
broadcasting an event report message that indicates the resulting event and that is capable of being used by another learning device.

36. The learning device of claim 23, wherein the processor is configured with processor-executable instructions for performing operations further comprising:
receiving an event report message from another learning device, wherein the received event report message indicates another event that was generated by the another learning device in response to the another learning device obtaining another event that corresponds to the first trigger pattern.

37. The learning device of claim 23, wherein the processor is configured with processor-executable instructions for performing operations such that activating the first triggered mode for the first reflex associated with the predetermined action when at least one of the stored events corresponds to the first trigger pattern associated with the first reflex comprises:
applying a pattern filter to a pattern based on the at least one of the stored events; and
activating the first triggered mode for the first reflex associated with the predetermined action when the at least one of the stored events corresponds to the first trigger pattern associated with the first reflex and when the pattern is not discarded based on the applied pattern filter.

38. The learning device of claim 23, wherein the first reflex and the second reflex are only removable from the learning device based on a garbage collection policy.

39. The learning device of claim 23, wherein the processor is configured with processor-executable instructions for performing operations such that conducting the predetermined action associated with the first reflex in response to determining that the trigger weight associated with the first reflex exceeds the trigger weight threshold comprises generating a pattern of events that are used by a motor driver to drive an actuator.

40. The learning device of claim 23, wherein one or more of the first correction pattern and the first reward pattern are order-dependent.

41. The learning device of claim 23, wherein one or more of the first correction pattern and the first reward pattern are order-independent.

42. The learning device of claim 23, wherein the processor is configured with processor-executable instructions for performing operations such that obtaining the at least one additional event while in the first triggered mode comprises obtaining the at least one additional event based on one or more periodic timing mechanisms.

43. The learning device of claim 42, wherein the processor is configured with processor-executable instructions for performing operations further comprising polling one or more sensors based on the one or more periodic timing mechanisms.

44. The learning device of claim 42, wherein the one or more periodic timing mechanisms are shared by multiple learning devices.

45. A non-transitory processor-readable storage medium having stored thereon processor-executable instructions configured to cause a processor of a learning device to perform operations comprising:
storing, by the processor of the learning device, events obtained while in a monitoring mode;
activating, by the processor of the learning device, a first triggered mode for a first reflex when at least one of the stored events corresponds to a first trigger pattern associated with the first reflex, wherein the first reflex indicates a correlation between at least the first trigger pattern and a predetermined action;
determining whether the first reflex has a trigger weight exceeding a trigger weight threshold;
conducting the predetermined action associated with the first reflex in response to determining that the trigger weight associated with the first reflex exceeds the trigger weight threshold;
obtaining at least one additional event while in the first triggered mode;
determining whether the at least one additional event corresponds to a first correction pattern or a first reward pattern;
adjusting the trigger weight of the first reflex when the at least one additional event corresponds to at least one of the first correction pattern and the first reward pattern associated with the first reflex and occurring in response to conducting the predetermined action, wherein the adjustment to the trigger weight of the first reflex is different in response to determining that the at least one additional event corresponds to the first correction pattern, than the adjustment to the trigger weight in response to determining that the at least one additional event corresponds to the first reward pattern; and
creating a second reflex with a second trigger pattern, a second correction pattern, and a second reward pattern when the at least one additional event does not correspond to at least one of the first trigger pattern, the first correction pattern, and the first reward pattern associated with the first reflex.

46. The non-transitory processor-readable storage medium of claim 45, wherein the stored processor-executable instructions are configured to cause the processor to perform operations such that adjusting the trigger weight of the first reflex further comprises:
increasing the trigger weight of the first reflex when the at least one additional event corresponds to the first reward pattern of the first reflex; and
decreasing the trigger weight of the first reflex when the at least one additional event corresponds to the first correction pattern of the first reflex.

47. The non-transitory processor-readable storage medium of claim 46, wherein the stored processor-executable instructions are configured to cause the processor to perform operations further comprising:

entering a critical learning period with the first reflex during which a high gain set is applied to the trigger weight.

48. The non-transitory processor-readable storage medium of claim 46, wherein the stored processor-executable instructions are configured to cause the processor to perform operations further comprising:
entering a steady state learning period with the first reflex during which a low gain set is applied to the trigger weight.

49. The non-transitory processor-readable storage medium of claim 45, wherein the stored processor-executable instructions are configured to cause the processor to perform operations such that obtaining the at least one additional event while in the first triggered mode further comprises:
retrieving prior events from a memory.

50. The non-transitory processor-readable storage medium of claim 45, wherein the stored processor-executable instructions are configured to cause the processor to perform operations such that storing events obtained while in the monitoring mode comprises storing, in a memory, at least one event for a window of time such that the at least one event and associated patterns are removed from the memory after the window of time.

51. The non-transitory processor-readable storage medium of claim 45, wherein at least one of the stored events is obtained based on occurrence data that is generated locally.

52. The non-transitory processor-readable storage medium of claim 45, wherein at least one of the stored events is obtained based on occurrence data that is generated remotely.

53. The non-transitory processor-readable storage medium of claim 52, wherein the at least one of the stored events that is obtained based on the occurrence data that is generated remotely is generated in response to the learning device receiving an event report message from another learning device, wherein the learning device and the another learning device are part of a decentralized system comprised of a plurality of learning devices in a location that are connected via a wired or a wireless communication link.

54. The non-transitory processor-readable storage medium of claim 52, wherein the at least one of the stored events that is obtained based on the occurrence data that is generated remotely corresponds to at least one of the first reward pattern and the first correction pattern.

55. The non-transitory processor-readable storage medium of claim 45, wherein at least one of the stored events is obtained based on occurrence data that is received from non-learning devices via a wired or wireless communication link.

56. The non-transitory processor-readable storage medium of claim 45, wherein the stored processor-executable instructions are configured to cause the processor to perform operations further comprising:
concurrently activating a second triggered mode when the at least one additional event corresponds to a different trigger pattern associated with a third reflex.

57. The non-transitory processor-readable storage medium of claim 45, wherein the stored processor-executable instructions are configured to cause the processor to perform operations such that conducting the predetermined action associated with the first reflex in response to determining that the trigger weight associated with the first reflex exceeds the trigger weight threshold comprises:
generating a resulting event based on conducting the predetermined action; and
broadcasting an event report message that indicates the resulting event and that is capable of being used by another learning device.

58. The non-transitory processor-readable storage medium of claim 45, wherein the stored processor-executable instructions are configured to cause the processor to perform operations further comprising:
receiving an event report message from another learning device, wherein the received event report message indicates another event that was generated by the another learning device in response to the another learning device obtaining another event that corresponds to the first trigger pattern.

59. The non-transitory processor-readable storage medium of claim 45, wherein the stored processor-executable instructions are configured to cause the processor to perform operations such that activating the first triggered mode for the first reflex associated with the predetermined action when at least one of the stored events corresponds to the first trigger pattern associated with the first reflex comprises:
applying a pattern filter to a pattern based on the at least one of the stored events; and
activating the first triggered mode for the first reflex associated with the predetermined action when the at least one of the stored events corresponds to the first trigger pattern associated with the first reflex and when the pattern is not discarded based on the applied pattern filter.

60. The non-transitory processor-readable storage medium of claim 45, wherein the first reflex and the second reflex are only removable from the learning device based on a garbage collection policy.

61. The non-transitory processor-readable storage medium of claim 45, wherein the stored processor-executable instructions are configured to cause the processor to perform operations such that conducting the predetermined action associated with the first reflex in response to determining that the trigger weight associated with the first reflex exceeds the trigger weight threshold comprises generating a pattern of events that are used by a motor driver to drive an actuator.

62. The non-transitory processor-readable storage medium of claim 45, wherein one or more of the first correction pattern and the first reward pattern are order-dependent.

63. The non-transitory processor-readable storage medium of claim 45, wherein one or more of the first correction pattern and the first reward pattern are order-independent.

64. The non-transitory processor-readable storage medium of claim 45, wherein the stored processor-executable instructions are configured to cause the processor to perform operations such that obtaining the at least one additional event while in the first triggered mode comprises obtaining the at least one additional event based on one or more periodic timing mechanisms.

65. The non-transitory processor-readable storage medium of claim 64, wherein the stored processor-executable instructions are configured to cause the processor to perform operations further comprising polling one or more sensors based on the one or more periodic timing mechanisms.

66. The non-transitory processor-readable storage medium of claim 64, wherein the one or more periodic timing mechanisms are shared by multiple learning devices.

67. A system, comprising:
a first learning device within a plurality of learning devices, comprising:
a first processor; and
a first memory coupled to the first processor,
wherein the first processor is configured with processor-executable instructions for performing operations comprising:
storing, in the first memory, events obtained while in a monitoring mode;
activating a first triggered mode for a first reflex when at least one of the stored events corresponds to a first trigger pattern associated with the first reflex, wherein the first reflex indicates a correlation between at least the first trigger pattern and a predetermined action;
determining whether the first reflex has a trigger weight exceeding a trigger weight threshold;
conducting the predetermined action associated with the first reflex in response to determining that the trigger weight associated with the first reflex exceeds the trigger weight threshold;
obtaining at least one additional event while in the first triggered mode;
determining whether the at least one additional event corresponds to a first correction pattern or a first reward pattern;
adjusting the trigger weight of the first reflex when the at least one additional event corresponds to at least one of the first correction pattern and the first reward pattern associated with the first reflex and occurring in response to conducting the predetermined action, wherein the adjustment to the trigger weight of the first reflex is different in response to determining that the at least one additional event corresponds to the first correction pattern, than the adjustment to the trigger weight in response to determining that the at least one additional event corresponds to the first reward pattern; and
creating a second reflex with a second trigger pattern, a second correction pattern, and a second reward pattern when the at least one additional event does not correspond to at least one of the first trigger pattern, the first correction pattern, and the first reward pattern associated with the first reflex; and
a second learning device within the plurality of learning devices, comprising:
a second processor; and
a second signal transmitter coupled to the second processor, and wherein the second processor is configured with processor-executable instructions for performing operations comprising transmitting, via the second signal transmitter, a first event report message, and
wherein the first learning device further comprises:
a first signal receiver coupled to the first processor, and
wherein the first processor is configured with processor-executable instructions for performing operations further comprising receiving, via the first signal receiver, the first event report message transmitted by the second learning device.

68. The system of claim 67, wherein the first processor is configured with processor-executable instructions for performing operations such that adjusting the trigger weight of the first reflex further comprises:
increasing the trigger weight of the first reflex when the at least one additional event corresponds to the first reward pattern of the first reflex; and
decreasing the trigger weight of the first reflex when the at least one additional event corresponds to the first correction pattern of the first reflex.

69. The system of claim 68, wherein the first processor is configured with processor-executable instructions for performing operations further comprising:
entering a critical learning period with the first reflex during which a high gain set is applied to the trigger weight.

70. The system of claim 68, wherein the first processor is configured with processor-executable instructions for performing operations further comprising:
entering a steady state learning period with the first reflex during which a low gain set is applied to the trigger weight.

71. The system of claim 67, wherein the first processor is configured with processor-executable instructions for performing operations such that obtaining the at least one additional event while in the first triggered mode further comprises:
retrieving prior events from the first memory.

72. The system of claim 67, wherein the first processor is configured with processor-executable instructions for performing operations such that storing events obtained while in the monitoring mode comprises storing, in the first memory, at least one event for a window of time such that the at least one event and associated patterns are removed from the first memory after the window of time.

73. The system of claim 67, wherein at least one of the stored events is obtained based on occurrence data that is generated locally.

74. The system of claim 67, wherein at least one of the stored events is obtained based on occurrence data that is generated remotely.

75. The system of claim 74, wherein the at least one of the stored events that is obtained based on the occurrence data that is generated remotely corresponds to at least one of the first reward pattern and the first correction pattern.

76. The system of claim 67, further comprising:
one or more non-learning devices, and
wherein at least one of the stored events is obtained by the first learning device based on occurrence data that is received from the one or more non-learning devices via a wired or wireless communication link.

77. The system of claim 67, wherein the first processor is configured with processor-executable instructions for performing operations further comprising:
concurrently activating a second triggered mode when the at least one additional event corresponds to a different trigger pattern associated with a third reflex.

78. The system of claim 67, wherein the first learning device further comprises a first signal transmitter coupled to the first processor, and
wherein the first processor is configured with processor-executable instructions for performing operations such that conducting the predetermined action associated with the first reflex in response to determining that the trigger weight associated with the first reflex exceeds the trigger weight threshold comprises:

generating a resulting event based on conducting the predetermined action; and broadcasting, via the first signal transmitter, a second event report message that indicates the resulting event and that is capable of being used by another learning device.

79. The system of claim 67, wherein the second processor is configured with processor-executable instructions for performing operations further comprising:

obtaining a first event that corresponds to the first trigger pattern; and generating a second event in response to obtaining the first event that corresponds to the first trigger pattern, and wherein the first event report message indicates the second event.

80. The system of claim 67, wherein the first processor is configured with processor-executable instructions for performing operations such that activating the first triggered mode for the first reflex associated with the predetermined action when at least one of the stored events corresponds to the first trigger pattern associated with the first reflex comprises:

applying a pattern filter to a pattern based on the at least one of the stored events; and activating the first triggered mode for the first reflex associated with the predetermined action when the at least one of the stored events corresponds to the first trigger pattern associated with the first reflex and when the pattern is not discarded based on the applied pattern filter.

81. The system of claim 67, wherein the first reflex and the second reflex are only removable from the first memory of the first learning device based on a garbage collection policy.

82. The system of claim 67, wherein the first processor is configured with processor-executable instructions for performing operations such that conducting the predetermined action associated with the first reflex in response to determining that the trigger weight associated with the first reflex exceeds the trigger weight threshold comprises generating a pattern of events that are used by a motor driver to drive an actuator.

83. The system of claim 67, wherein one or more of the first correction pattern and the first reward pattern are order-dependent.

84. The system of claim 67, wherein one or more of the first correction pattern and the first reward pattern are order-independent.

85. The system of claim 67, wherein the first processor is configured with processor-executable instructions for performing operations such that obtaining the at least one additional event while in the first triggered mode comprises obtaining the at least one additional event based on one or more periodic timing mechanisms.

86. The system of claim 85, wherein the first processor is configured with processor-executable instructions for performing operations further comprising polling one or more sensors based on the one or more periodic timing mechanisms.

87. The system of claim 85, wherein the one or more periodic timing mechanisms are shared by the second learning device.

88. A method for decentralized training of a first learning device, comprising:

receiving one or more events at the first learning device, the first learning device having one or more associated reflexes, each reflex having at least one associated trigger pattern and at least one associated action;

determining whether the received one or more events match a first trigger pattern associated with a first reflex associated with the first learning device, wherein the first reflex indicates a correlation between at least the first trigger pattern and a first action;

determining whether the first reflex has a trigger weight exceeding a trigger weight threshold;

conducting the first action associated with the first reflex in response to determining that the trigger weight associated with the first reflex exceeds the trigger weight threshold;

obtaining at least one additional event;

determining whether the at least one additional event corresponds to a first correction pattern or a first reward pattern;

adjusting the trigger weight of the first reflex when the at least one additional event corresponds to at least one of the first correction pattern and the first reward pattern associated with the first reflex and occurring in response to conducting the first action, wherein the adjustment to the trigger weight of the first reflex is different in response to determining that the at least one additional event corresponds to the first correction pattern, than the adjustment to the trigger weight in response to determining that the at least one additional event corresponds to the first reward pattern; and creating a second reflex associated with the first learning device with a second trigger pattern and a second action in response to determining that the received one or more events do not match any pattern associated with the first learning device.

* * * * *